US011511415B2

(12) United States Patent
Truebenbach et al.

(10) Patent No.: US 11,511,415 B2
(45) Date of Patent: Nov. 29, 2022

(54) SYSTEM AND METHOD FOR ROBOTIC BIN PICKING

(71) Applicant: Teradyne, Inc., North Reading, MA (US)

(72) Inventors: Eric Lenhart Truebenbach, Sudbury, MA (US); Douglas E. Barker, Watertown, MA (US); Christopher Thomas Aloisio, Framingham, MA (US); Evgeny Polyakov, Brookline, MA (US); Chu-Yin Chang, Reading, MA (US)

(73) Assignee: Teradyne, Inc., North Reading, MA (US)

( * ) Notice: Subject to any disclaimer, the term of this patent is extended or adjusted under 35 U.S.C. 154(b) by 85 days.

(21) Appl. No.: 16/453,197

(22) Filed: Jun. 26, 2019

(65) Prior Publication Data

US 2019/0389062 A1 Dec. 26, 2019

Related U.S. Application Data

(60) Provisional application No. 62/690,186, filed on Jun. 26, 2018.

(51) Int. Cl.
*B25J 9/16* (2006.01)
*G05B 19/4155* (2006.01)

(52) U.S. Cl.
CPC ........... *B25J 9/1633* (2013.01); *B25J 9/1664* (2013.01); *B25J 9/1669* (2013.01); *B25J 9/1676* (2013.01);
(Continued)

(58) Field of Classification Search
CPC ...... B25J 9/1633; B25J 9/1669; B25J 9/1676; B25J 9/1612; B25J 9/1666; B25J 9/1664;
(Continued)

(56) References Cited

U.S. PATENT DOCUMENTS 9,707,682 B1 * 7/2017 Konolige ................ H04N 5/33
9,724,826 B1 * 8/2017 Prats ..................... B25J 9/1664
(Continued)

OTHER PUBLICATIONS

International Search Report and Written Opinion of the International Searching Authority for International PCT Application No. PCT/US2019/039226 dated Nov. 12, 2019.
(Continued)

*Primary Examiner* — Khoi H Tran
*Assistant Examiner* — Tanner L Cullen
(74) *Attorney, Agent, or Firm* — Mark H. Whittenberger; Holland & Knight LLP

(57) ABSTRACT

A method and computing system comprising identifying one or more candidate objects for selection by a robot. A path to the one or more candidate objects may be determined based upon, at least in part, a robotic environment and at least one robotic constraint. A feasibility of grasping a first candidate object of the one or more candidate objects may be validated. If the feasibility is validated, the robot may be controlled to physically select the first candidate object. If the feasibility is not validated, at least one of a different grasping point of the first candidate object, a second path, or a second candidate object may be selected.

21 Claims, 54 Drawing Sheets

10

(52) U.S. Cl.
CPC .................... *G05B 19/4155* (2013.01); *G05B 2219/39138* (2013.01); *G05B 2219/50362* (2013.01)

(58) Field of Classification Search
CPC ............... B25J 9/1697; G05B 19/4155; G05B 2219/39138; G05B 2219/50362; G05B 2219/39484; G05B 2219/39473; G05B 2219/40607; G05B 2219/40053
See application file for complete search history.

(56) References Cited

U.S. PATENT DOCUMENTS

| | | | | |
|---|---|---|---|---|
| 9,764,469 | B1 * | 9/2017 | Sun | B25J 9/1664 |
| 10,118,296 | B1 * | 11/2018 | Gennis | B25J 9/1656 |
| 10,757,861 | B2 | 9/2020 | Robertson et al. | |
| 10,981,272 | B1 * | 4/2021 | Nagarajan | B25J 9/1669 |
| 2010/0204828 | A1 * | 8/2010 | Yoshizawa | B25J 9/1666 700/245 |
| 2010/0272547 | A1 | 10/2010 | Cottone et al. | |
| 2011/0153076 | A1 * | 6/2011 | Noro | B25J 9/1664 700/245 |
| 2012/0158179 | A1 * | 6/2012 | Ooga | B25J 9/1633 700/259 |
| 2014/0107953 | A1 * | 4/2014 | Mueller | G01N 35/0099 702/54 |
| 2015/0127162 | A1 | 5/2015 | Gotou | |
| 2015/0261899 | A1 | 9/2015 | Atohira et al. | |
| 2015/0352717 | A1 * | 12/2015 | Mundt | B25J 9/0096 414/730 |
| 2016/0221187 | A1 * | 8/2016 | Bradski | G06V 10/60 |
| 2017/0225330 | A1 | 8/2017 | Wagner | |
| 2017/0320211 | A1 | 11/2017 | Akan et al. | |
| 2018/0021951 | A1 * | 1/2018 | Kawamoto | B25J 9/1661 700/257 |
| 2018/0170676 | A1 * | 6/2018 | Claretti | B25J 15/0206 |
| 2019/0160674 | A1 * | 5/2019 | Feng | B25J 9/1664 |
| 2019/0184560 | A1 * | 6/2019 | Liu | B25J 9/1664 |
| 2019/0240833 | A1 * | 8/2019 | Kimura | B25J 9/0081 |
| 2019/0261566 | A1 * | 8/2019 | Robertson | A01D 46/243 |
| 2019/0337154 | A1 * | 11/2019 | Holson | B25J 9/1671 |
| 2019/0381659 | A1 * | 12/2019 | Monnich | B25J 9/1607 |
| 2021/0229285 | A1 * | 7/2021 | Zhang | G01G 19/00 |

OTHER PUBLICATIONS

Domae, Y. et al., "Fast graspability evaluation on single depth maps for bin picking with general grippers", 2014 IEEE International Conference on Robotics and Automation (ICRA), May 31, 2014, pp. 1997-2004.

* cited by examiner

10

FIG. 31
Universal Robots Graphical Programming Environment
File
19:34:58
CCCC
Program
Installation
Move
I/O
Log
TCP Configuration
Mounting
I/O Setup
Safety
Variables
MODBUS
Features
Conveyor Tracking
EtherNet/IP
PROFINET
Bin Picking
Default Program
Load/Save
Status
Environment
Sensor
Sensor Registration
Select sensor:
Sensor parameters:
Ambient Light Suppression
Coding Quality
IP Address
Normals Estimation Radius
Sensor parameter value:

SYSTEM AND METHOD FOR ROBOTIC BIN PICKING

RELATED APPLICATIONS

This application claims the benefit of U.S. Provisional Application having Ser. No. 62/690,186 filed on Jun. 26, 2018, the entire contents of which is incorporated herein by reference in its entirety.

FIELD OF THE INVENTION

The invention generally relates to robotics and, more specifically, to a system and method for robotic bin picking.

BACKGROUND

Certain forms of manual labor such as unloading a bin one workpiece at a time into a machine, bulk parts sorting, and order fulfillment are labor-intensive. These jobs are often dangerous if the workpieces or operations are heavy, sharp, or otherwise hazardous. In an effort to counteract these issues, bin picking robots have been tackling these tedious jobs. However, robotic bin picking is a particularly difficult task to master as the amount of accuracy and precision required is often beyond the capabilities of the system.

SUMMARY

In one implementation, a method for identifying one or more candidate objects for selection by a robot. A path to the one or more candidate objects may be determined based upon, at least in part, a robotic environment and at least one robotic constraint. A feasibility of grasping a first candidate object of the one or more candidate objects may be validated. If the feasibility is validated, the robot may be controlled to physically select the first candidate object. If the feasibility is not validated, at least one of a different grasping point of the first candidate object, a second path, or a second candidate object may be selected.

One or more of the following features may be included. Validating may include using a robot kinematic model. The path may be at least one of a feasible path or an optimal path. The path may be determined in real-time while controlling the robot. Determining the path may include using information about one or more surfaces of at least one object adjacent to the candidate object and avoiding a collision with the at least one object adjacent the candidate object. At least one of the robot or the one or more candidate objects may be displayed at a graphical user interface. The graphical user interface may allow a user to visualize or control at least one of the robot, a path determination, a simulation, a workcell definition, a performance parameter specification, or a sensor configuration. The graphical user interface may allow for a simultaneous creation of a program and a debugging process associated with the program. The graphical user interface may be associated with one or more of a teach pendant, a hand-held device, a personal computer, or the robot. An image of the environment including one or more static and dynamic objects using a scanner may be provided, where the robot is configured to receive the image and use the image to learn the environment to determine the path and collision avoidance. Controlling the robot may include performing a second scan of the first candidate object, moving the first candidate object to a placement target having a fixed location with an accuracy requirement, manipulating the first candidate object and delivering the first candidate object to the placement target in accordance with the accuracy requirement. Controlling the robot may include presenting the first candidate object to a scanner to maximize the use of one or more features on the first candidate object to precisely locate the first candidate object. Controlling the robot may include locating and picking the first candidate object in a way that maximizes the probability that is physically selected successfully. The second scan may be in an area of maximum resolution of the scanner. Determining a path to the one or more candidate objects may be based upon, at least in part, at least one of a robot linkage or robot joint limitation. A shrink-wrap visualization over all non-selected components and non-selected surfaces other than the one or more candidate objects may be displayed at the graphical user interface. At least one of identifying, determining, validating, or controlling may be performed using at least one of a primary processor and at least one co-processor. Determining a path to the one or more candidate objects may be based upon, at least in part, at least one of global path planning and local path planning. Validating a feasibility of grasping a first candidate object may include analyzing conditional logic associated with a user program. Validating a feasibility of grasping a first candidate object may include at least one of validating all path alternatives, validating a specific path alternative, validating any path alternative, validating one or more exception paths, excluding one or more sections from being validated, or performing parallelized validation of multiple sections of the path.

In another implementation, a computing system including a processor and memory is configured to perform operations including identifying one or more candidate objects for selection by a robot. A path to the one or more candidate objects may be determined based upon, at least in part, a robotic environment and at least one robotic constraint. A feasibility of grasping a first candidate object of the one or more candidate objects may be validated. If the feasibility is validated, the robot may be controlled to physically select the first candidate object. If the feasibility is not validated, at least one of a different grasping point of the first candidate object, a second path, or a second candidate object may be selected.

One or more of the following features may be included. Validating may include using a robot kinematic model. The path may be at least one of a feasible path or an optimal path. The path may be determined in real-time while controlling the robot. Determining the path may include using information about one or more surfaces of at least one object adjacent to the candidate object and avoiding a collision with the at least one object adjacent the candidate object. At least one of the robot or the one or more candidate objects may be displayed at a graphical user interface. The graphical user interface may allow a user to visualize or control at least one of the robot, a path determination, a simulation, a workcell definition, a performance parameter specification, or a sensor configuration. The graphical user interface may allow for a simultaneous creation of a program and a debugging process associated with the program. The graphical user interface may be associated with one or more of a teach pendant, a hand-held device, a personal computer, or the robot. An image of the environment including one or more static and dynamic objects using a scanner may be provided, where the robot is configured to receive the image and use the image to learn the environment to determine the path and collision avoidance. Controlling the robot may include performing a second scan of the first candidate object, moving the first candidate object to a placement target having a fixed location with an accuracy requirement, manipulating the first candidate object and delivering the first candidate object to the placement target in accordance with the accuracy requirement. Controlling the robot may include presenting the first candidate object to a scanner to maximize the use of one or more features on the first candidate object to precisely locate the first candidate object. Controlling the robot may include locating and picking the first candidate object in a way that maximizes the probability that is physically selected successfully. The second scan may be in an area of maximum resolution of the scanner. Determining a path to the one or more candidate objects may be based upon, at least in part, at least one of a robot linkage or robot joint limitation. A shrink-wrap visualization over all non-selected components and non-selected surfaces other than the one or more candidate objects may be displaying, at the graphical user interface. At least one of identifying, determining, validating, or controlling may be performed using at least one of a primary processor and at least one co-processor. Determining a path to the one or more candidate objects may be based upon, at least in part, at least one of global path planning and local path planning. Validating a feasibility of grasping a first candidate object may include analyzing conditional logic associated with a user program. Validating a feasibility of grasping a first candidate object may include at least one of validating all path alternatives, validating a specific path alternative, validating any path alternative, validating one or more exception paths, excluding one or more sections from being validated, or performing parallelized validation of multiple sections of the path.

The details of one or more implementations are set forth in the accompanying drawings and the description below. Other features and advantages will become apparent from the description, the drawings, and the claims.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Embodiments of the present disclosure are directed towards a system and method for robotic bin picking. Accordingly, the bin picking methodologies included herein may allow a robot to work with a scanning system to identify parts in a bin, pick parts from the bin, and place the picked parts at a designated location.

Embodiments of the subject application may include concepts from U.S. Pat. Nos. 6,757,587, 7,680,300, 8,301,421, 8,408,918, 8,428,781, 9,357,708, U.S. Publication No. 2015/0199458, U.S. Publication No. 2016/0321381, U. S. Publication No. 2018/0060459, the entire contents of each are incorporated herein by reference in their entirety.

Figure 1:
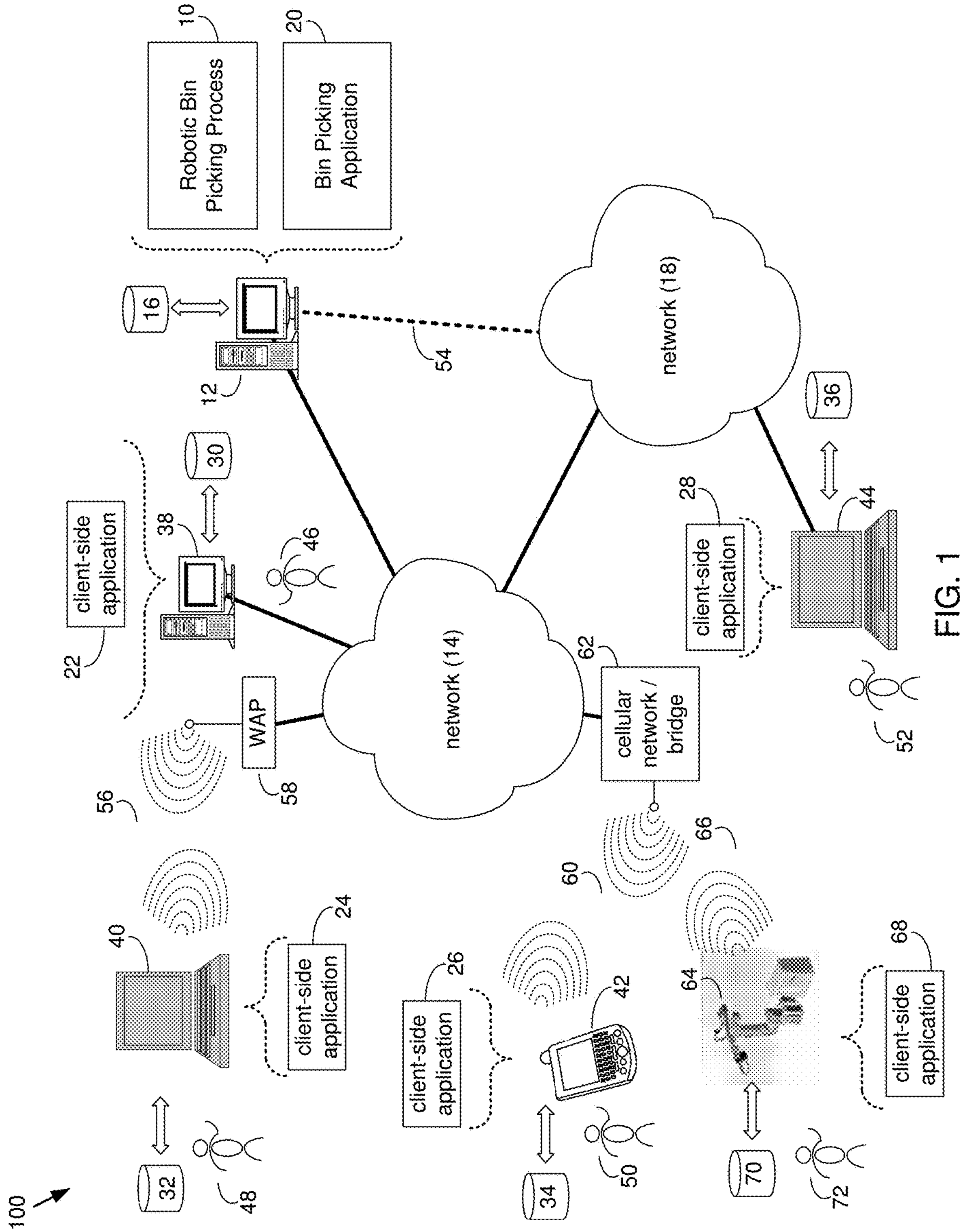
FIG. 1 is a diagrammatic view of a robotic bin picking process coupled to a distributed computing network.

Referring now to FIG. 1, there is shown robotic bin picking process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, robotic bin picking processes, such as robotic bin picking process 10 of FIG. 1, may identify one or more candidate objects for selection by a robot. A path to the one or more candidate objects may be determined based upon, at least in part, a robotic environment and at least one robotic constraint. A feasibility of grasping a first candidate object of the one or more candidate objects may be validated. If the feasibility is validated, the robot may be controlled to physically select the first candidate object. If the feasibility is not validated, at least one of a different grasping point of the first candidate object, a second path, or a second candidate object may be selected.

The instruction sets and subroutines of robotic bin picking process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Robotic bin picking process 10 may be a stand-alone application that interfaces with an applet/application that is accessed via client applications 22, 24, 26, 28, 66. In some embodiments, robotic bin picking process 10 may be, in whole or in part, distributed in a cloud computing topology. In this way, computing device 12 and storage device 16 may refer to multiple devices, which may also be distributed throughout network 14 and/or network 18.

Computing device 12 may execute a robotic control application (e.g., robotic control application 20), examples of which may include, but are not limited to, Actin® Software Development Kit from Energid Technologies of Cambridge, Mass. and any other bin picking application or software. Robotic bin picking process 10 and/or robotic control application 20 may be accessed via client applications 22, 24, 26, 28, 68. Robotic bin picking process 10 may be a stand-alone application, or may be an applet/application/script/extension that may interact with and/or be executed within robotic control application 20, a component of robotic control application 20, and/or one or more of client applications 22, 24, 26, 28, 68. Robotic control application 20 may be a stand-alone application, or may be an applet/application/script/extension that may interact with and/or be executed within robotic bin picking process 10, a component of robotic bin picking process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of robotic bin picking process 10 and/or robotic control application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of robotic bin picking process 10 (and vice versa). Accordingly, robotic bin picking process 10 may be a purely server-side application, a purely client-side application, or a hybrid server-side/client-side application that is cooperatively executed by one or more of client applications 22, 24, 26, 28, 68 and/or robotic bin picking process 10.

One or more of client applications 22, 24, 26, 28, 68 may be configured to effectuate some or all of the functionality of robotic control application 20 (and vice versa). Accordingly, robotic control application 20 may be a purely server-side application, a purely client-side application, or a hybrid server-side/client-side application that is cooperatively executed by one or more of client applications 22, 24, 26, 28, 68 and/or robotic control application 20. As one or more of client applications 22, 24, 26, 28, 68 robotic bin picking process 10, and robotic control application 20, taken singly or in any combination, may effectuate some or all of the same functionality, any description of effectuating such functionality via one or more of client applications 22, 24, 26, 28, 68 robotic bin picking process 10, robotic control application 20, or combination thereof, and any described interaction(s) between one or more of client applications 22, 24, 26, 28, 68 robotic bin picking process 10, robotic control application 20, or combination thereof to effectuate such functionality, should be taken as an example only and not to limit the scope of the disclosure.

Users 46, 48, 50, 52 may access computing device 12 and robotic bin picking process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Robotic bin picking process 10 may include one or more user interfaces, such as browsers and textual or graphical user interfaces, through which users 46, 48, 50, 52 may access robotic bin picking process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, robotic system 64 may be wirelessly coupled to network 14 via wireless communication channel 66 established between client electronic device 42 and cellular network/bridge 62, which is shown directly coupled to network 14. Storage device 70 may be coupled to robotic system 64 and may include but is not limited to: hard disk drives; flash drives, tape drives; optical drives; RAID arrays; random access memories (RAM); and read-only memories (ROM). User 72 may access computing device 12 and robotic bin picking process 10 (e.g., using robotic system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
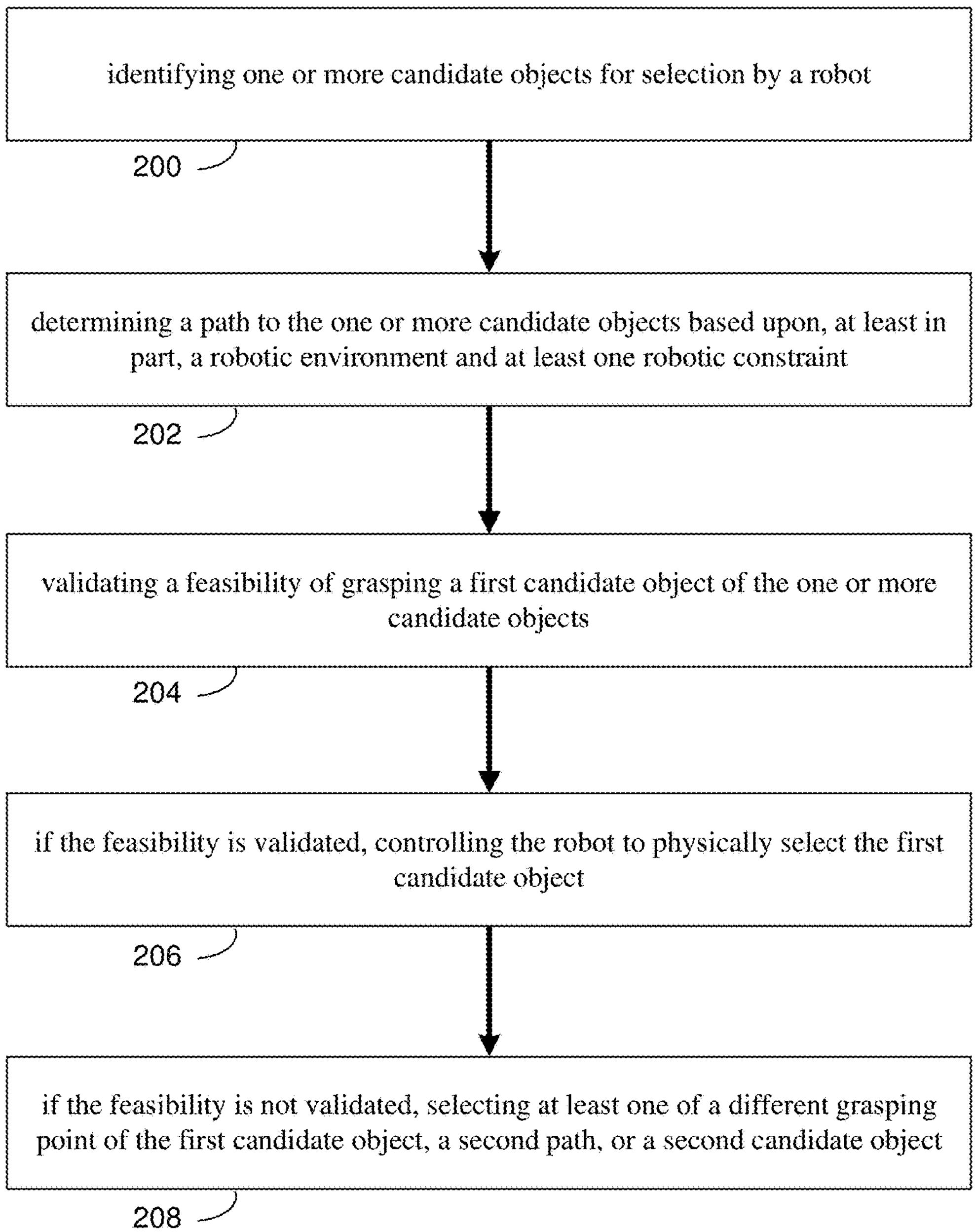
FIG. 2 is a flow chart of one implementation of the robotic bin picking process of FIG. 1.
Figure 54:
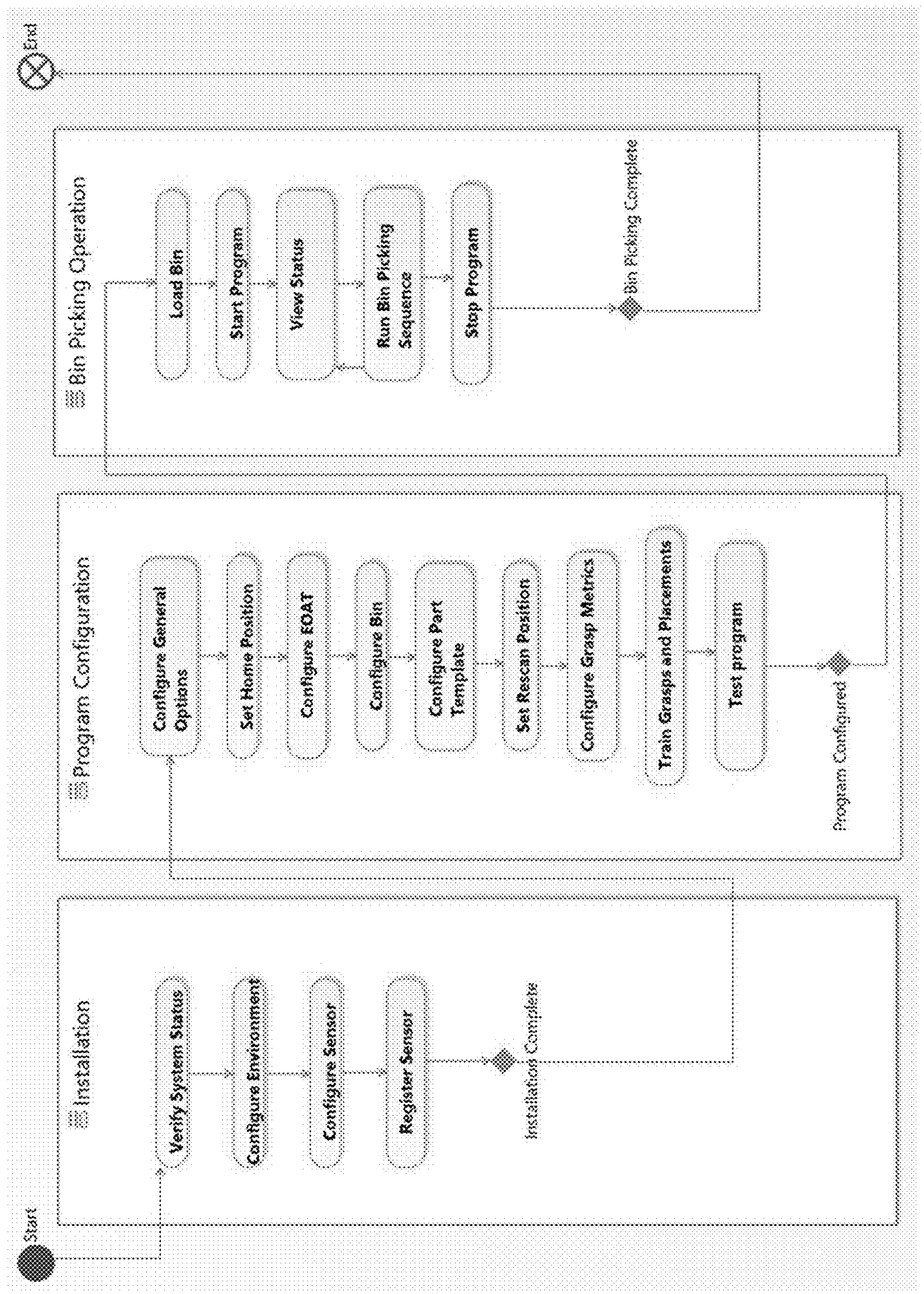
FIG. 54 is a flowchart showing an example of the installation, program configuration, and bin picking operating consistent with embodiments of the present disclosure.

Referring also to FIGS. 2-54 and in some embodiments, robotic bin picking process 10 may generally include identifying 200 one or more candidate objects for selection by a robot. A path to the one or more candidate objects may be determined 202 based upon, at least in part, a robotic environment and at least one robotic constraint. A feasibility of grasping a first candidate object of the one or more candidate objects may be validated 204. If the feasibility is validated, the robot may be controlled 206 to physically select the first candidate object. If the feasibility is not validated, at least one of a different grasping point of the first candidate object, a second path, or a second candidate object may be selected 208.

As used herein, the terms "Actin viewer" may refer to a graphical user interface, "Actin" may refer to robot control software, and "UR" may refer to "Universal Robots". Any use of these particular companies and products is provided merely by way of example. As such, any suitable graphical user interfaces, robot control software, and devices/modules may be used without departing from the scope of the present disclosure.

In some embodiments, the bin picking system (e.g., bin picking system 64) may include a robot arm (e.g., Universal Robots UR5 available from Universal Robots, etc.), a controller, a gripper, a sensor, and a coprocessor (e.g., to run the computationally expensive operations from perception and task planning). However, it will be appreciated that the bin picking system may include additional components and/or may omit one or more of these example components within the scope of the present disclosure.

Figure 3:
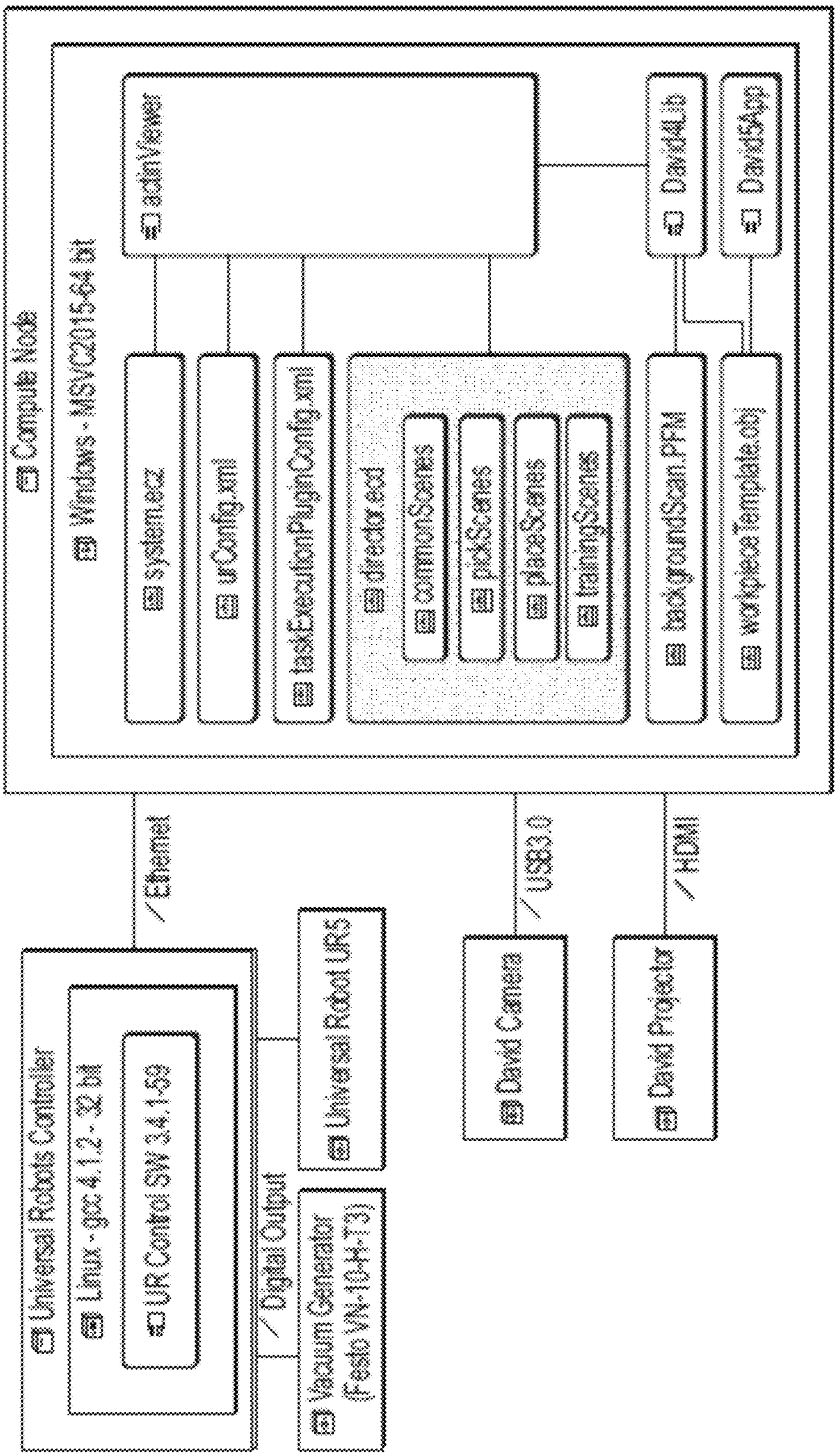
FIG. 3 is the bin picking system configured to run all modules on the coprocessor and interfaces with the UR Controller over an Ethernet connection using the Real-Time Data Exchange interface from UR according to an embodiment of the present disclosure.

In some embodiments, and referring also to FIG. 3, the bin picking system (e.g., bin picking system 64) may be configured to run all modules on the coprocessor and interfaces with the UR Controller over e.g., an Ethernet connection using the Real-Time Data Exchange interface from UR. The software application may be built from custom plugins for one or more graphical user interfaces such as the "Actin Viewer" available from Energid Technologies. In some embodiments, the sensor may any suitable sensor (e.g., a 3D sensor). In some embodiments, the bin picking system (e.g., bin picking system 64) may be configured to run some modules on at least one coprocessor and some modules on the UR controller. In some embodiments, all modules may run on the UR controller.

In some embodiments, the coprocessor may include a core processor and a graphics card. The operating system and compiler may be of any suitable type. The coprocessor may include multiple external interfaces (e.g., Ethernet to the UR Controller, USB3.0 to the camera(s), HDMI to the Projector, etc.). These particular devices and systems, as well as the others described throughout this document, are provided merely by way of example.

In some embodiments, a Universal Robots UR5 may be utilized in bin picking system 64. The controller may be unmodified. For example, a suction cup end of arm tool (EOAT) may be connected to the controller via a e.g., 24 VDC Digital Output channel. However, it will be appreciated that any EOAT may be used on any robotic arm within the scope of the present disclosure.

In some embodiments, any scanner may be used. This may be a structured light sensor and may enable third party integration. Along with the SDK, the scanner may come with the application which may be used to create workpiece mesh templates.

Figure 4:
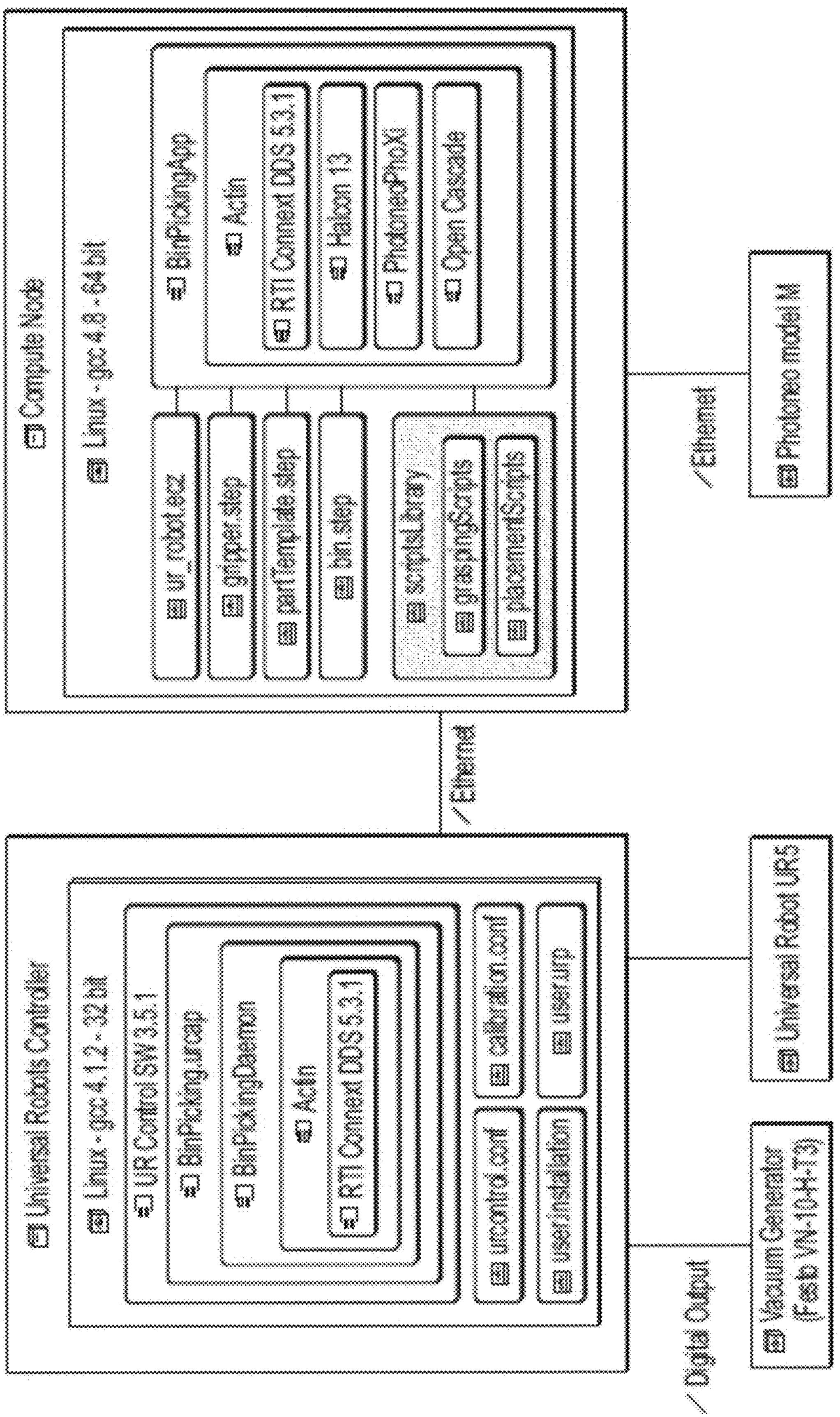
FIG. 4 is an interface showing the bin picking system deployment diagram according to an embodiment of the present disclosure.

In some embodiments, the bin picking application (e.g., bin picking application 20) may be configured to run on the coprocessor of the bin picking system (e.g., bin picking system 64) in lieu of the GUI based Actin Viewer discussed above. For example, the user interface may be moved to the controller and teach pendent via a bin picking cap. A "cap", as used herein, may generally refer to a robotic capability, accessory, or peripheral. A "UR" cap may refer to a cap available from "Universal Robotics" or the Assignee of the present disclosure. In one example, a $C^{++}$ Cap Daemon may run on the controller to enable communication with the coprocessor over RTI Connext DDS. An example deployment is shown in FIG. 4.

In some embodiments, an industrial PC (IPC) may be utilized for the coprocessor. Along with the bin picking application, the coprocessor may host the relevant files for bin picking including the STEP files for the EOAT, bin, and workpiece. Users may load these files onto the coprocessor via USB or over a network.

In some embodiments, the bin picking application may run on the coprocessor and perform all computationally expensive tasks including workpiece detection and motion planning. This application may be built using the Actin SDK and may link to key libraries required for bin picking. In one example, RTI Connext DDS 5.3.1 may be used for communication with the URCap running on the UR controller. However, it will be appreciated that various configurations are possible within the scope of the present disclosure. In some embodiments and as will be discussed in greater detail below, target objects or workpieces may be detected from point cloud data. In one example, an API may be used to interface with a sensor. In another example, Open Cascade may be used to convert STEP files to mesh files required for generating Actin models and point clouds of the bin picking system components. In some embodiments, the bin picking URCap may include Java components that form the user interface on the UR teach pendant and a daemon for communicating with the coprocessor. For example, the daemon may be built on Actin libraries and links to e.g., RTI Connext DDS 5.3.1.

In some embodiments, the bin picking system may include multiple phases. These phases may include, but are not limited to: installation; calibration and alignment; application configuration; and bin picking operation.

In some embodiments, a bin picking system may be configured. For example, the robot, sensor, and gripper may be all installed physically and calibrated in this phase of operation. The sensor calibration may be performed to identify the intrinsic and extrinsic parameters of the camera and projector. The sensor to robot alignment may be performed using a 3D printed alignment object consisting of an array of spheres. For example, a target workpiece may be easily detected and it may define the robot coordinate frame that workpiece pose estimates are relative to. Installation, calibration, and alignment parameters may be saved to files on the coprocessor.

In some embodiments, the bin picking program configuration phase is where the user configures the bin picking system to perform a bin picking operation with a given workpiece and placement or fixture. The user may first load or create a new program configuration. Creating a new program may include, but is not limited to, configuring the tool, workpiece template, and bin followed by training grasps and placements.

In the bin picking operation phase, the user may trigger the bin picking system to perform bin picking or stop, and monitors the progress. The bin picking system may run automatically and scan the bin prior to each pick attempt. In some embodiments, there are two anticipated user roles for the bin picking system these may include the user role and developer role. The user may interact with the bin picking system through a graphical user interface (e.g., no programming experience may be required). The developer may extend the bin picking software to include new sensor support, new grippers, new pose estimation (Matcher) algorithms, new boundary generators, and new grasp script selectors. Various tasks may be performed by users and other tasks may be performed by developers.

In some embodiments, the bin picking software may be implemented in custom plugins to Actin Viewer. These custom plugins may include, but are not limited to: perceptionPlugin, taskExecutionPlugin, and urHardwarePlugin.

In some embodiments, the perceptionPlugin may interface with taskExecution plugin through the PerceptionSystem class. This class is a member of the Perception module and is comprised of three main class interfaces: Sensor, Matcher, and BoundaryGenerator.

In some embodiments, the Sensor interface may include the following methods and may be implemented through the Sensor class to interface with the Scanner.

| Method | Parameters | Description |
|---|---|---|
| scan | ScanData [out] | Triggers a scan in the underlying hardware implementation. This method returns a Status object and populates an instance of ScanData - point cloud and time stamp. |
| setParameters | DataMap [in] | Sets the sensors parameters through a generic XML data map |
| calibrate | N/A | Runs the hardware calibration routine. Returns a status object. |

In some embodiments, the Matcher interface includes the following methods and is implemented through the Matcher class to utilize the SDK pose estimation utility.

| Method | Parameters | Description |
|---|---|---|
| findTarget | ScanData [in] | Completes workpiece detection and pose estimation. |
| | TargetData [out] | Returns the description of the found target workpiece in TargetData. |
| setParameters | DataMap [in] | Sets the matcher parameters through a generic XML data |
| setTargetTemplate | ScanData [in] | Sets the workpiece template as an instance of ScanData. |

In some embodiments, the BoundaryGenerator interface includes the following methods and is implemented by a height field generator.

| Method | Parameters | Description |
|---|---|---|
| generateBoundary | ScanData [in] Boundary | Generates an Actin bounding volume shape from the provided background scan data and stores in a Boundary |

-continued

| Method | Parameters | Description |
|---|---|---|
| setParameters | DataMap [in] | Sets the boundary generators parameters through a generic XML data map |

In some embodiments, the TaskPlanEvaluator class performs fast evaluations of prospective grasps via various metrics. This class is located in the Task Planning module and includes one core interface called EcBaseTaskPlanMetric.

In some embodiments, the TaskPlanMetric interface includes the following methods and may be implemented by a HeightTaskPlanMetric that scores the grasp script based on its height in the bin (highest point in the bin gets the highest score) and an AngleTaskPlanMetric that scores the grasp script based on the degree to which the grasp is vertical (vertical grasp angles achieve maximum score, grasp angles that require motion from the bottom of the table achieve minimum score).

| Method | Parameters | Description |
|---|---|---|
| evaluate | TaskPlanEvaluation [out] | Returns the score for the given task plan. |
| setParameters | DataMap [in] | Sets the grasping script selector parameters through a generic XML data map |

In some embodiments, the bin-picking URCap may use the URCap SDK to create a template program that closely follows the patterns and conventions of native UR task wizards such as “Pallet” and “Seek”. Configuration elements may be split into two main groups: those that are general with respect to the bin-picking system setup are placed in the installation node, while those that are specific to a particular bin picking application are placed into program nodes created by the bin picking template. Runtime status may be displayed through the native program node highlighting mechanism provided by UR program execution, and through display elements located on the main bin picking sequence node.

In some embodiments, the overall design of the UI may follow the bin picking use cases described above. The bin picking URCap design may be presented with respect to each use case. For each UI element a screen shot may be provided along with a list of the uses cases with which the element participates. The uses cases are discussed in further detail hereinbelow.

Figure 5:
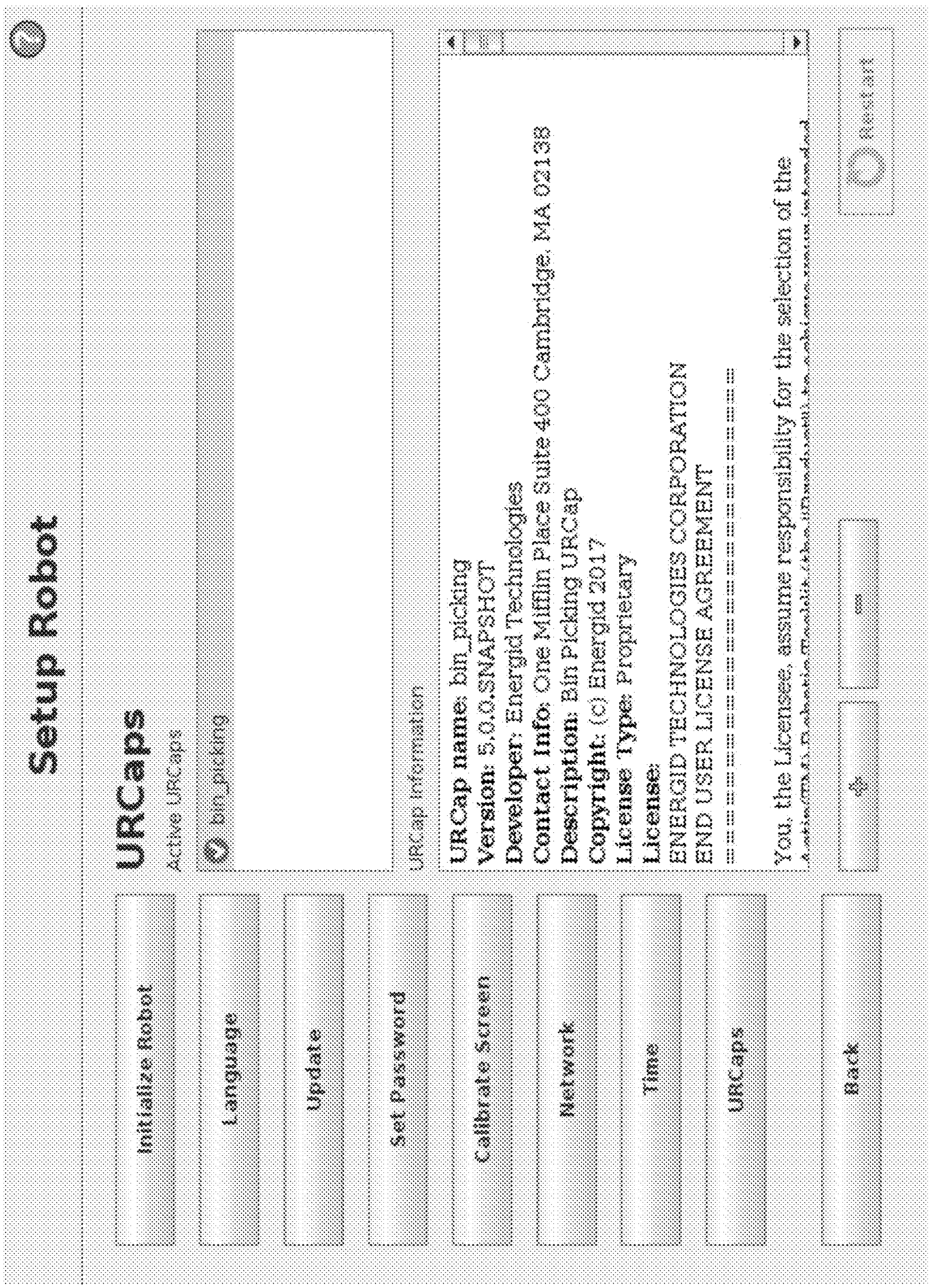
FIG. 5 is an interface showing an embodiment consistent with bin picking system according to an embodiment of the present disclosure.

Referring now to FIG. 5, an embodiment consistent with the bin picking system is provided. The bin picking system installation may start by connecting the coprocessor to the UR controller with an Ethernet cable. The user then turns on the coprocessor which automatically starts the bin picking application. First, the user may transfer the bin picking URCap to the UR controller and install through the Setup Robot page.

Figure 6:
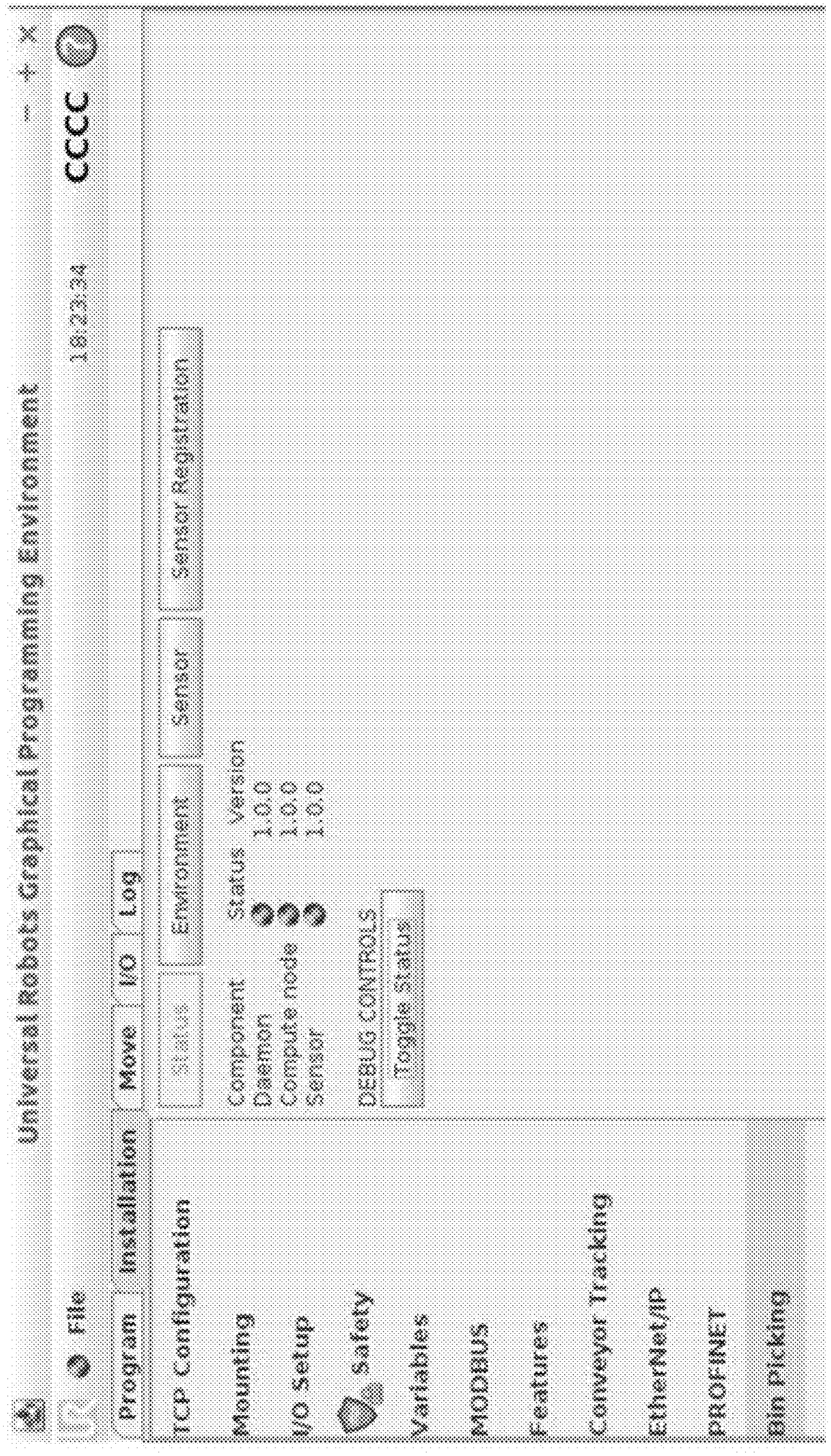
FIG. 6 is an interface showing graphical user interface consistent with the bin picking process according to an embodiment of the present disclosure.

Referring now to FIG. 6, a graphical user interface consistent with bin picking process is provided. The URCap creates a Bin Picking node on the Installation tab. The user may select this node and view the Status page. The status page shows LED style indicators for status of the required components including the URCap daemon, coprocessor, and sensor. If an issue is detected, then error messages may be written to the UR Log and visible on the Log tab.

Figure 7:
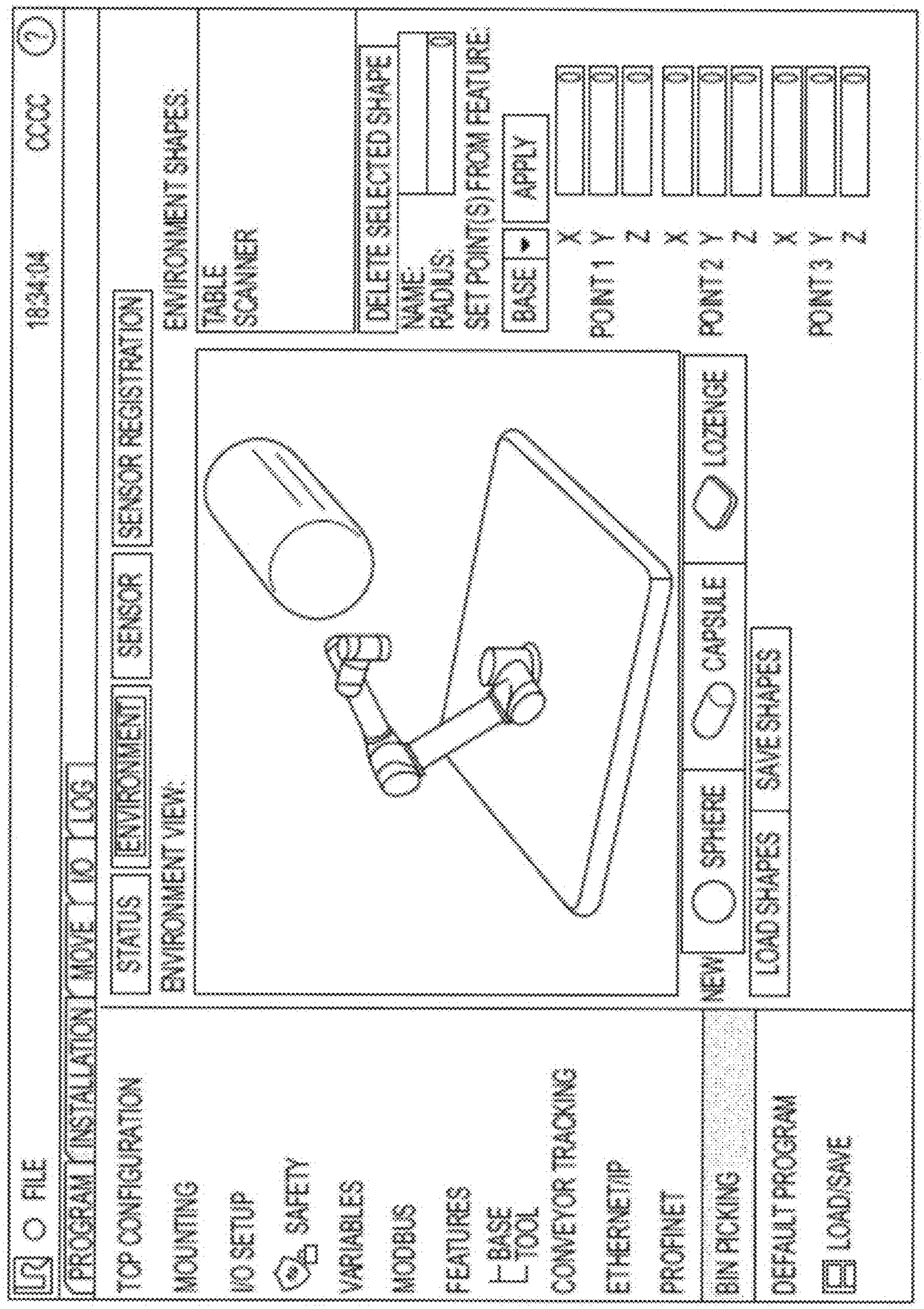
FIG. 7 is a graphical user interface consistent with the bin picking process according to an embodiment of the present disclosure.

Referring now to FIG. 7, a graphical user interface consistent with bin picking process is provided. Next, the user may select the Environment tab to configure the workspace obstacles. In this tab the user can load, create, edit, and/or save the set of shapes that define all of the obstacles in the workspace that may be avoided during the bin picking operation. Three shape types may be supported: sphere, capsule, and lozenge. However, numerous other shape types are also within the scope of the present disclosure. The user may load and save the collision shapes from a file on the bin picking system.

Figure 8:
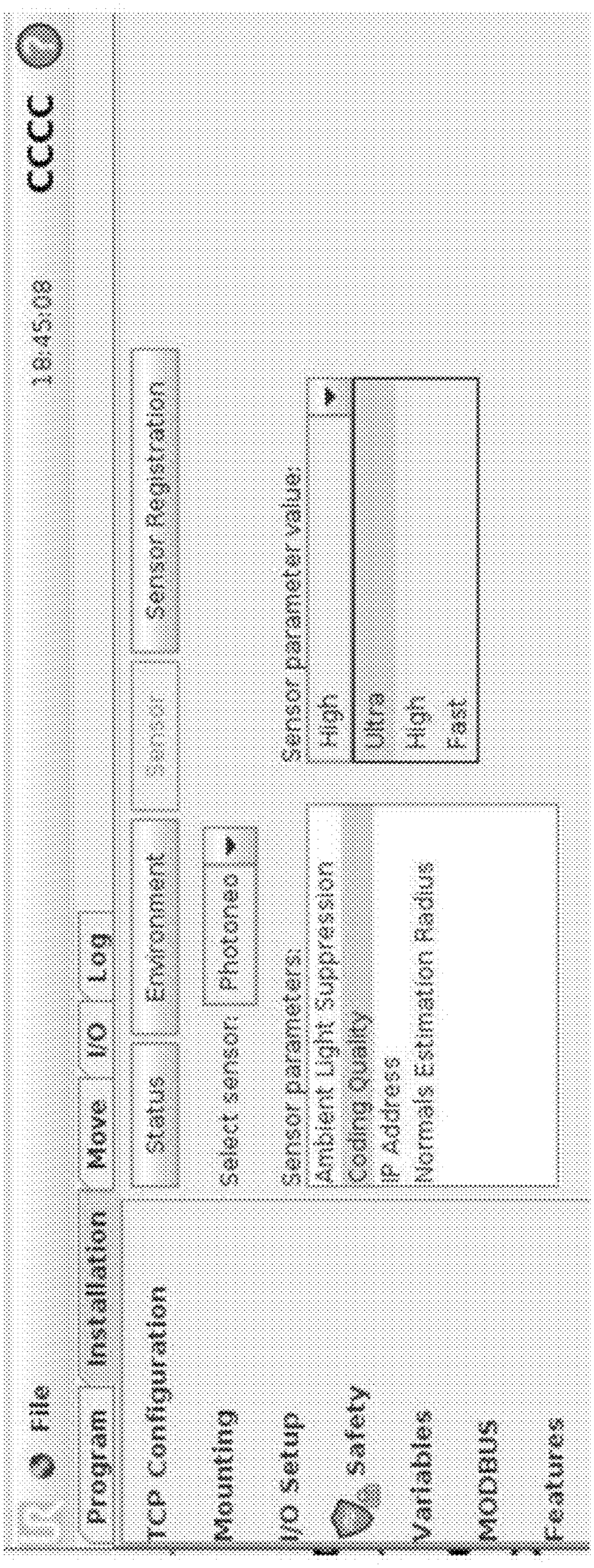
FIG. 8 is a graphical user interface consistent with the bin picking process according to an embodiment of the present disclosure.

Referring now to FIG. 8, an additional graphical user interface consistent with bin picking process is provided. The user may select the Sensor tab and select the sensor type and configure the parameters. These parameters may be used to tune the sensor and this page may be revisited while in the testing and tuning phase.

Figure 9:
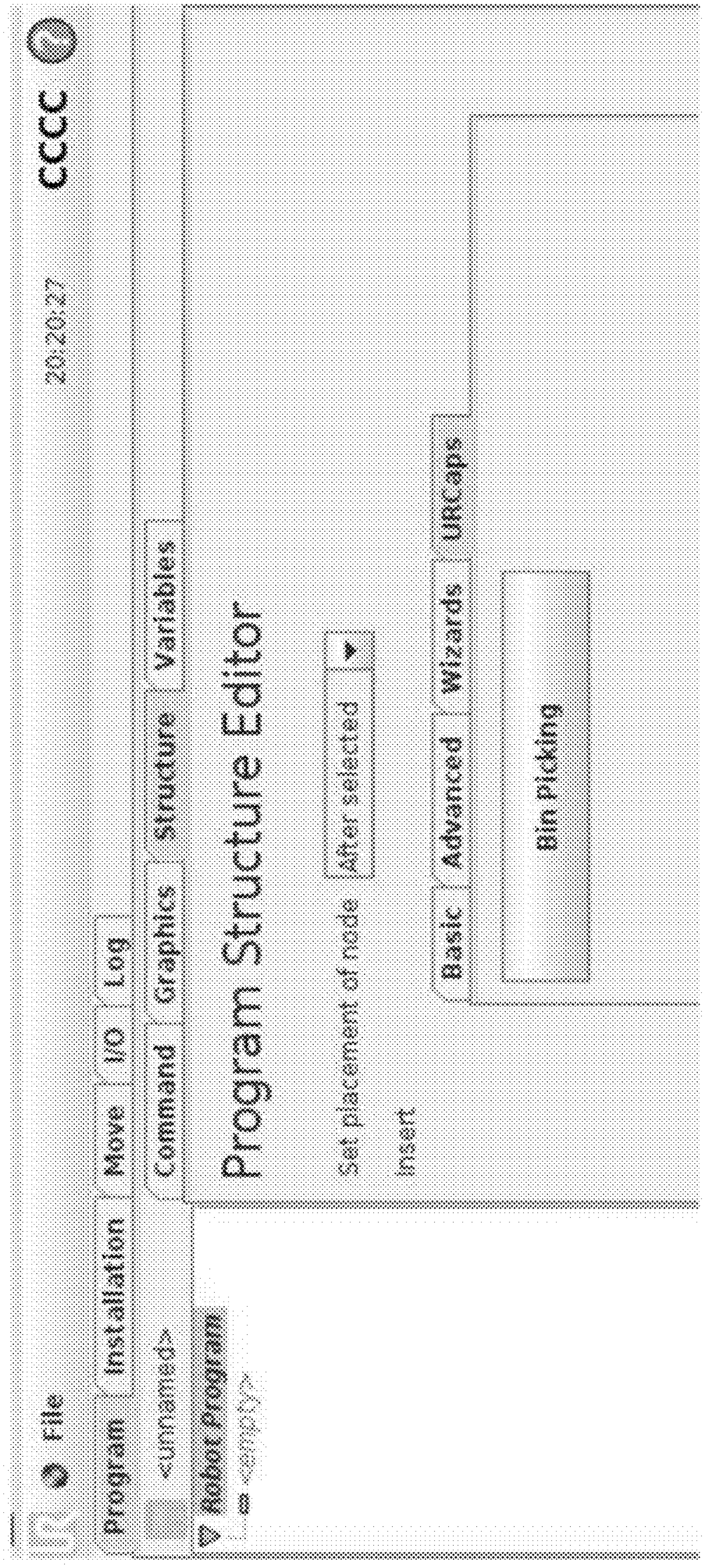
FIG. 9 is a graphical user interface for generating a program template according to an embodiment of the present disclosure.

Referring now to FIG. 9, a graphical user interface for generating a program template is provided. The user may configure the bin picking UR program (.urp) through the following steps and use cases. The user first generates a template bin picking program tree and clicks on the root node.

Figure 10:
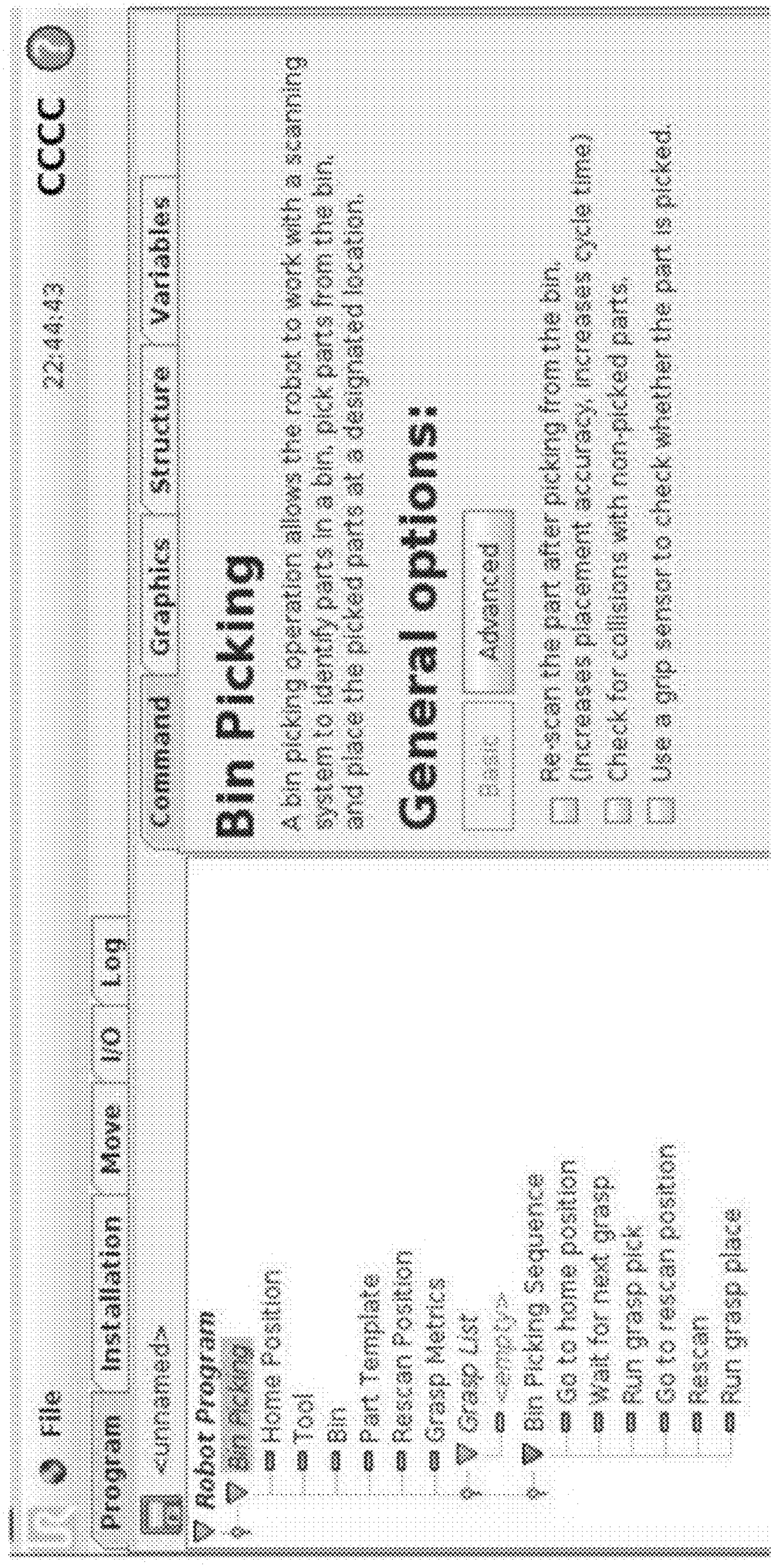
FIG. 10 is a graphical user interface for generating a program template according to an embodiment of the present disclosure.
Figure 11:
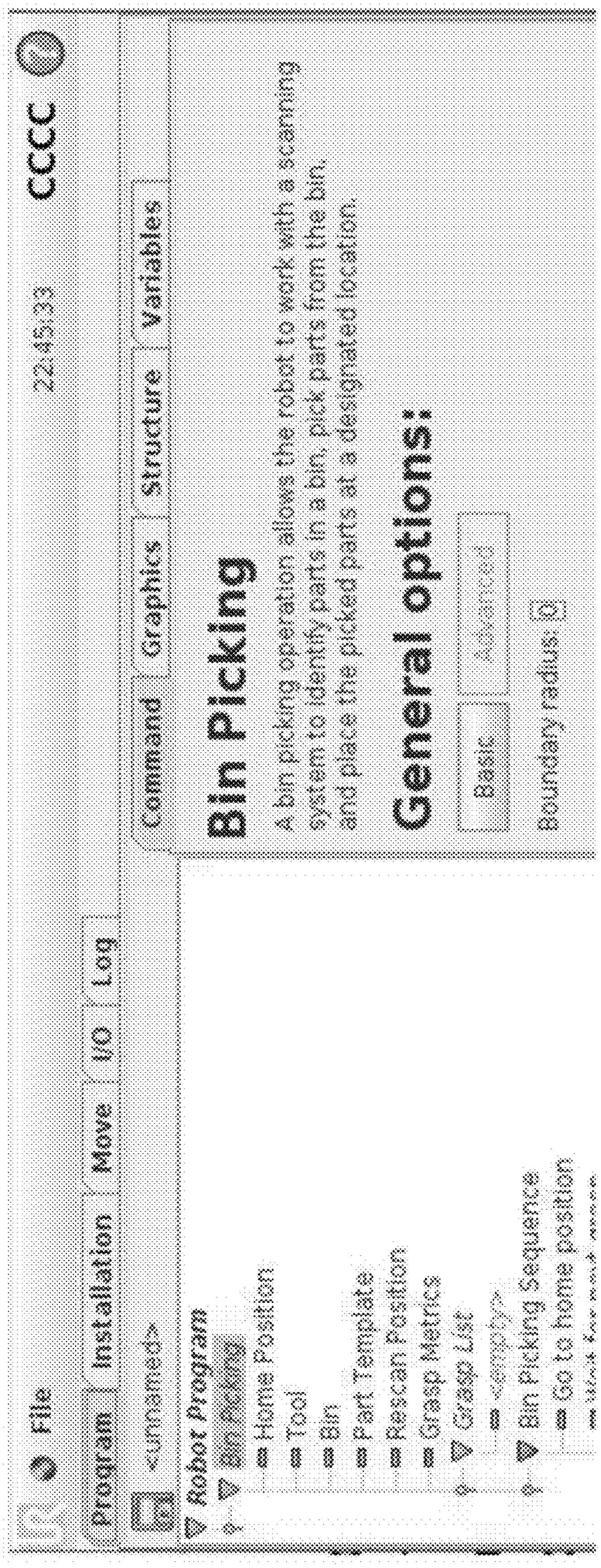
FIG. 11 is a graphical user interface for generating a program template according to an embodiment of the present disclosure.

Referring now to FIG. 10, a graphical user interface for generating a program template is provided. The user can edit the basic program options by selecting the "Basic" tab. This includes setting the option to complete a rescan or not, check for collisions in the bin, and others. As shown in FIG. 11, the user may select the advanced tab and edit additional parameters. This may include the collision detection radius for non-picked workpieces.

Figure 12:
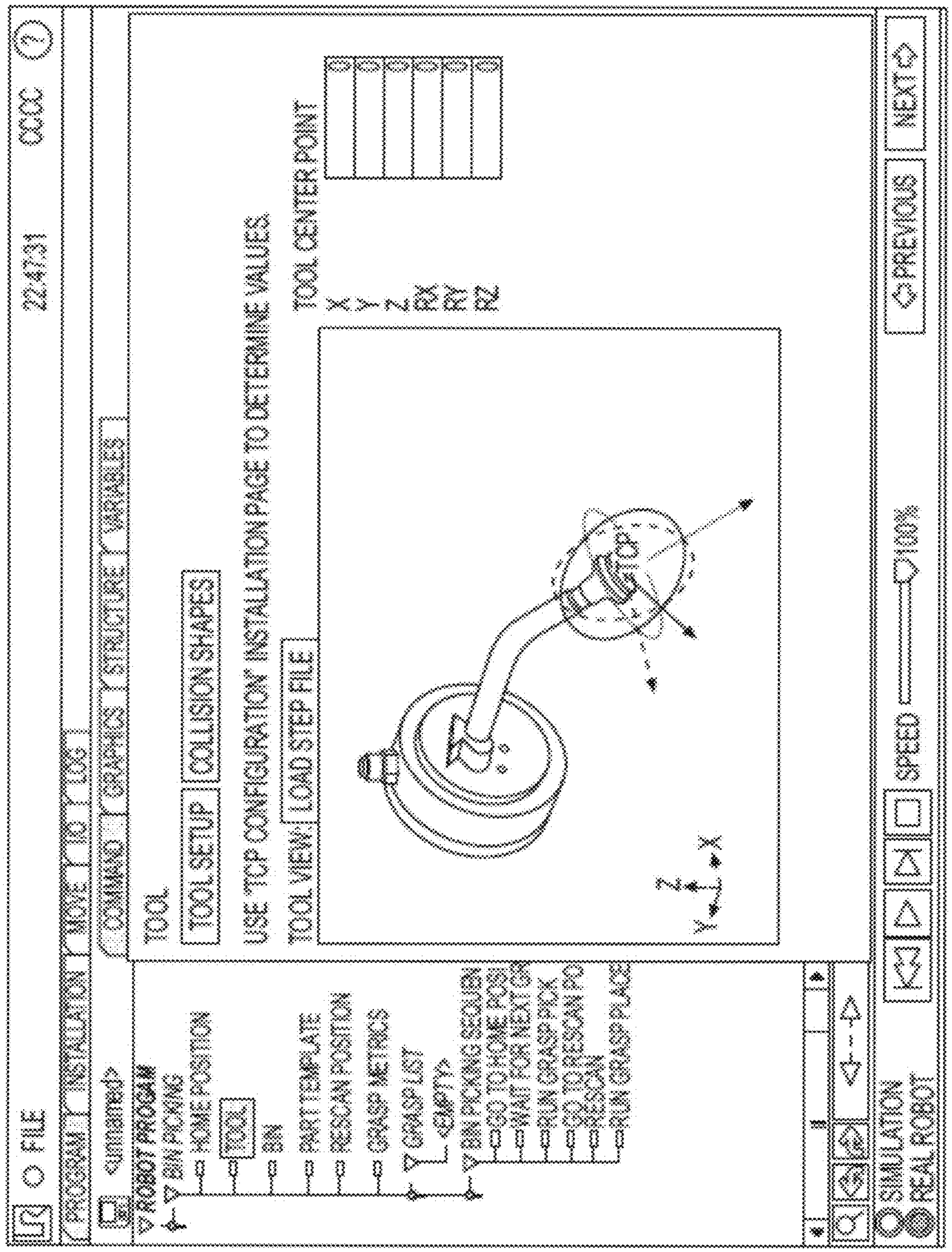
FIG. 12 is a graphical user interface that allows for configuring the EOAT according to an embodiment of the present disclosure.

Referring now to FIG. 12, a graphical user interface that allows for configuring the EOAT is provided. The user may configure the EOAT by first clicking on the "Tool" node in the program tree.

Figure 13:
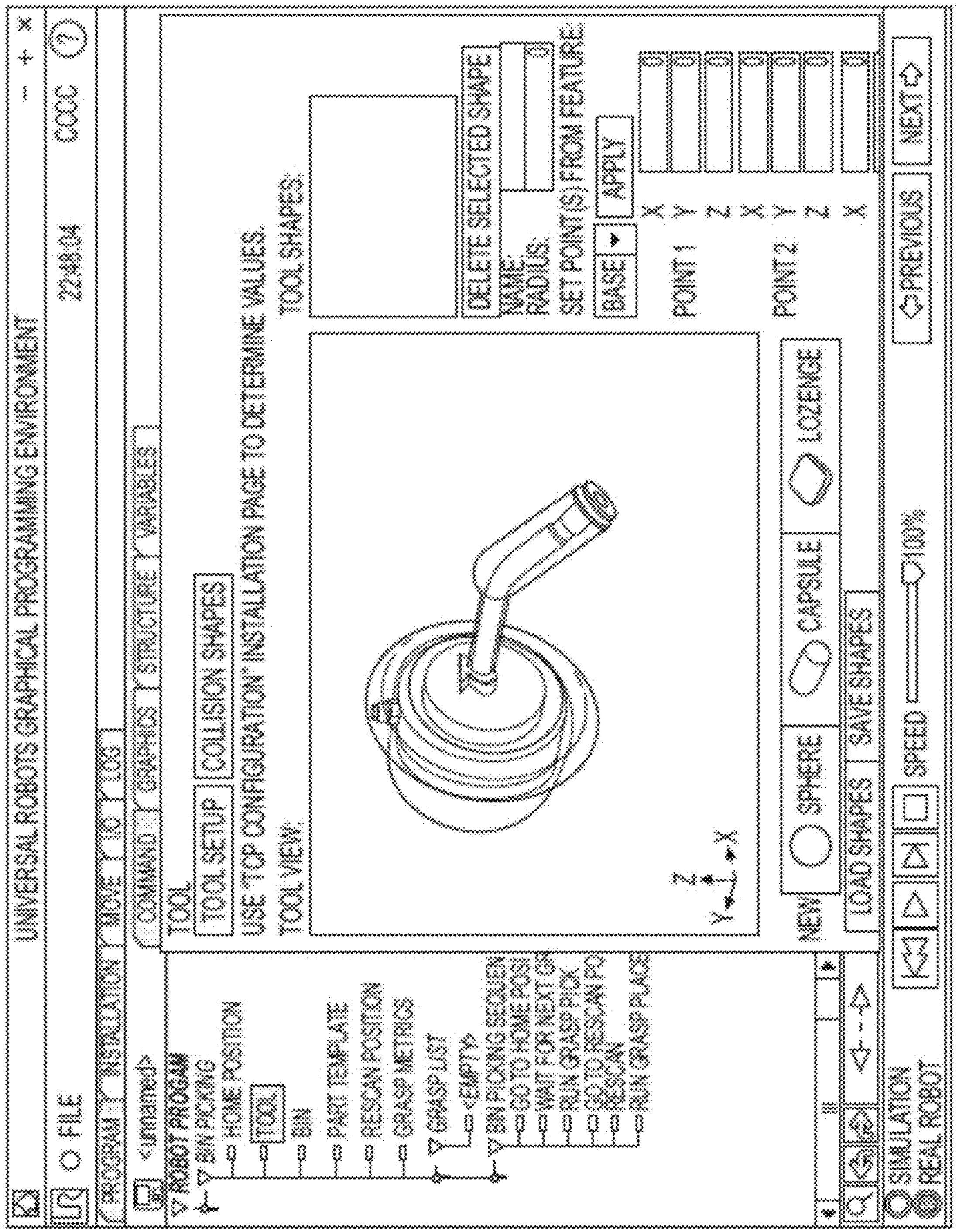
FIG. 13 is a graphical user interface that allows for the configuration of tool collision shapes according to an embodiment of the present disclosure.

Referring now to FIG. 13, a graphical user interface that allows for the configuration of tool collision shapes is provided. The tool collision shapes may be configured in an editor that is like the one used for the environment collision shapes. The tool and the shapes may be rendered constantly, and the user can rotate and zoom to see the shapes as they are edited.

Figure 14:
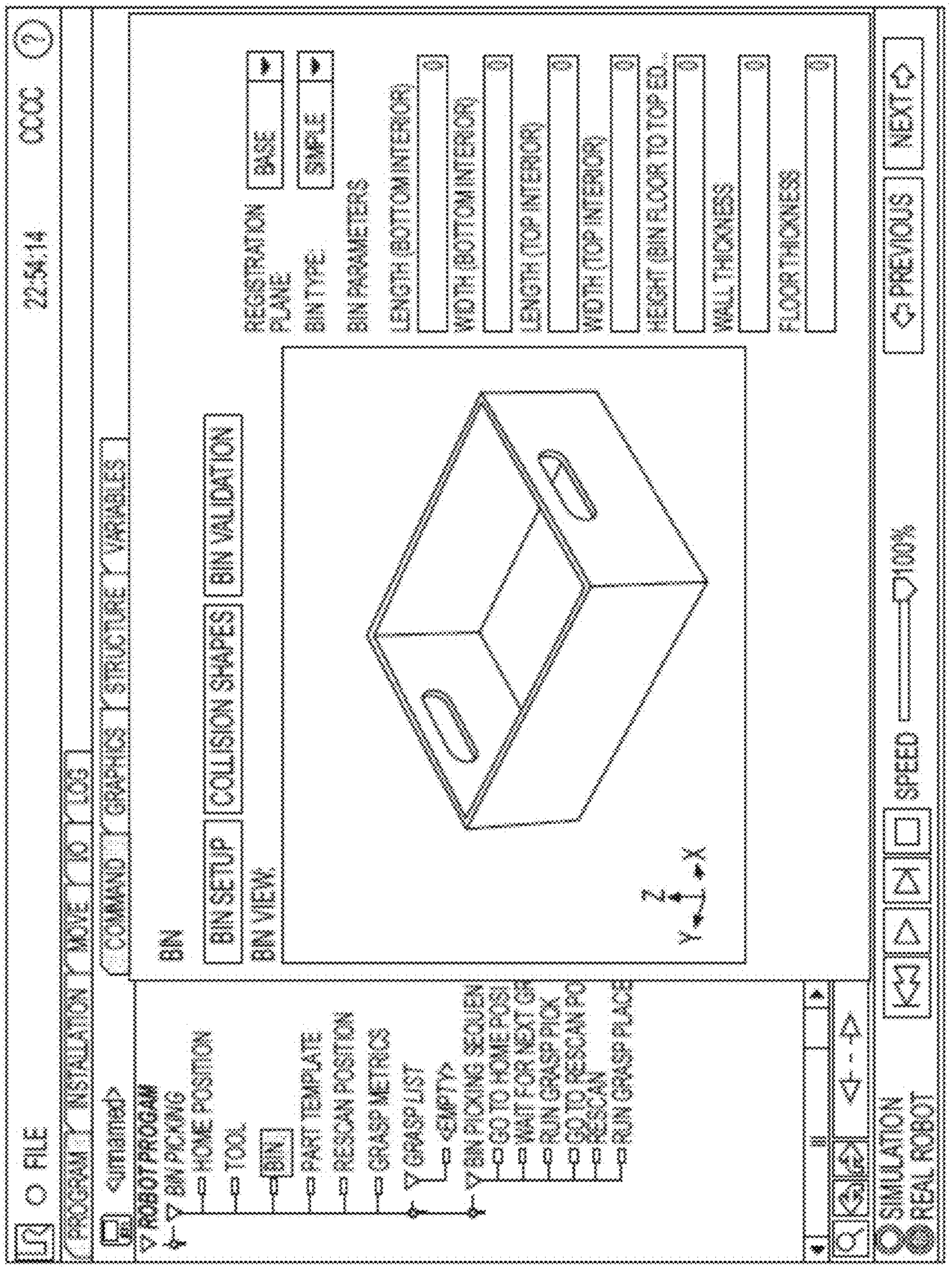
FIG. 14 is a graphical user interface that allows for bin configuration according to an embodiment of the present disclosure.

Referring now to FIG. 14, a graphical user interface that allows for bin configuration is provided. The user may configure the bin by clicking on the "Bin" node in the program tree.

Figure 15:
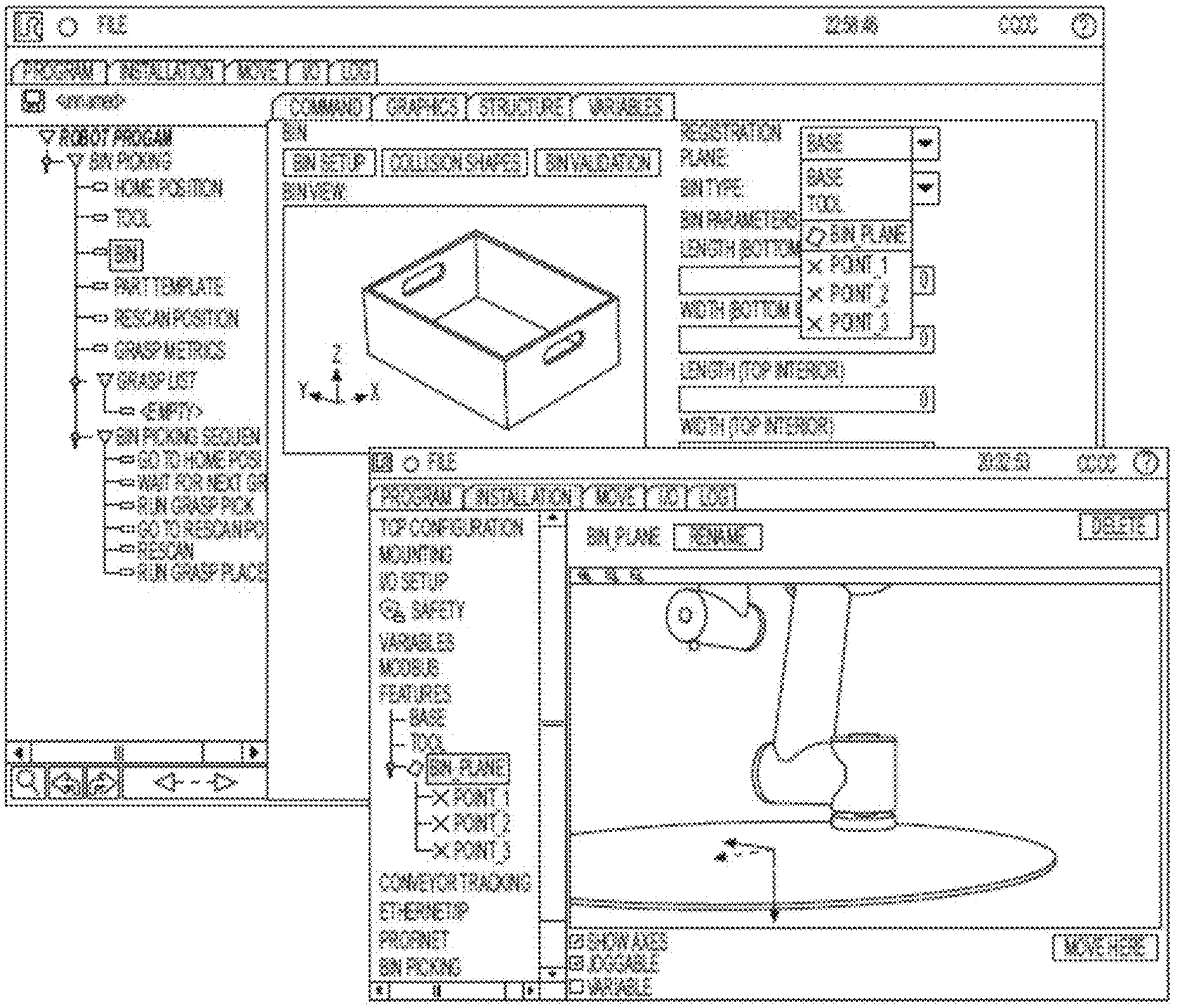
FIG. 15 is a graphical user interface that allows for bin registration according to an embodiment of the present disclosure.

Referring now to FIG. 15, a graphical user interface that allows for bin registration is provided. The bin may be registered with respect to the base of the robot. The user may first define a UR Feature plane from touching off the EOAT TCP on three corners of the bin. This plane may then be selected in the Bin node "Registration plane" drop down.

Figure 16:
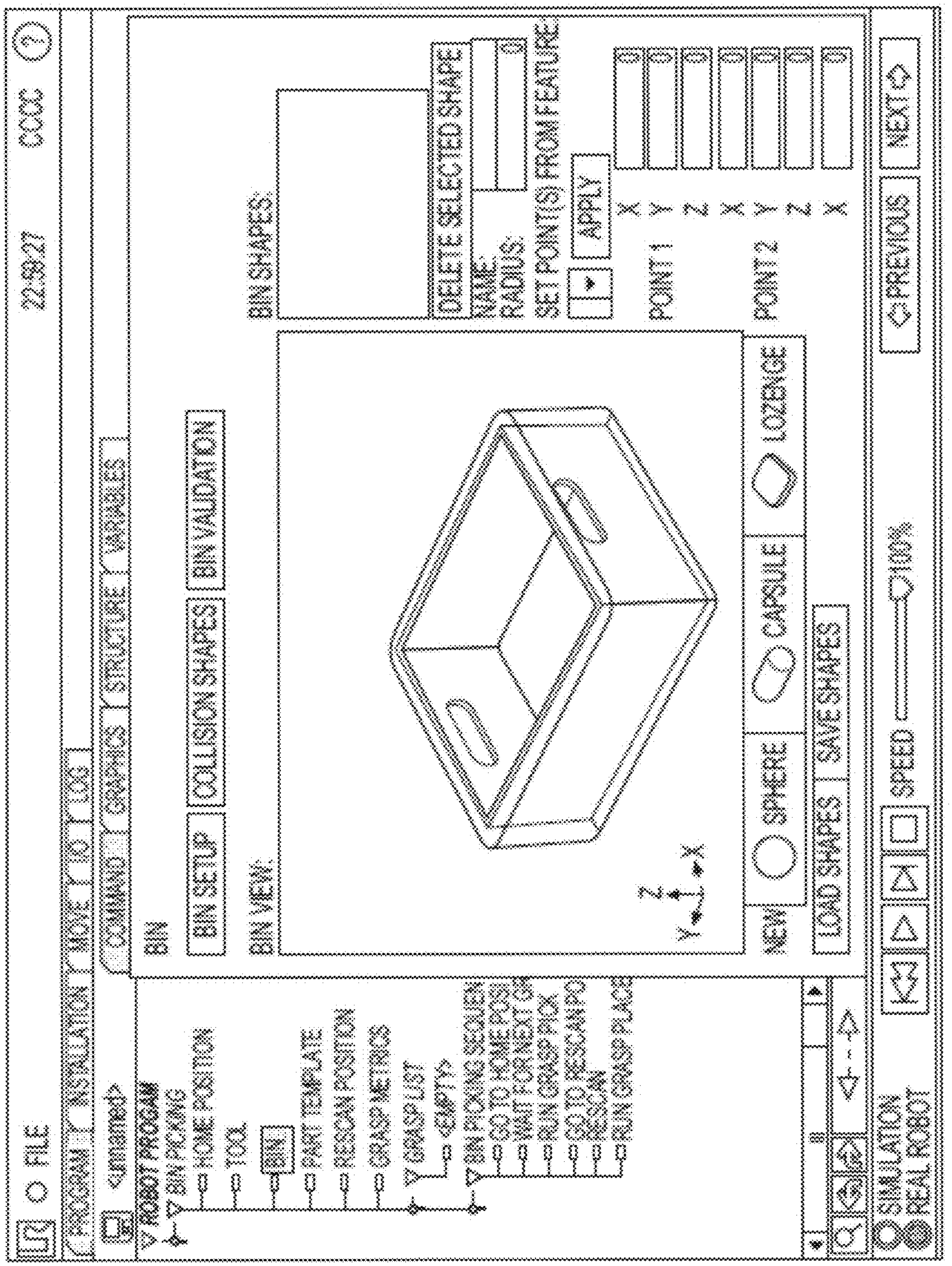
FIG. 16 is a graphical user interface that allows for configuration of bin collision shapes according to the present disclosure.

Referring now to FIG. 16, a graphical user interface that allows for configuration of bin collision shapes is provided. The collision shapes of the bin are configured next using a dialog similar to the Environment, Tool, and Workpiece nodes.

Figure 17:
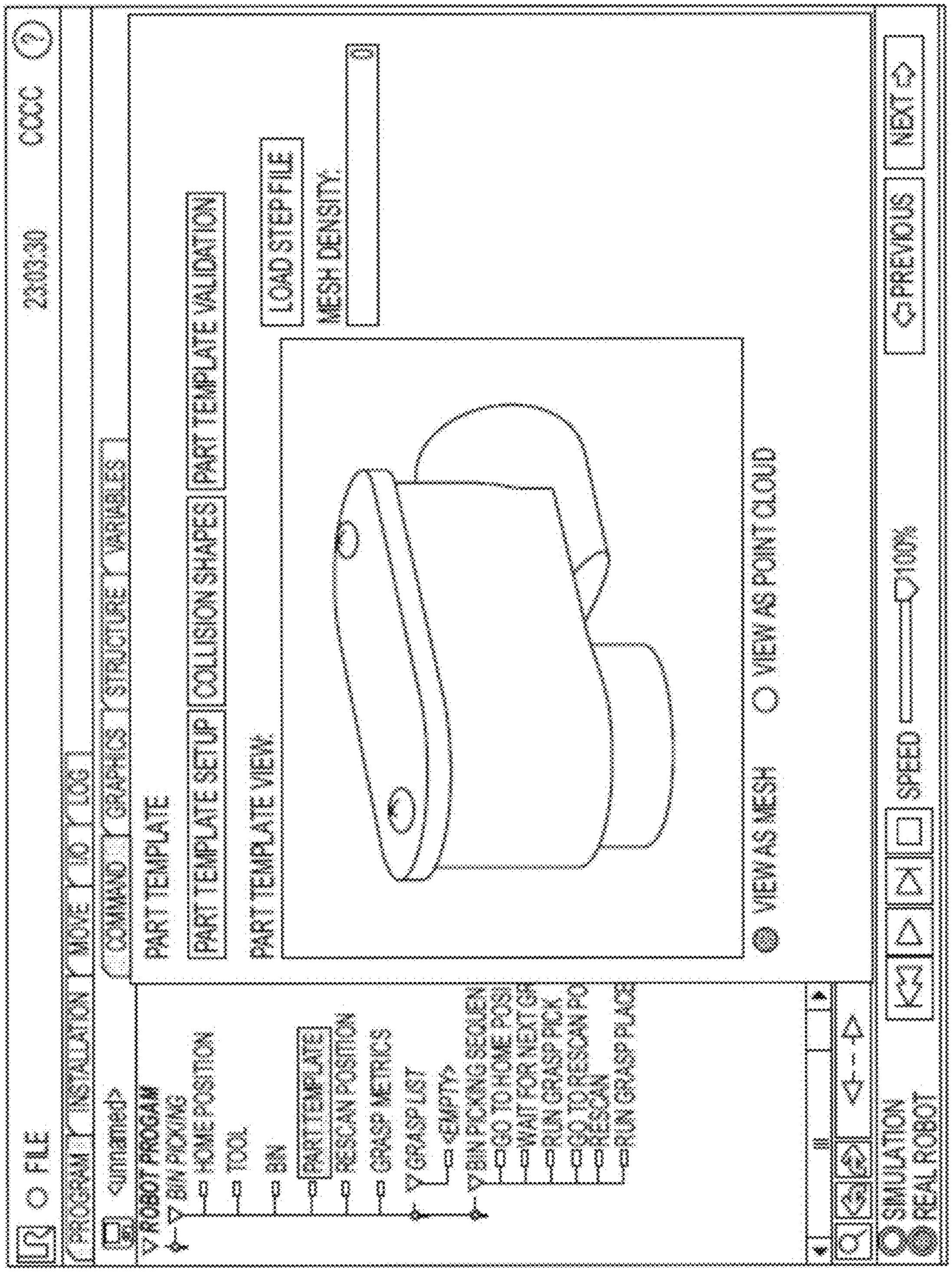
FIG. 17 is a graphical user interface that allows for configuring the workpiece and loading a workpiece model according to an embodiment of the present disclosure.

Referring now to FIG. 17, a graphical user interface that allows for configuring the workpiece and loading a workpiece model is provided. The user may configure the workpiece to be picked by clicking on the "Part Template" node in the program tree. The user may load the workpiece CAD model from a file on the bin picking system. The CAD model may be converted to a mesh file for rendering and point cloud for pose detection. The user may view the workpiece template in the render window to verify that it was loaded and converted correctly.

Figure 18:
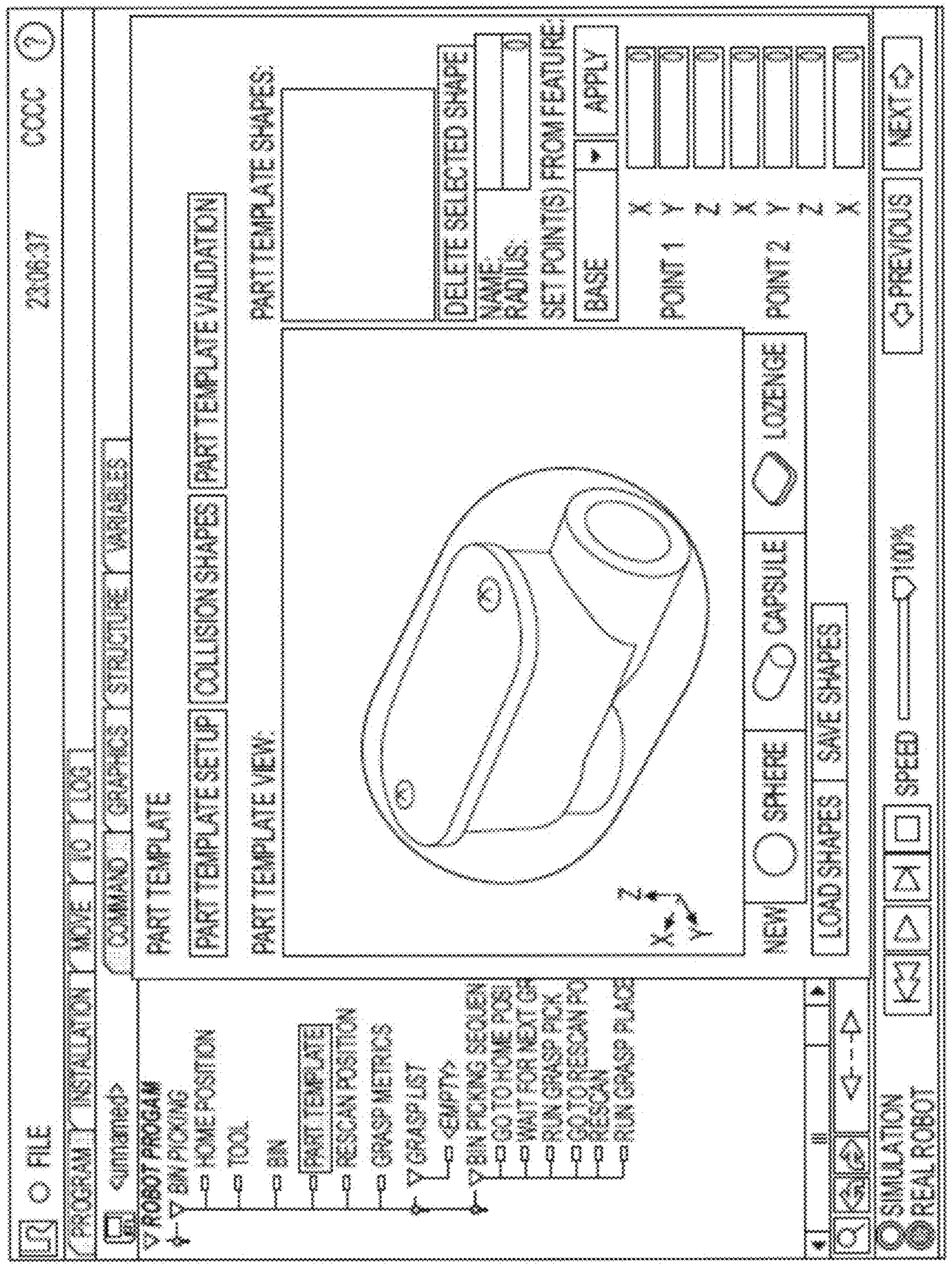
FIG. 18 is a graphical user interface that allows for configuring workpiece collision shapes according to an embodiment of the present disclosure.

Referring now to FIG. 18, a graphical user interface that allows for configuring workpiece collision shapes is provided. The user may configure the collision shapes for the workpiece. These shapes are used to detect and avoid collisions between the workpiece and the environment after the workpiece has been picked.

Figure 19:
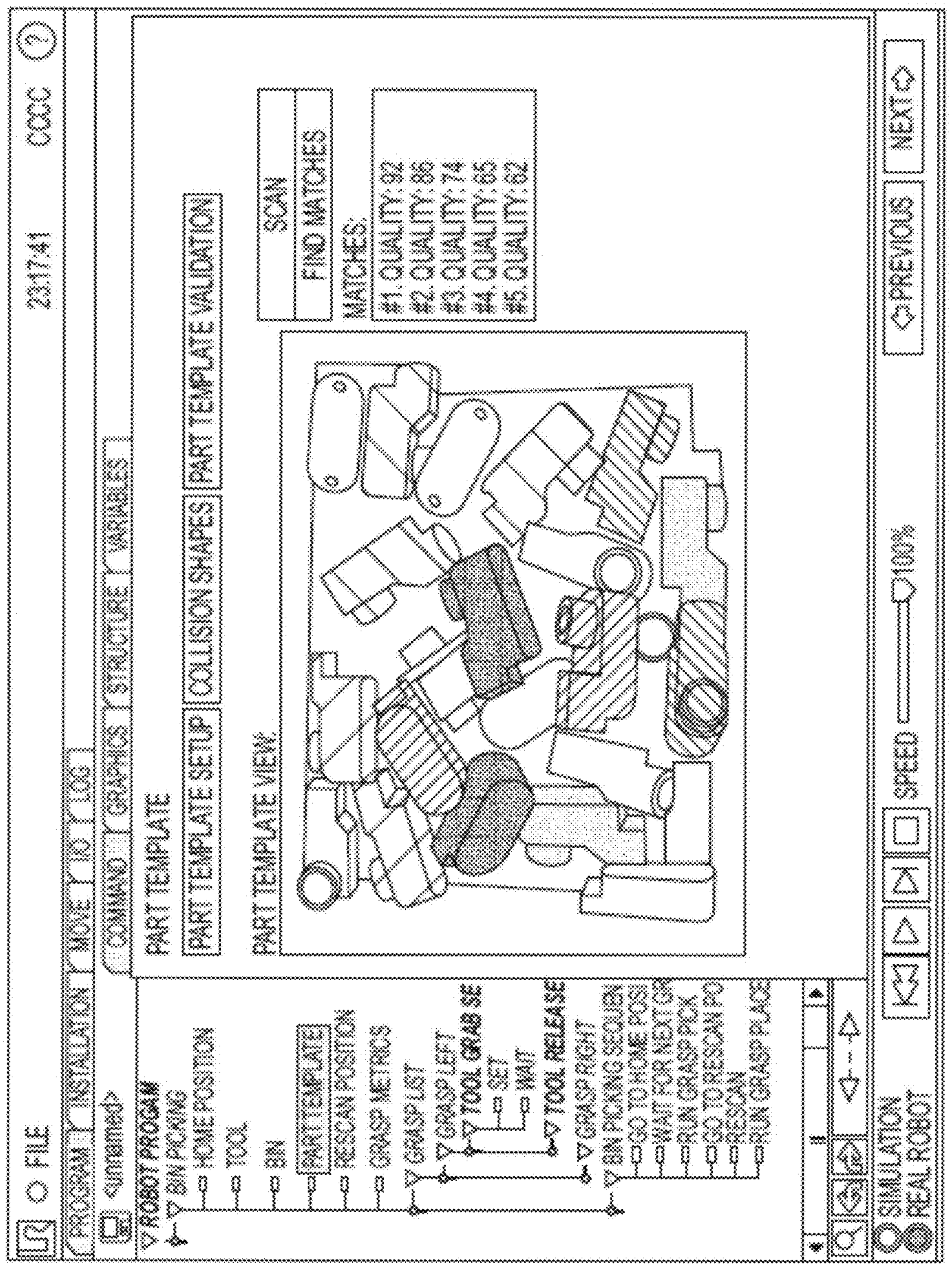
FIG. 19 is a graphical user interface that allows for validation of workpiece detection according to an embodiment of the present disclosure.

Referring now to FIG. 19, a graphical user interface that allows for validation of workpiece detection is provided. The user may validate the workpiece configuration by adding parts to the bin then triggering a scan and detection to find matches. The detection results may be rendered and displayed in a list.

Figure 20:
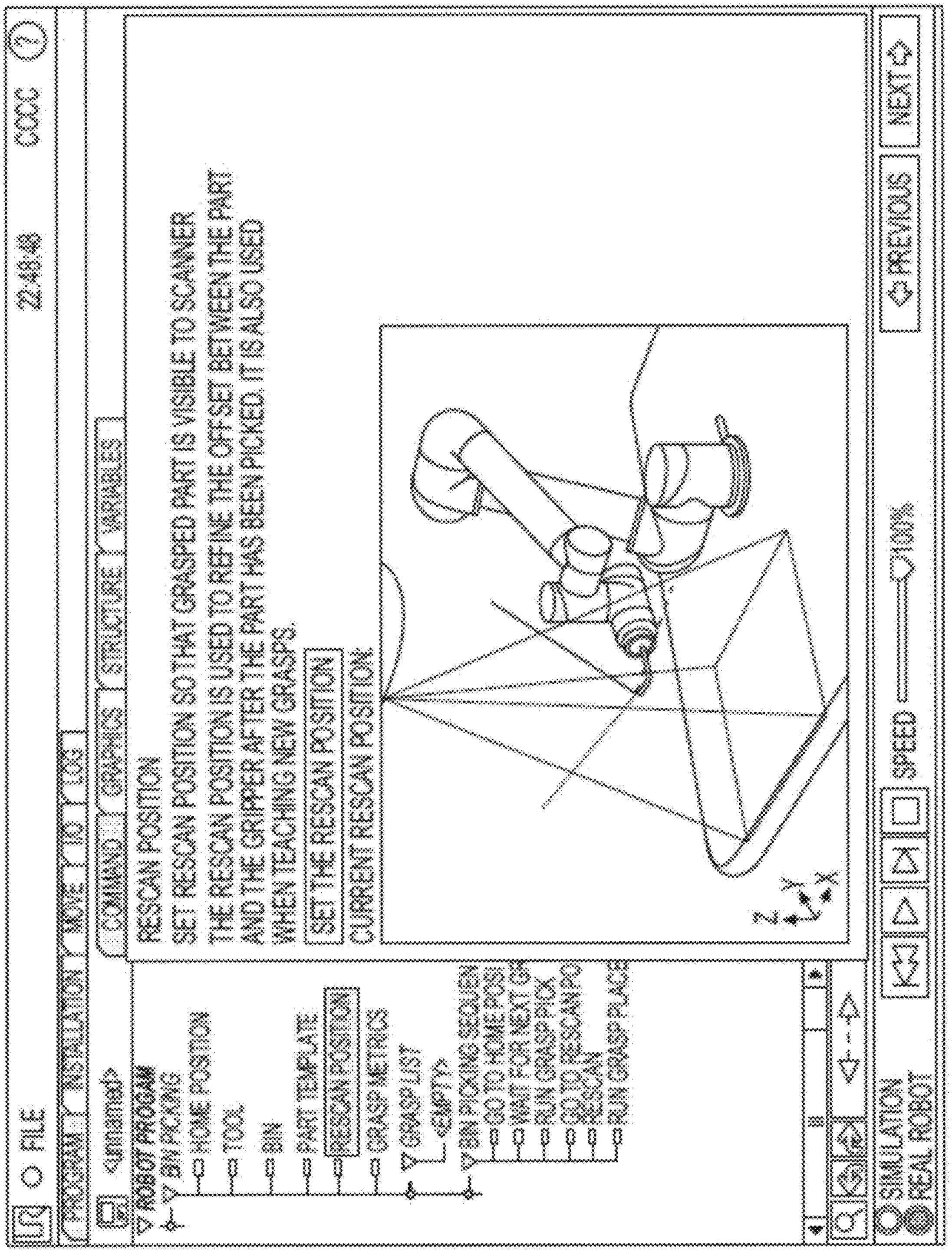
FIG. 20 is a graphical user interface that allows for rescan position configuration according to an embodiment of the present disclosure.

Referring now to FIG. 20, a graphical user interface that allows for rescan position configuration is provided. The user may set the rescan position of the robot next. This is the position that may be used for training grasp points and for rescanning while picking (if that option is enabled).

Figure 21:
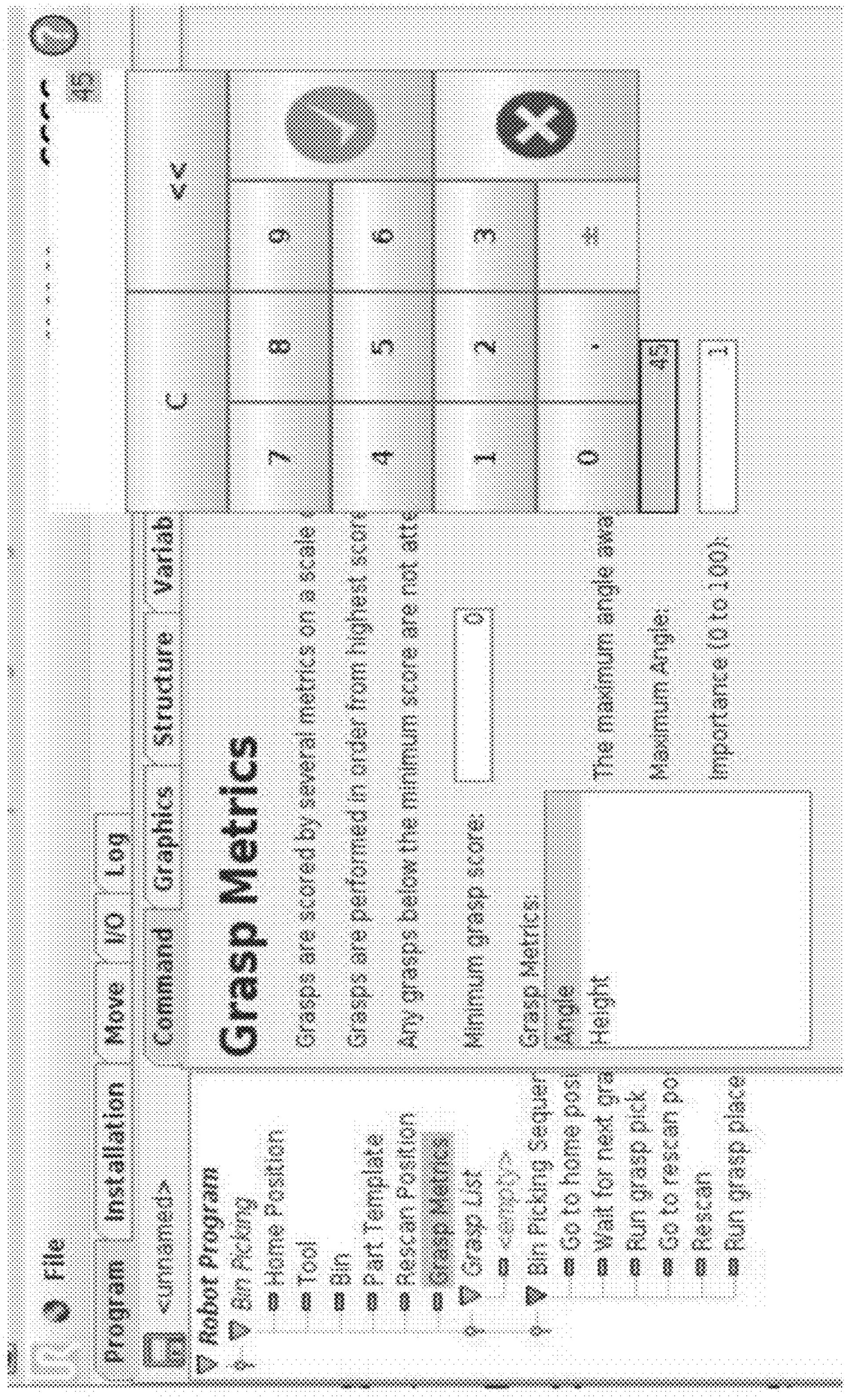
FIG. 21 is a graphical user interface that allows for configuring grasping hierarchy and/or grasp selection metrics according to an embodiment of the present disclosure.
Figure 22:
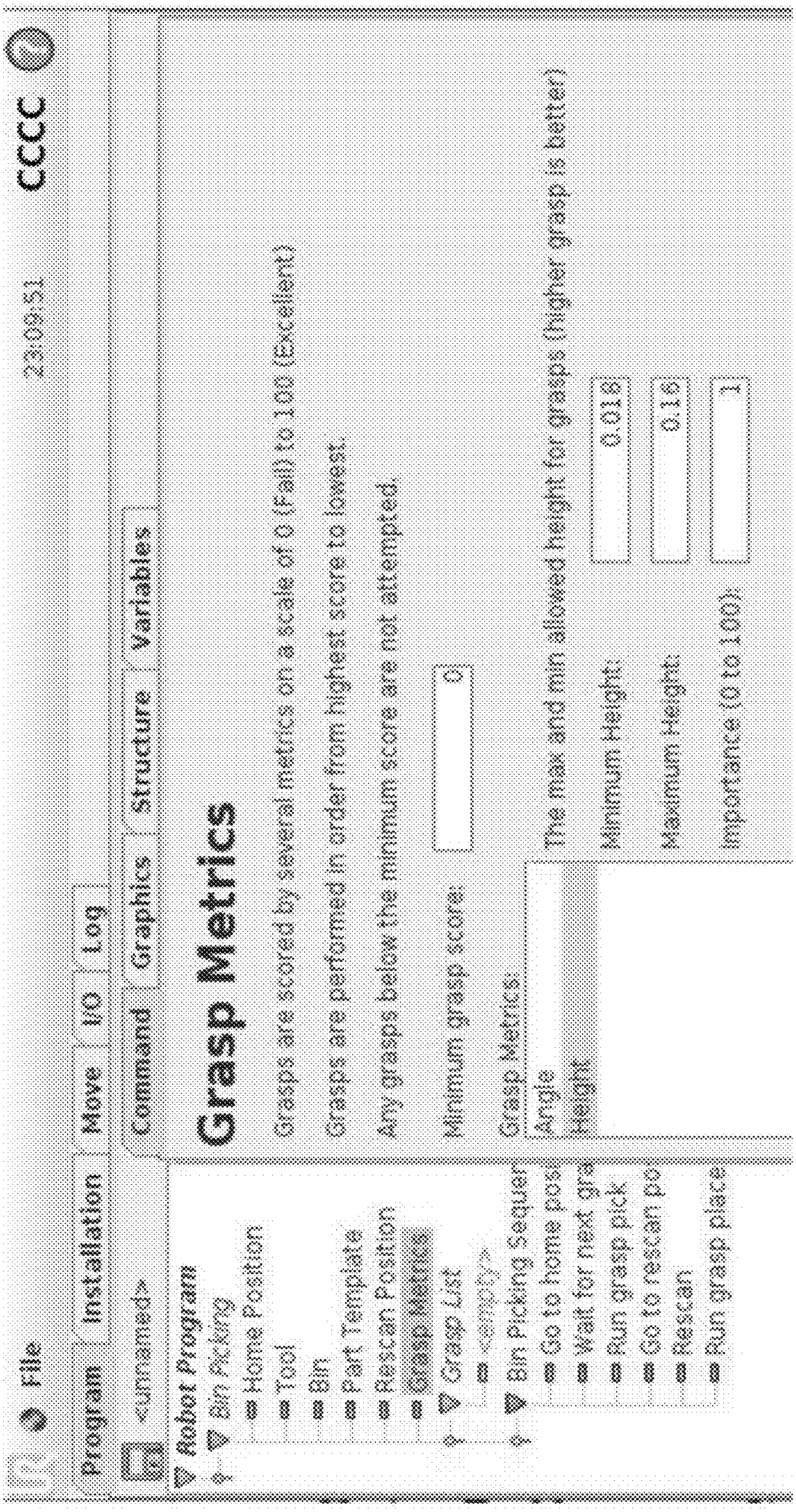
FIG. 22 is a graphical user interface that allows for configuring grasping hierarchy and/or grasp selection metrics according to an embodiment of the present disclosure.

Referring now to FIGS. 21-22, graphical user interfaces that allow for configuring grasping hierarchy and/or grasp selection metrics are provided. The user may configure the grasping hierarchy including grasp metrics, grasp points and offsets, and placement points and offsets next. The grasp selection metrics define how the program picks which grasp to use when several are possible. The user can select the grasp metric from a list and edit parameters for each.

Figure 23:
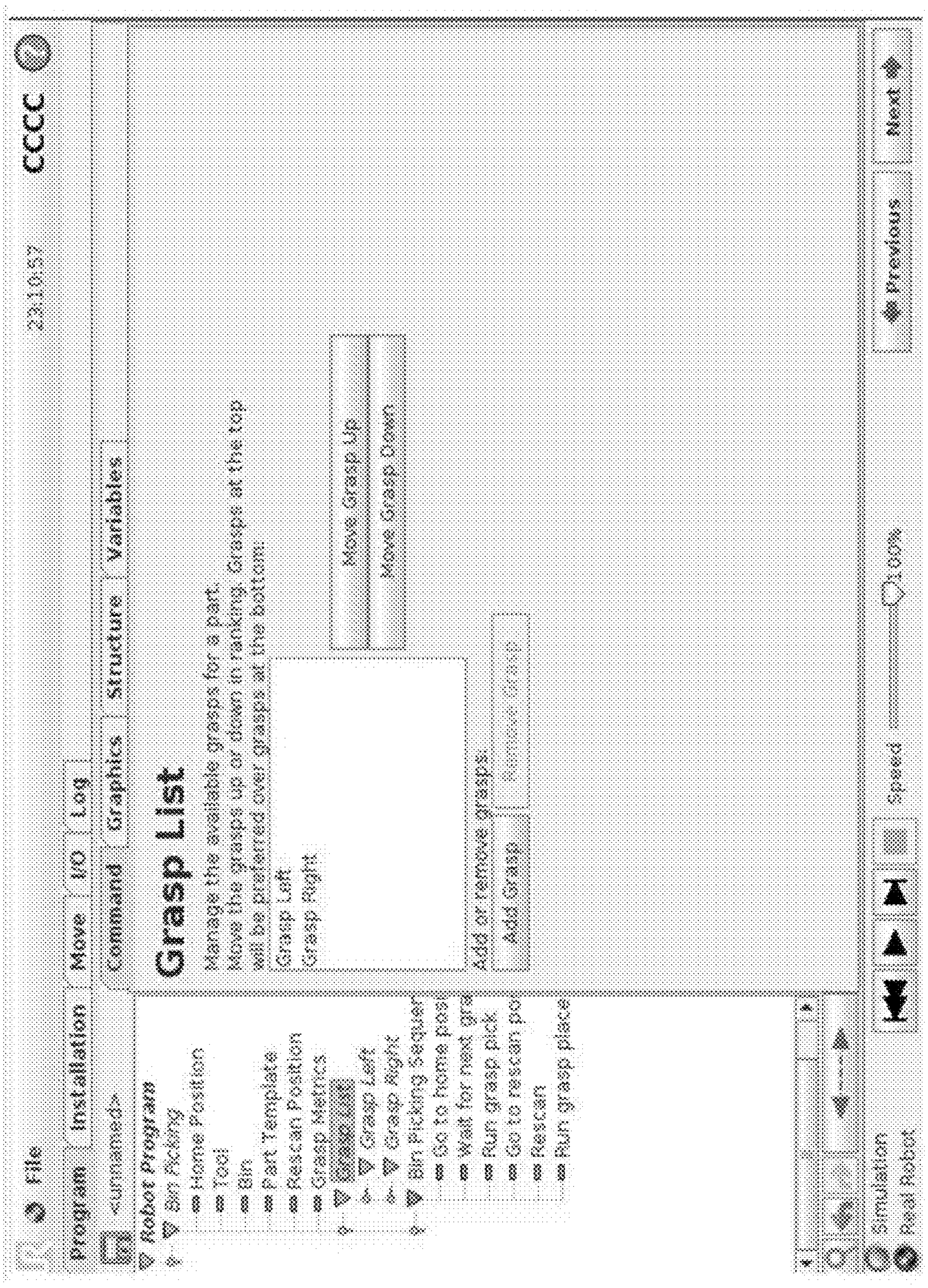
FIG. 23 is a graphical user interface that allows for adding and/or arranging grasps according to an embodiment of the present disclosure.

Referring now to FIG. 23, graphical user interface that allows for adding and/or arranging grasps is provided. The user can add and arrange grasps in the hierarchy. The Grasp List may define the order of priority to use when evaluating grasps. Grasps can be added and removed by clicking the Add Grasp and Remove grasp buttons. Grasps can be selected in the list by a click. The selected grasp can be moved up or down in the list with the provided buttons.

Figure 24:
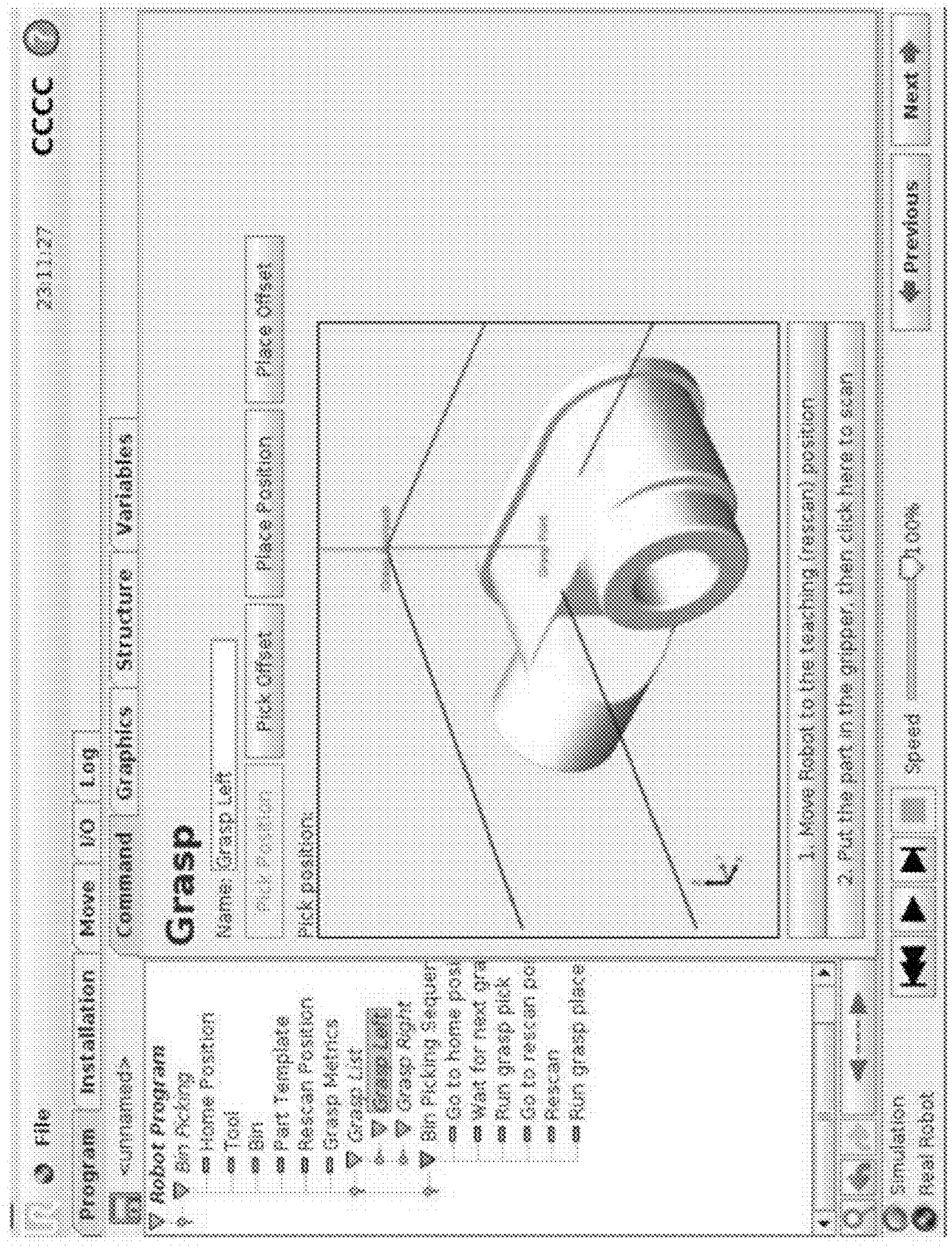
FIG. 24 is a graphical user interface that allows for training grasps and placements according to an embodiment of the present disclosure.

Referring now to FIG. 24, graphical user interface that allows for training grasps and placements is provided. The user may train the grasps and placements by clicking on a grasp node in the program tree on the left and following through the Grasp page tabs from left to right. Each grasp page may allow the user to 1) define the grasp position relative to the workpiece, 2) define the grasp offset to be used when approaching the workpiece, 3) define the placement position relative to the robot base, and 4) define the placement offset to use when approaching the placement position. The user can give each grasp a unique name by clicking in the "Name" field. The user may set the grasp pick position by following the steps shown in the dialog on the "Pick Position" tab. The pick position may refer to the point on the surface of the workpiece where the EOAT will attach. The user may click the first button to move the robot to the teaching position (rescan position). Next the user may put the workpiece in the gripper and click the second button to trigger a scan. The workpiece pose relative to the EOAT may be recorded and saved as the grasp position. The user may then switch to the pick offset tab and set the offset value.

Figure 25:
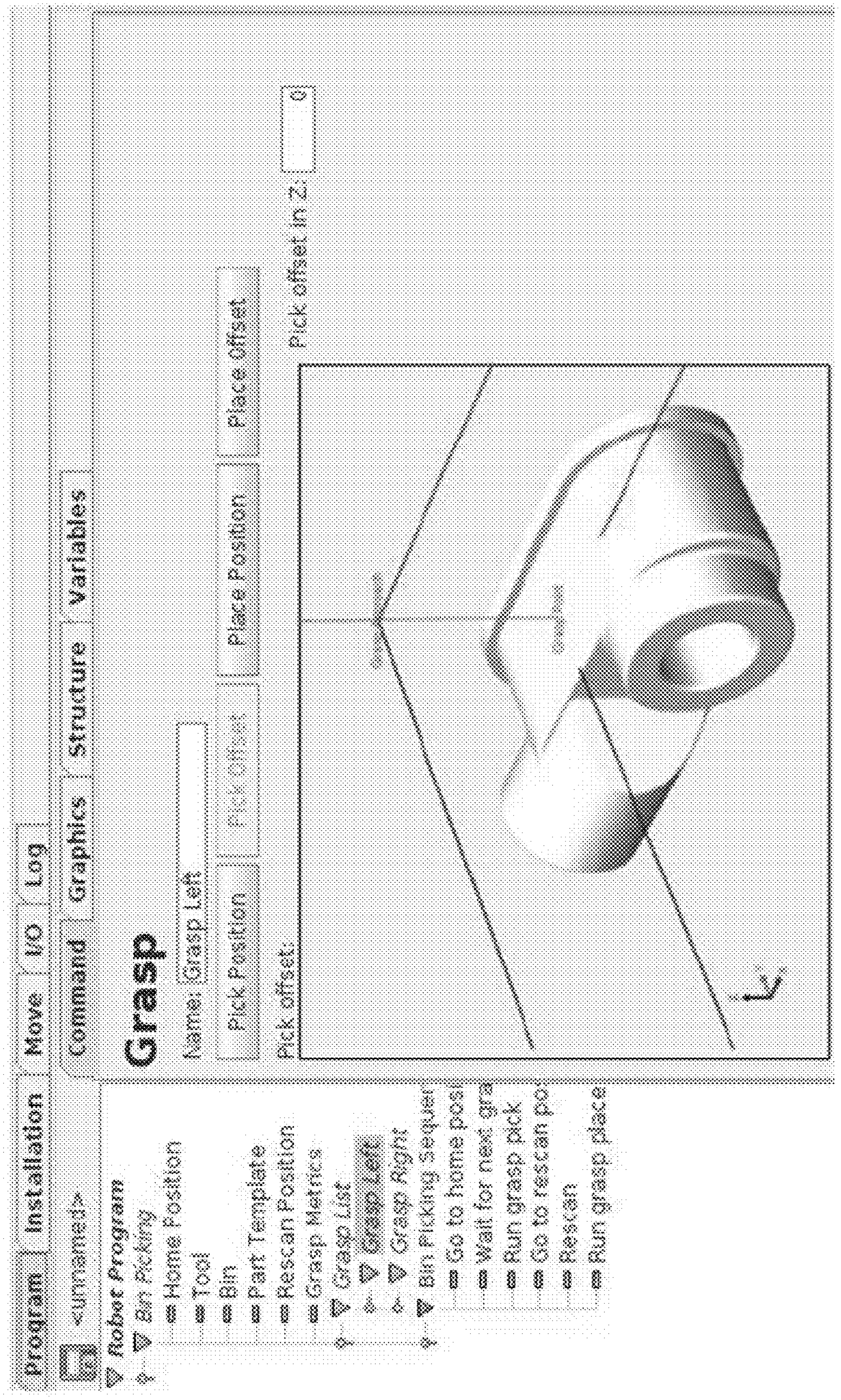
FIG. 25 is a graphical user interface that allow for training place position and offset according to an embodiment of the present disclosure.

Referring now to FIG. 25, a graphical user interface that allows for training pick position and offset is provided. The user may train the workpiece pick position and offset by following the "Pick Position" and "Pick Offset" tabs.

Figure 26:
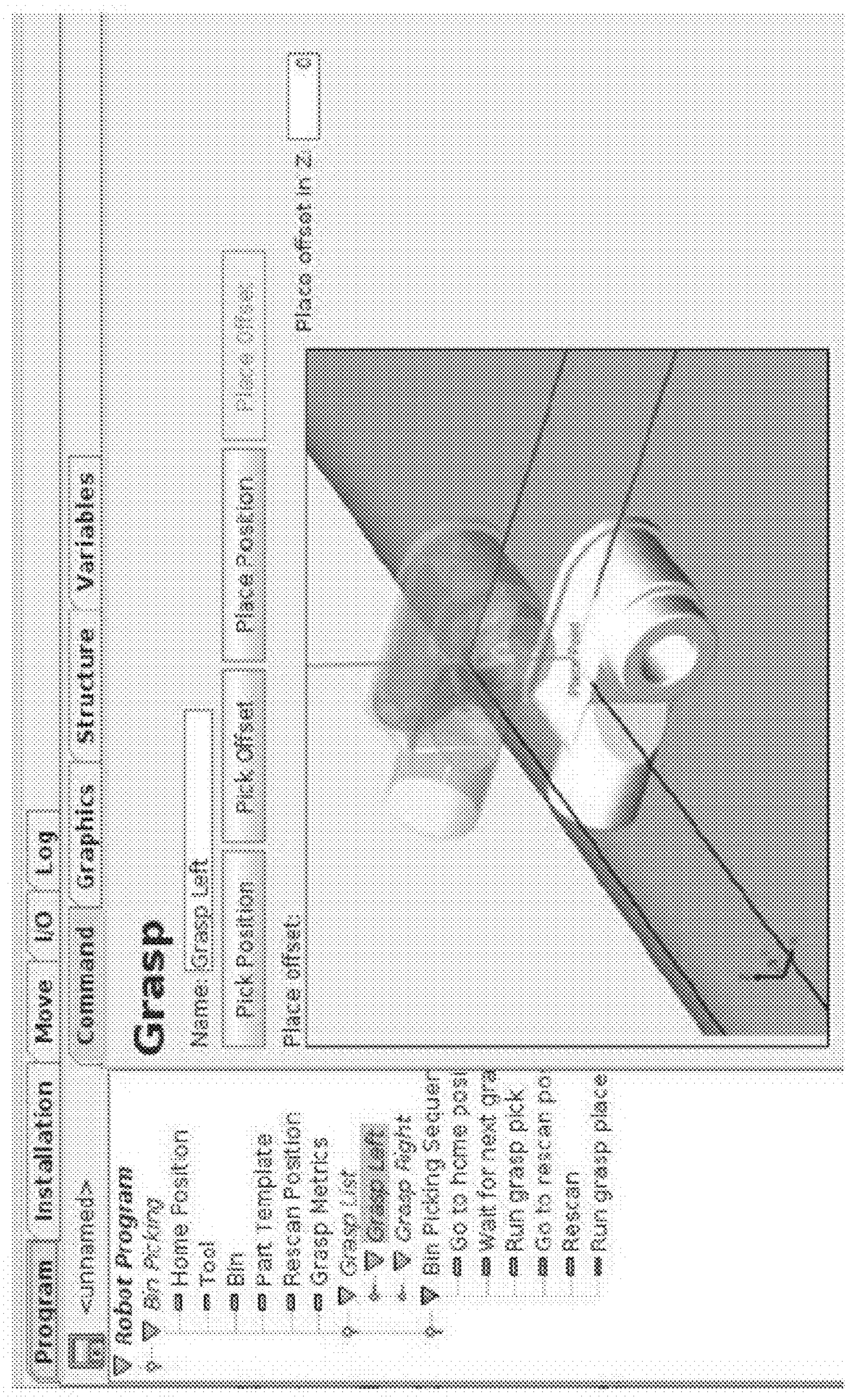
FIG. 26 is a graphical user interface that allow for training place position and offset according to an embodiment of the present disclosure.

Referring now to FIG. 26, a graphical user interface that allows for training place position and offset is provided. The user may train the workpiece place position and offset by following the "Place Position" and "Place Offset" tabs.

Figure 27:
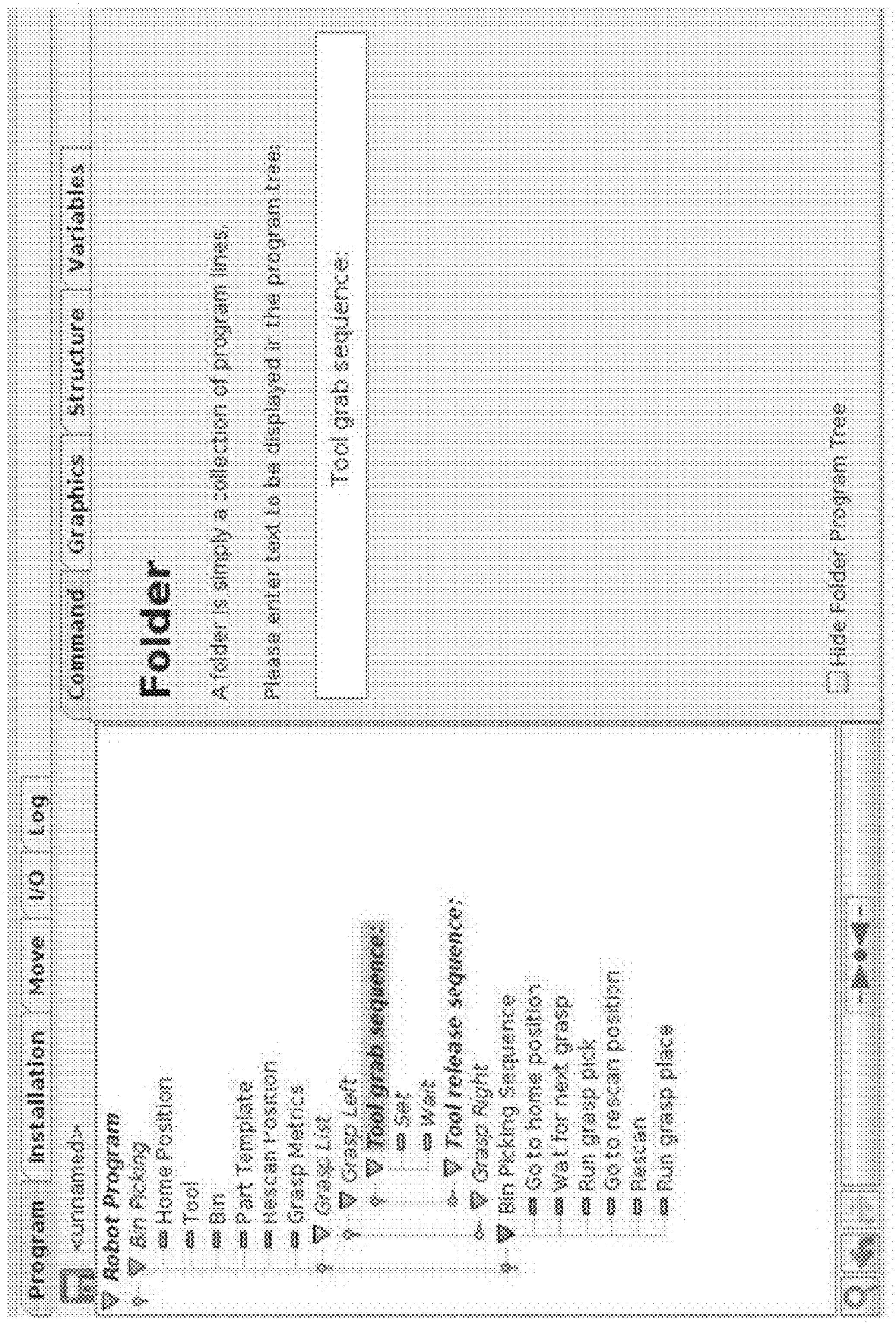
FIG. 27 is a graphical user interface that allows for configuring the grab and release sequences according to an embodiment of the present disclosure.

Referring now to FIG. 27, a graphical user interface that allows for configuring the grab and release sequences is provided. The user may add program structure nodes to the grab and release sequence folders to define the EOAT actions to take to actuate the EOAT. The default nodes in each sequence may include a Set and a Wait node. These folders may be where a user may add the EOAT specific nodes that can include those provided by other URCaps.

Figure 28:
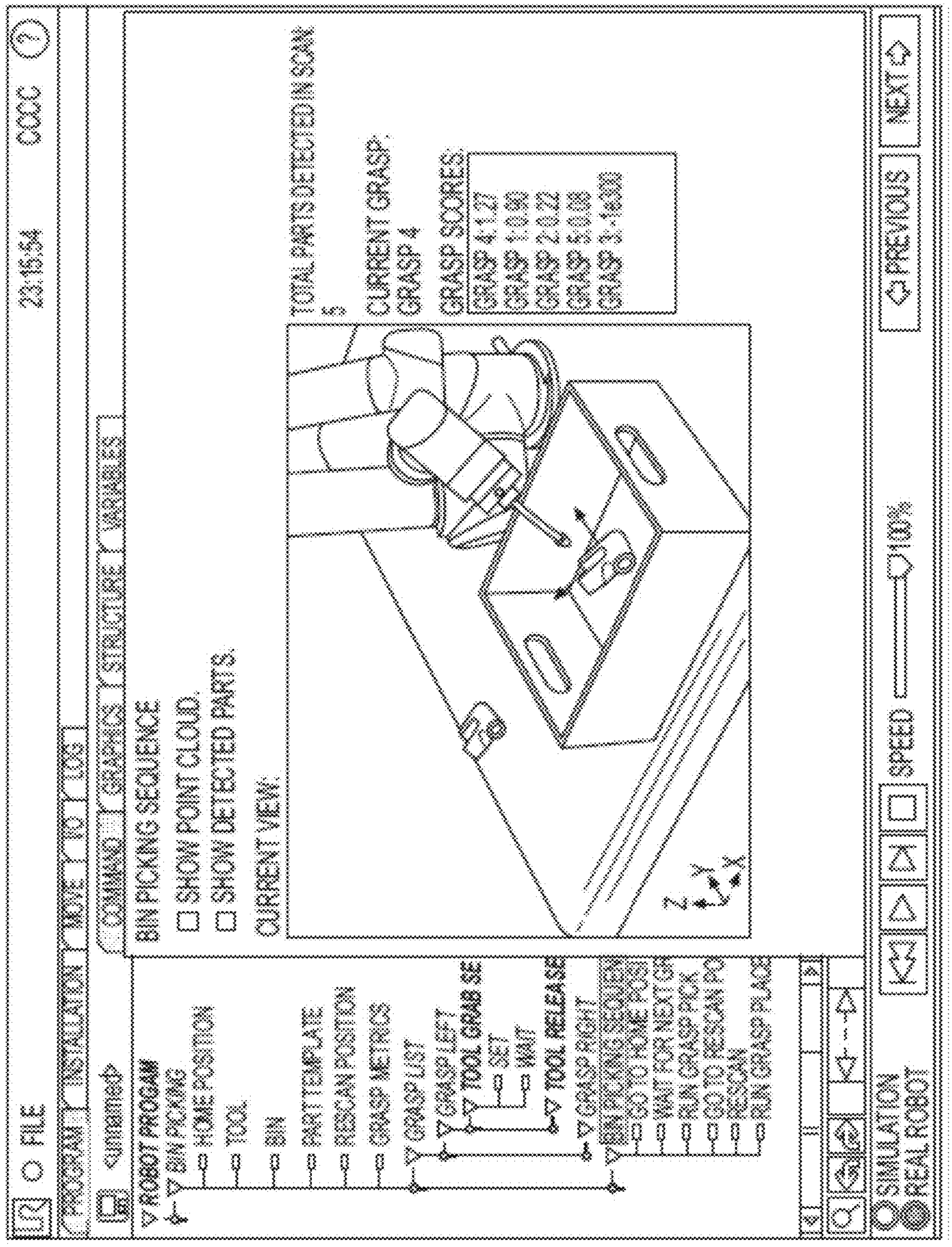
FIG. 28 is a graphical user interface that allows for system operation according to an embodiment of the present disclosure.

Referring now to FIG. 28, a graphical user interface that allows for system operation is provided. The user can now test, tune, and run the program. To view the bin picking system state information the user can click on the "Bin Picking Sequence" node in the program tree. This node page may show a rendered view of the bin picking system along with point cloud overlays for the scan and detected parts. The user may run the program using the standard UR play pause and stop buttons. The program operation can be reset by clicking the stop button followed by the play button. The user may monitor the bin picking system status by viewing the "Bin Picking Sequence" node page. The selected grasp may be rendered in the "Current View" window and its ID will be displayed left of this window.

Figure 29:
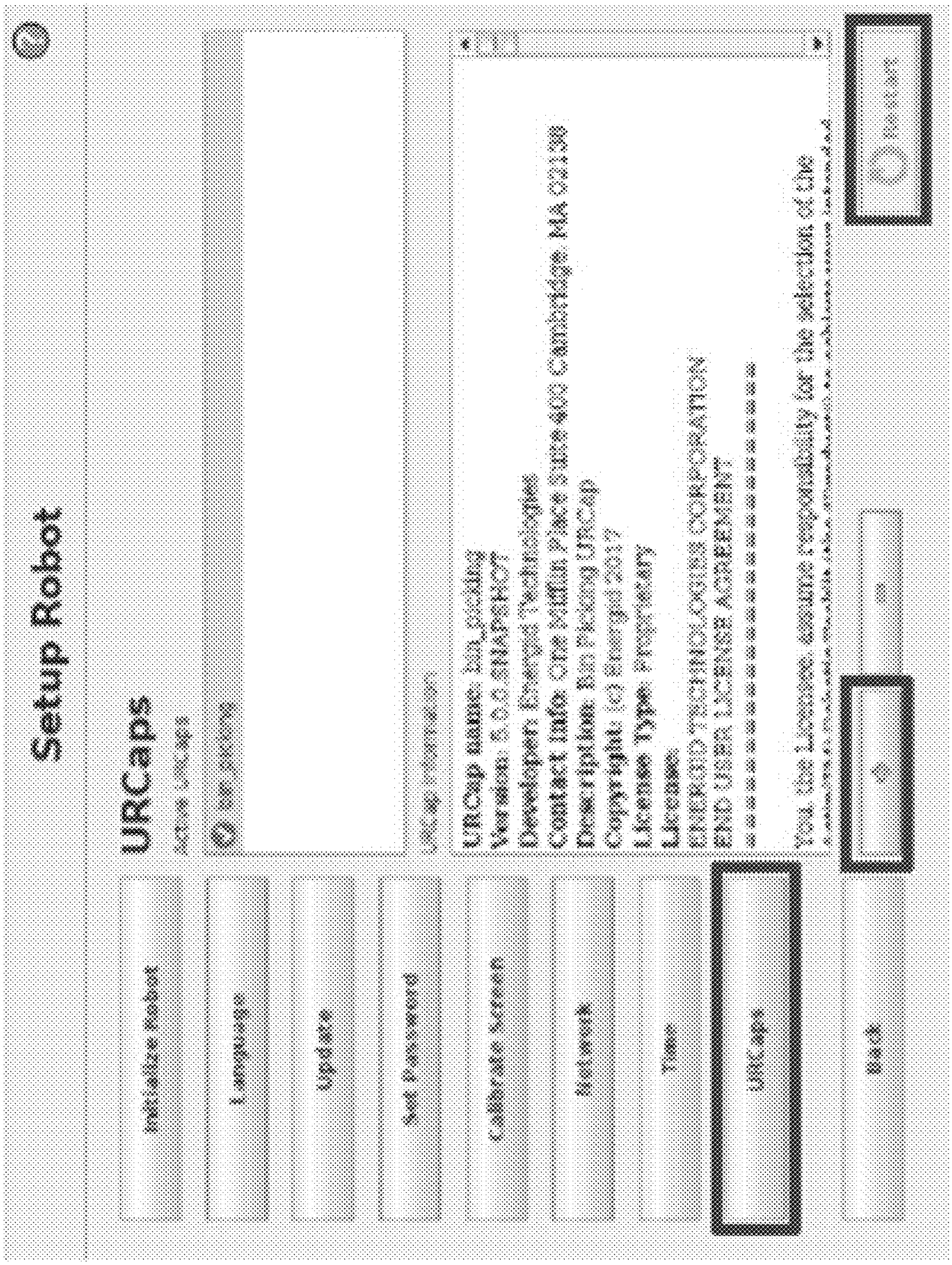
FIG. 29 is a graphical user interface that may allow a user to install the bin picking URCap from a USB drive or other suitable device according to an embodiment of the present disclosure.

In some embodiments, a graphical user interface may allow a user to setup a robot. Once the setup robot option has been selected, the graphical user interface as shown in FIG. 29 may allow a user to install the bin picking URCap from a USB drive or other suitable device. The user may select "URCaps" and "+" to load the URCap file. The robot may be restarted after installation.

Figure 30:
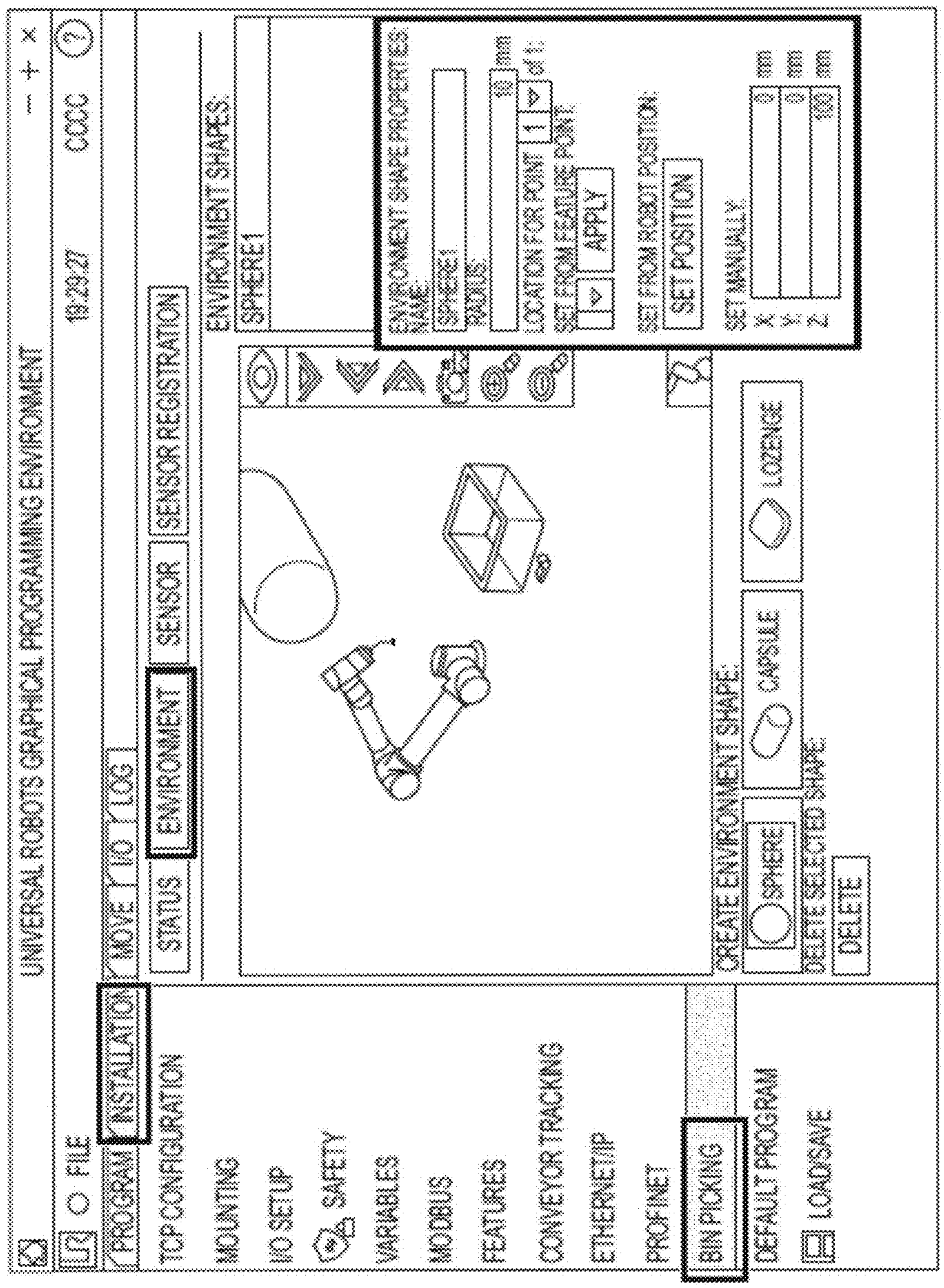
FIG. 30 is a graphical user interface that allows a user to configure the environment according to an embodiment of the present disclosure.

Referring now to FIG. 30, a graphical user interface that allows a user to configure the environment is provided. In this example, the user may select "environment" and then create and save collision shapes. For example, sphere-1 point, capsule-2 points, lozenge-3 points, etc. In some embodiments, points may be defined in numerous ways. Some of which may include, but are not limited to, set from feature point, set from robot positions, set manually, etc.

Figure 31:
FIG. 31 is a graphical user interface that allows a user to configure a sensor according to an embodiment of the present disclosure.
Figure 32:
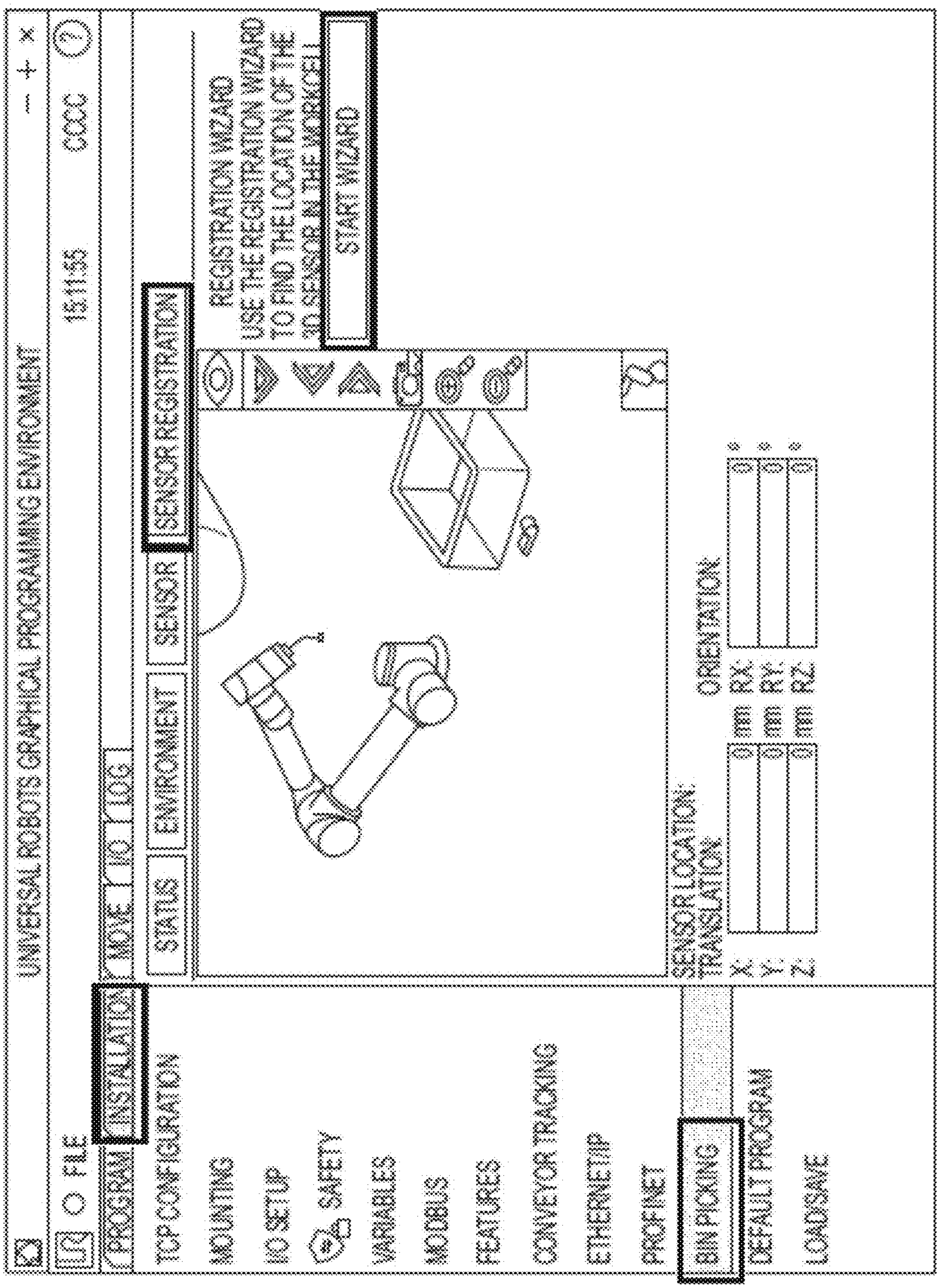
FIG. 32 is a graphical user interface that allows a user to register a sensor according to an embodiment of the present disclosure.

Referring now to FIG. 31, a graphical user interface that allows a user to configure a sensor is provided. In some embodiments the user may select a sensor from the drop-down menu and configure its settings.

Figure 33:
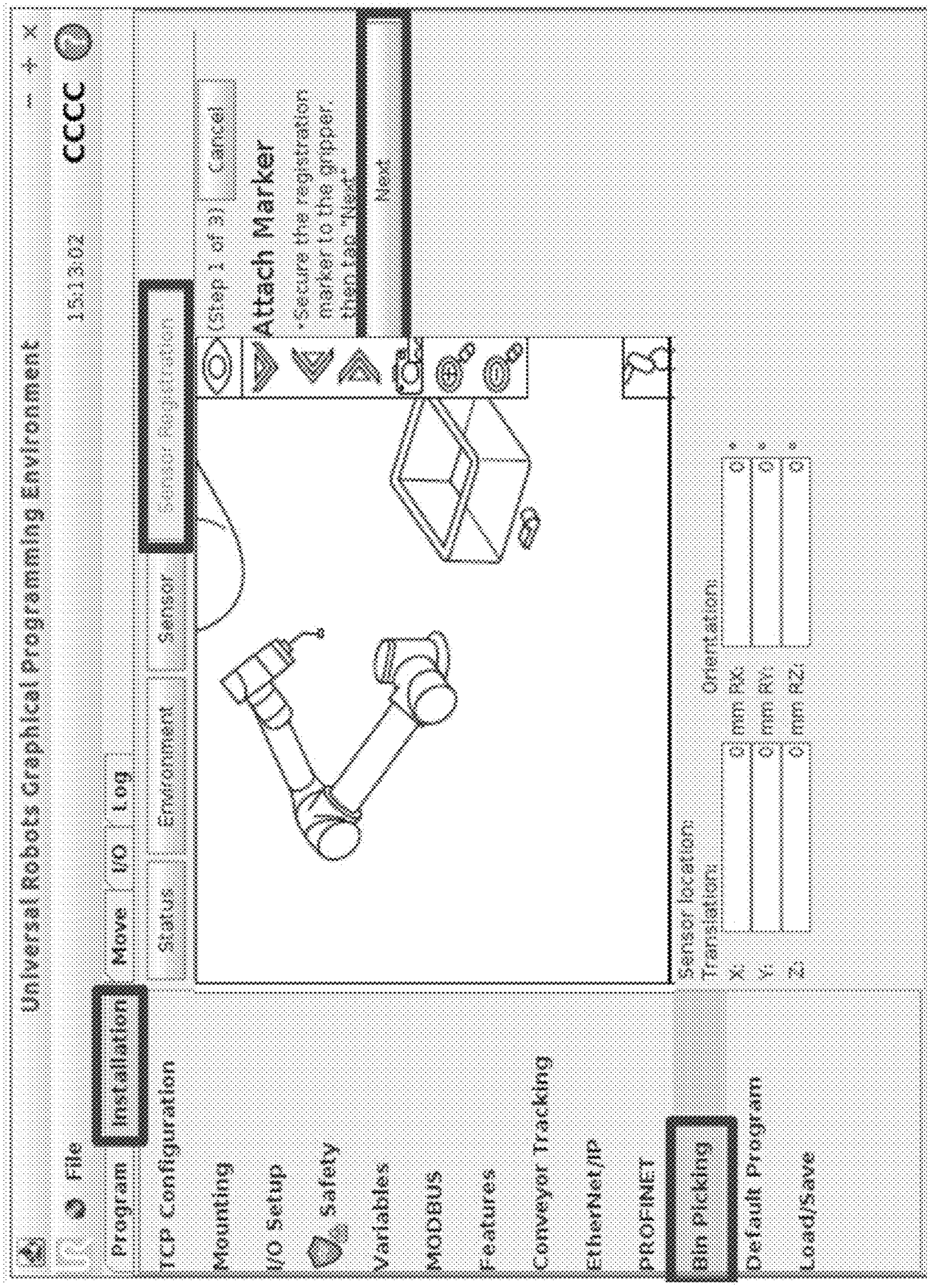
FIG. 33 is a graphical user interface that allows a user to register a sensor according to an embodiment of the present disclosure.
Figure 34:
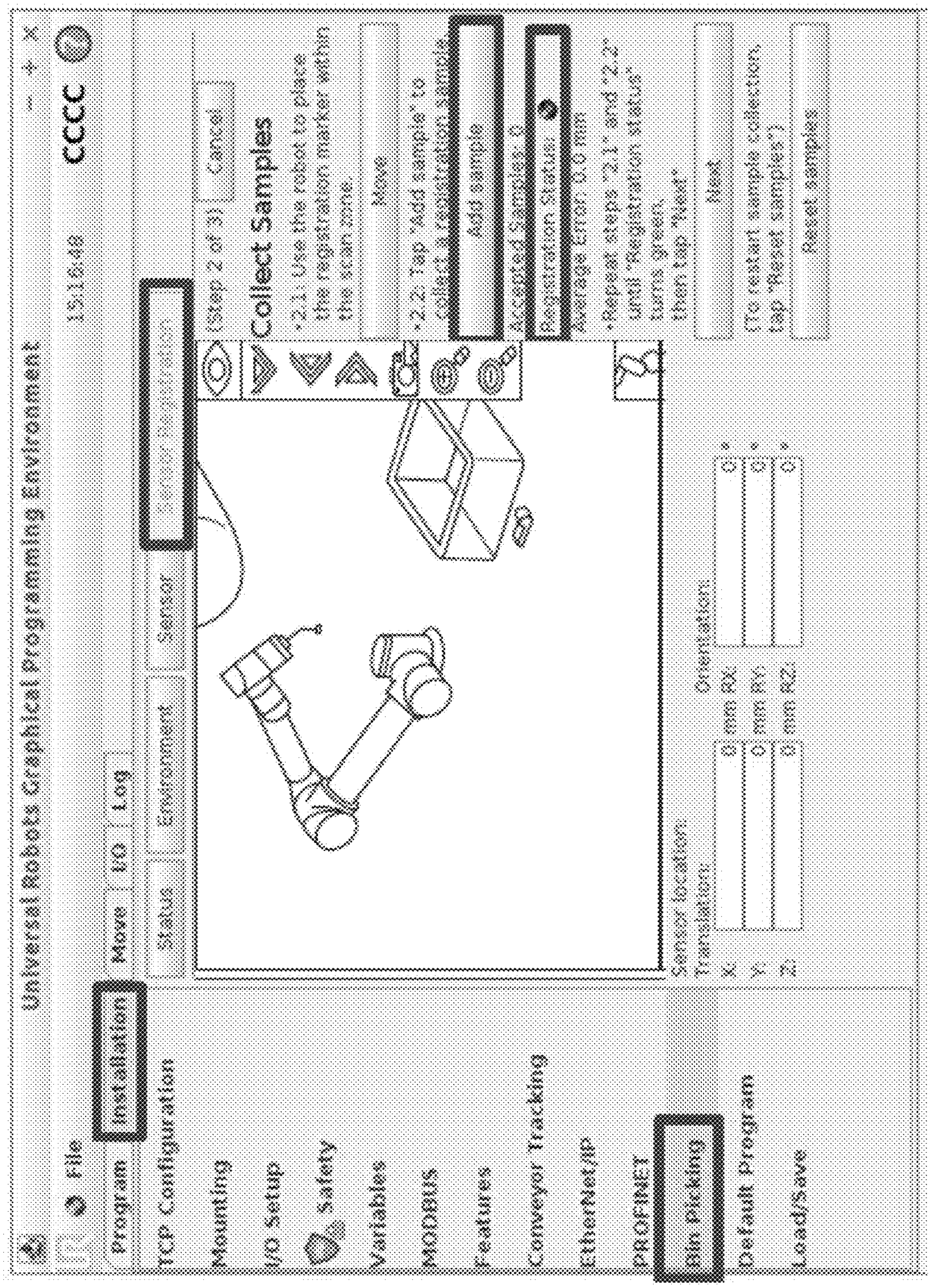
FIG. 34 is a graphical user interface that allows a user to register a sensor according to an embodiment of the present disclosure.
Figure 35:
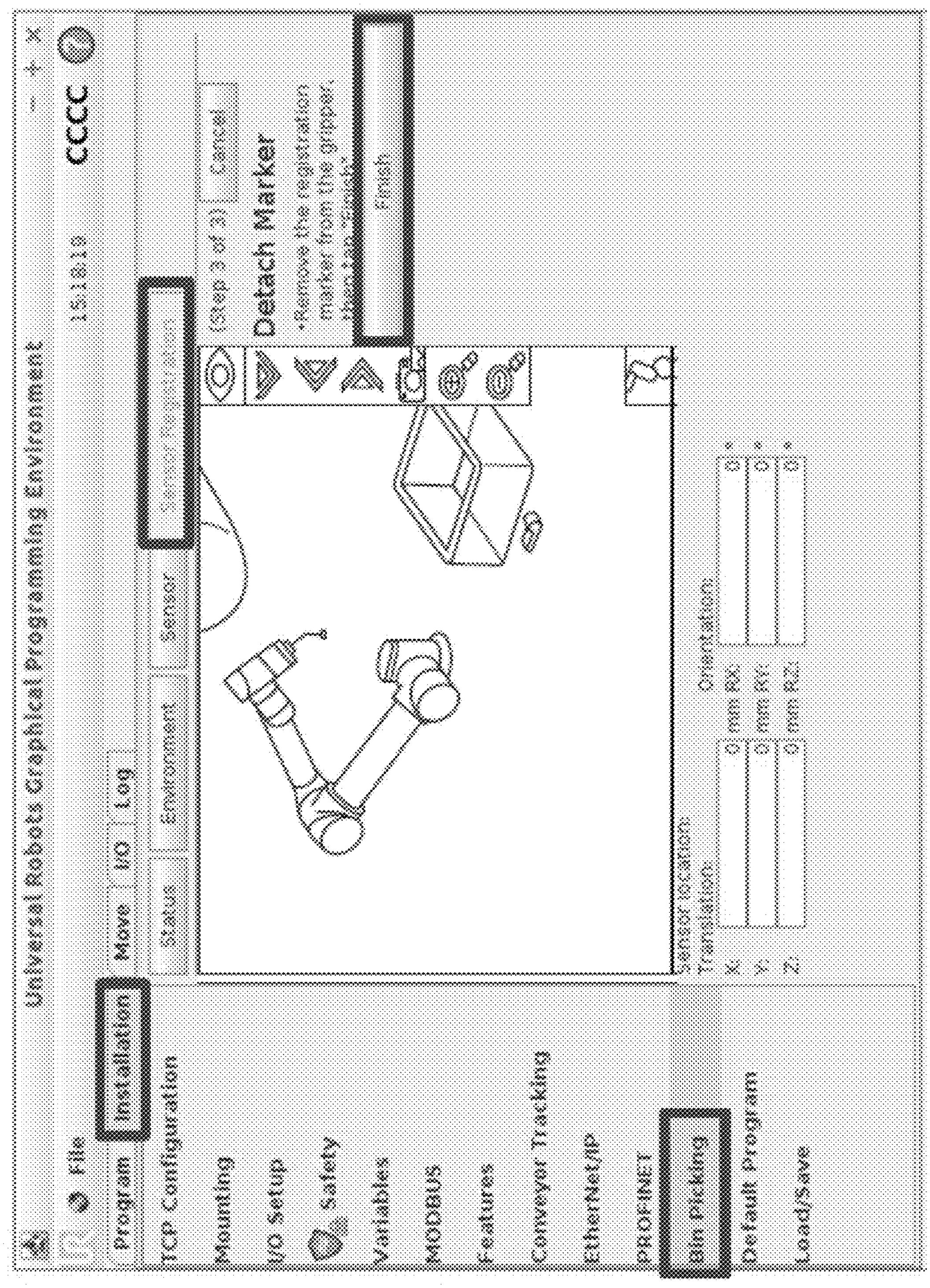
FIG. 35 is a graphical user interface that allows a user to register a sensor according to an embodiment of the present disclosure.

Referring now to FIGS. 32-35, graphical user interfaces that allows a user to register a sensor is provided. In some embodiments the sensor may be registered to determine its pose offset relative to the base of the robot. The user may select the "start wizard" option to begin. FIG. 33 shows a graphical user interface and an option to secure the registration marker to the gripper. The registration marker may be a 3D printed plastic sphere or hemisphere that may be mounted directly to the gripper. FIG. 34 depicts moving the robot to place the registration marker at different locations within the scan zone. The registration marker may face directly to the sensor. The user may select the "add sample" option to record each step. The registration error may be less than e.g., 2 mm after a few samples. In some embodiments, more than 10 samples may be used. In FIG. 35, the registration marker may be removed from the gripper and the "finish" option may be selected to complete the registration.

Figure 36:
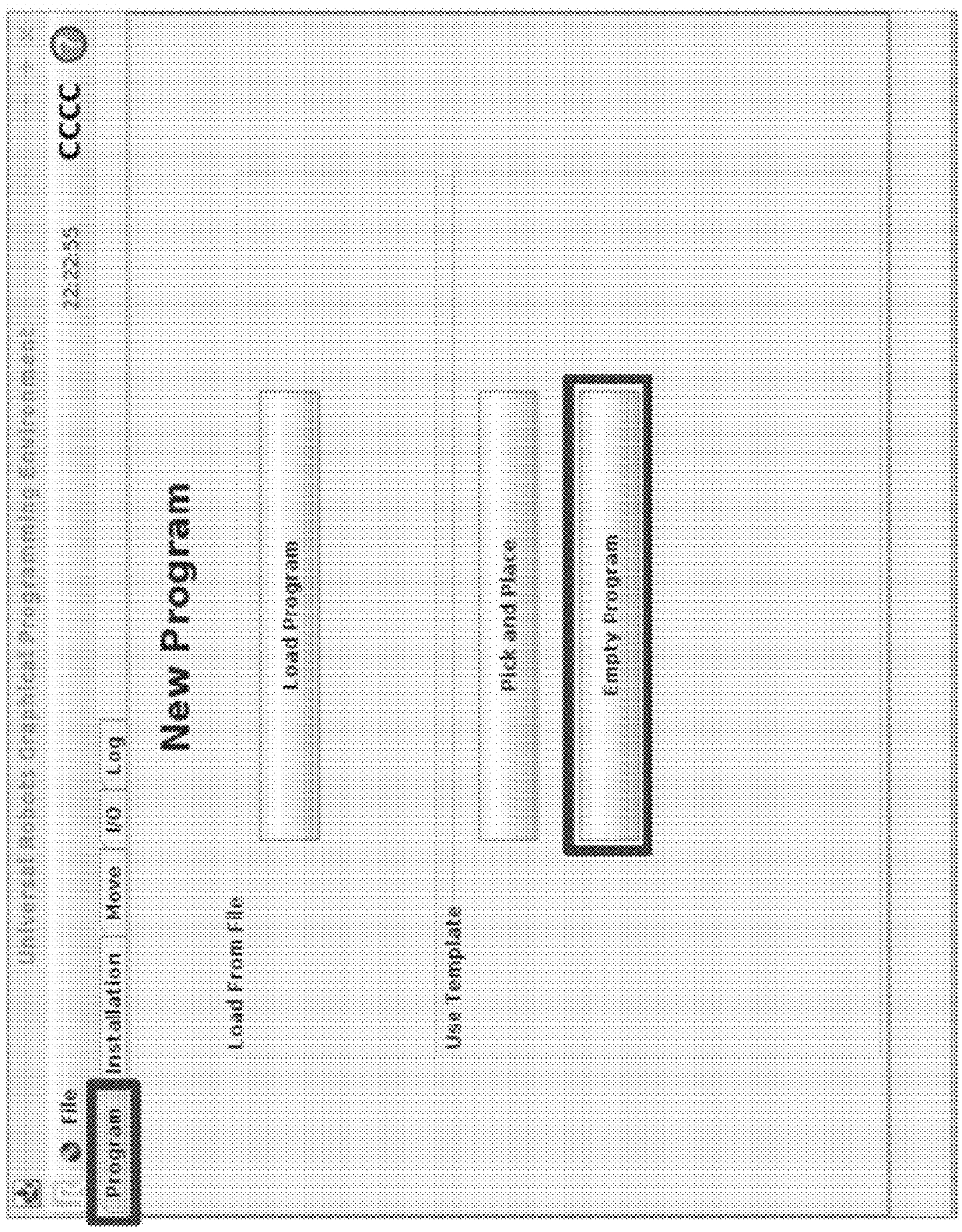
FIG. 36 is a graphical user interface that allows a user to create a bin picking program according to an embodiment of the present disclosure.
Figure 37:
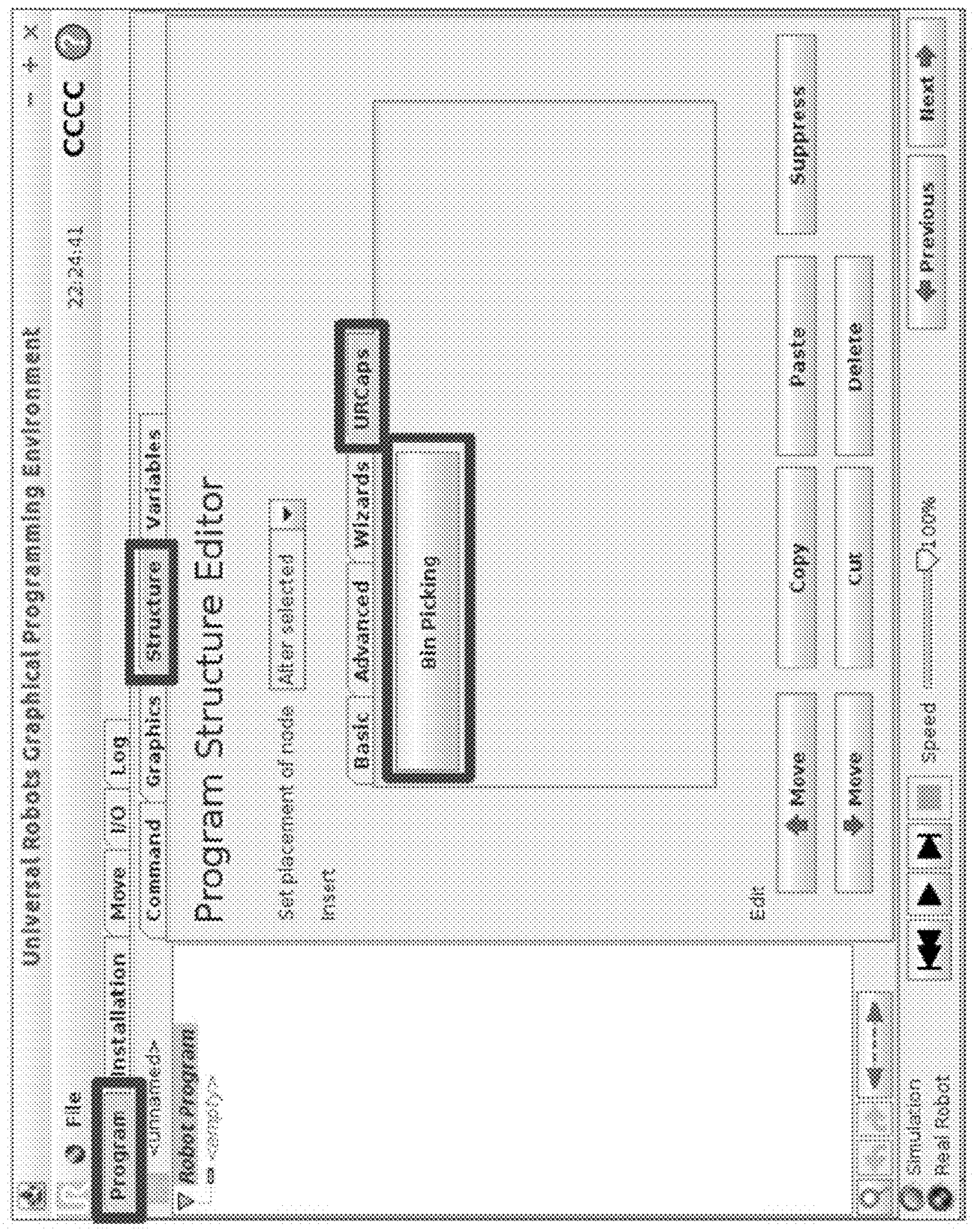
FIG. 37 is a graphical user interface that shows an option to generate a program template according to an embodiment of the present disclosure.
Figure 38:
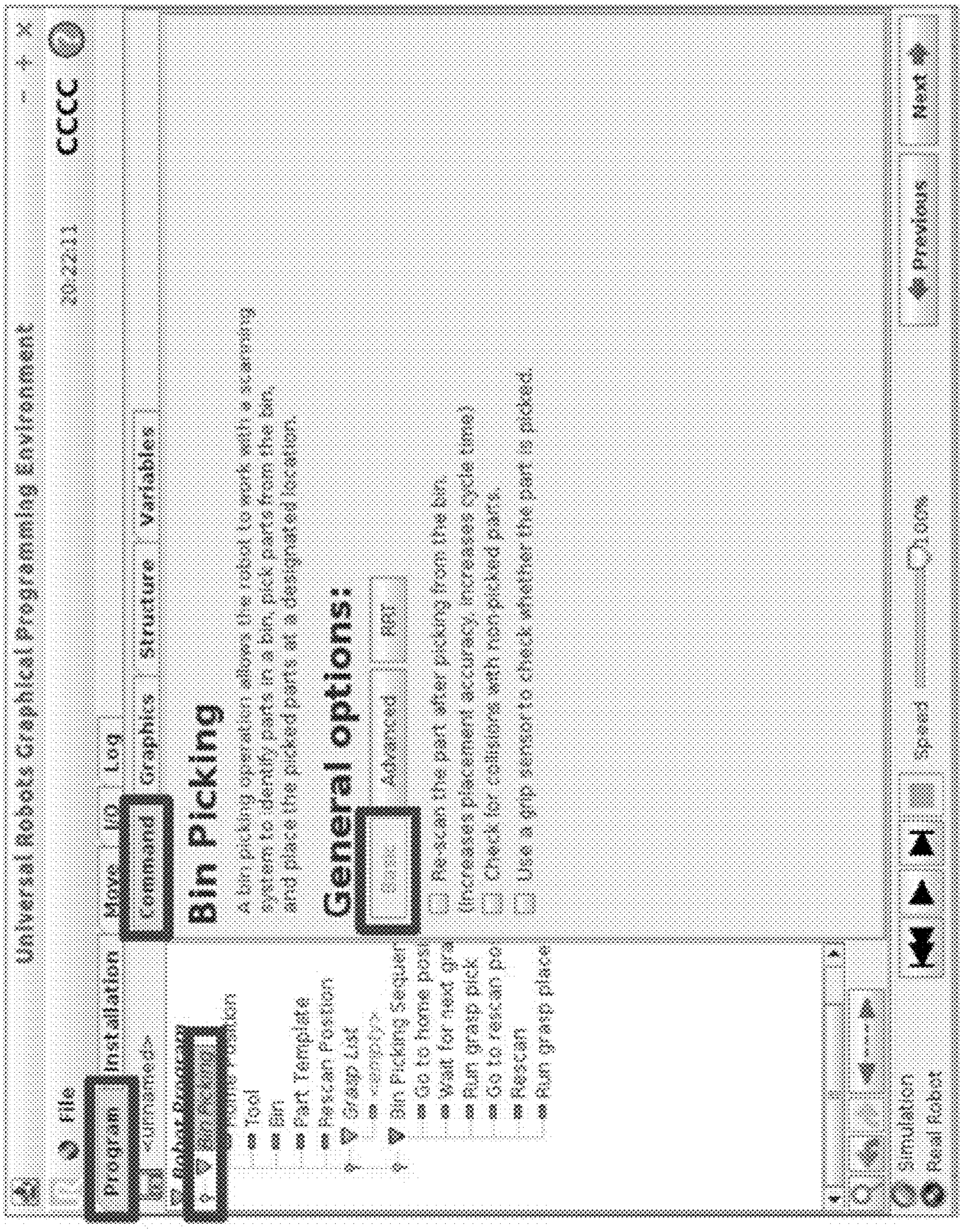
FIG. 38 is a graphical user interface that shows examples of options that may be available to the user according to an embodiment of the present disclosure.
Figure 39:
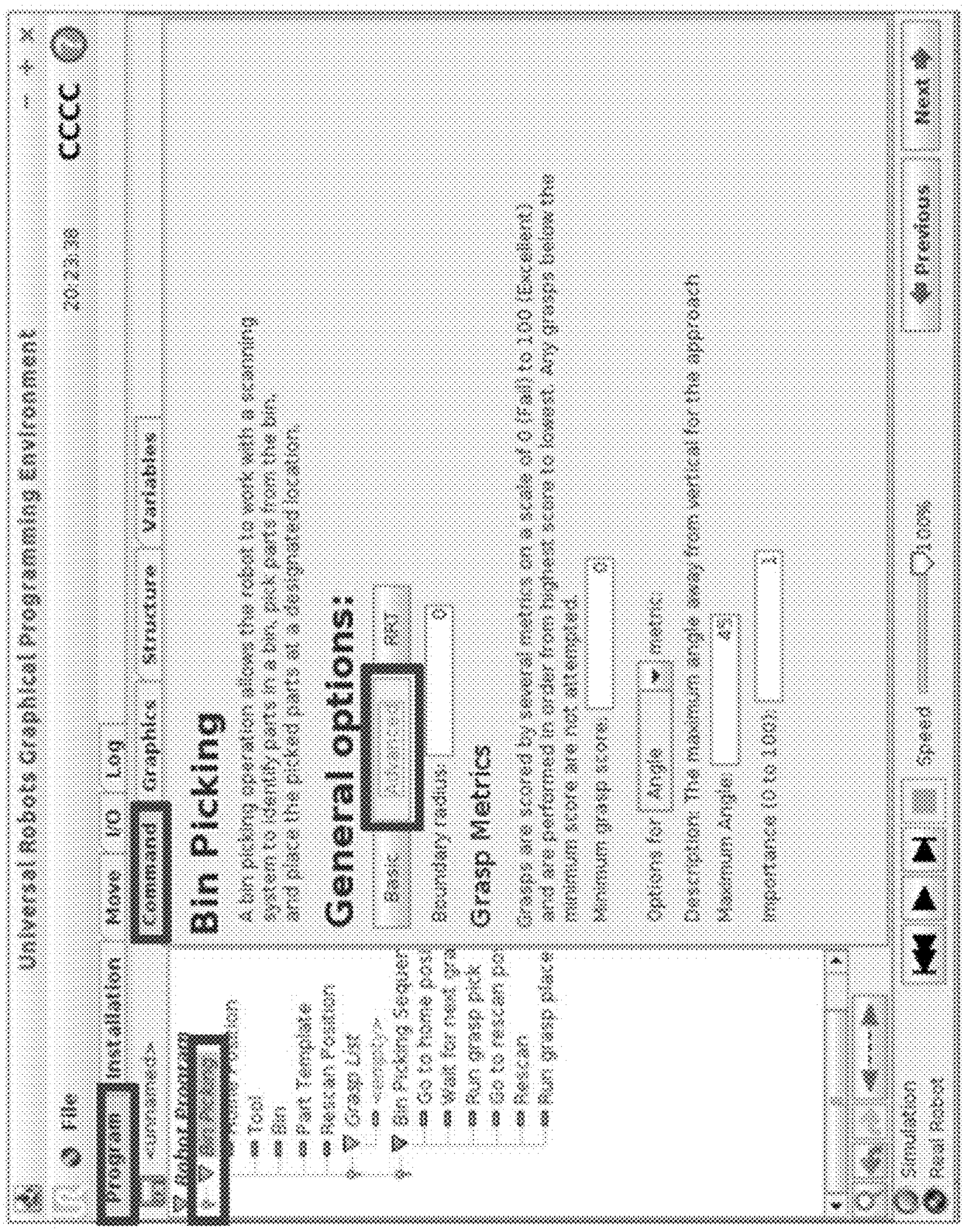
FIG. 39 is a graphical user interface that shows one approach for setting grasp metrics according to an embodiment of the present disclosure.
Figure 40:
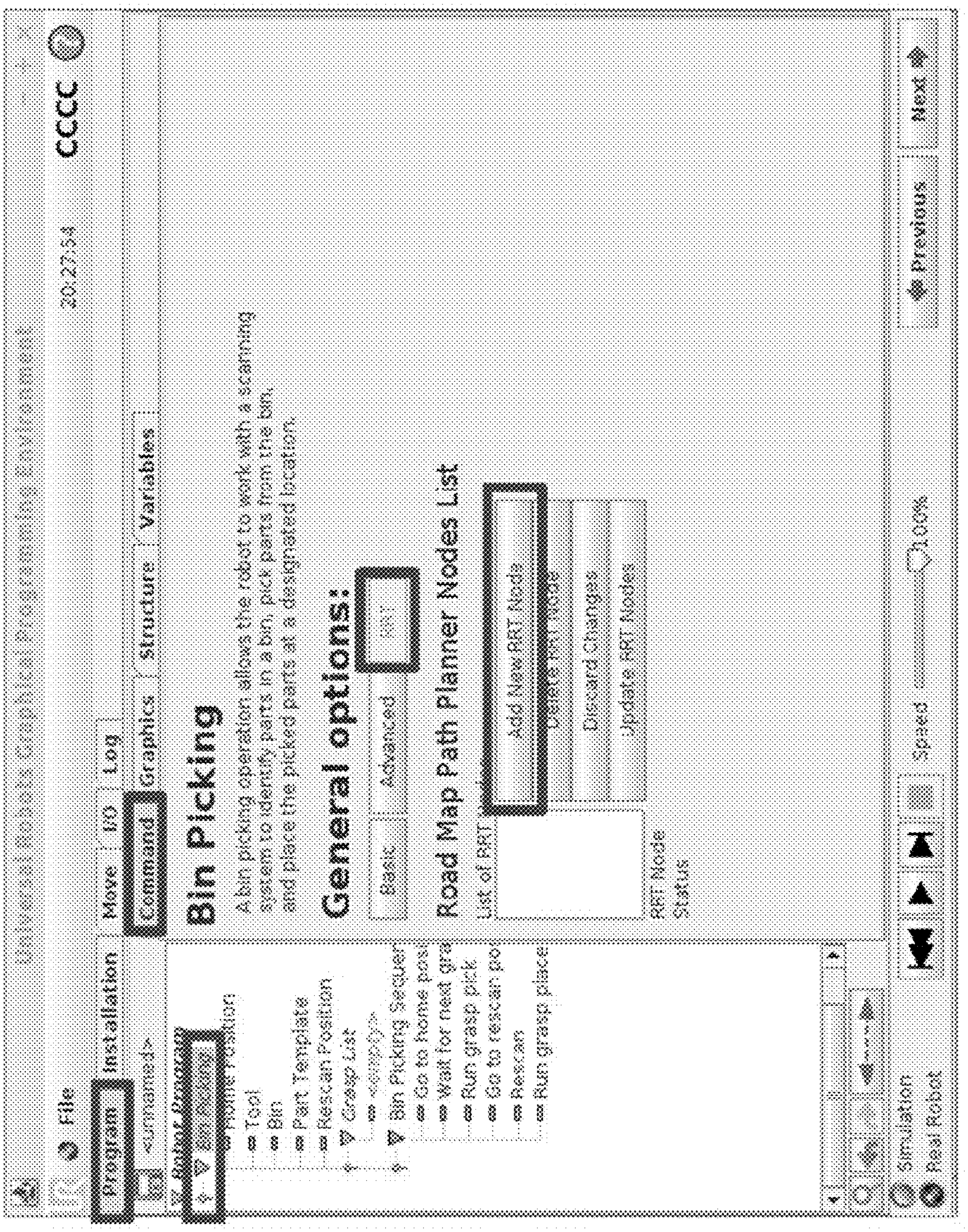
FIG. 40 is a graphical user interface that shows an example graphical user interface that allows for setting RRT nodes according to an embodiment of the present disclosure.

Referring now to FIG. 36, a graphical user interface that allows a user to create a bin picking program is provided. The user may select the "Program" option and select "empty program" to create a new task. In FIG. 37, an option to generate a program template is provided. Here, the user may select the "structure" and "URCaps" options before selecting "bin picking". This may insert the bin picking program template into the program tree. FIG. 38 shows examples of options that may be available to the user and FIG. 39 shows one approach for setting grasp metrics. The grasp metrics may define how the program picks which grasp to use when several are possible. FIG. 40 shows an example graphical user interface that allows for setting RRT nodes. The RRT nodes may be configured to provide path planning guidance to the robot for picking up parts at difficult locations (e.g. close to a wall, at a corner, etc.) in the bin. An RRT node may be set a distance away from the pick location of a difficult workpiece. In some embodiments, the robot may only need to move along a straight line to pick the workpiece without dramatically changing its pose or encounter singularities.

Figure 41:
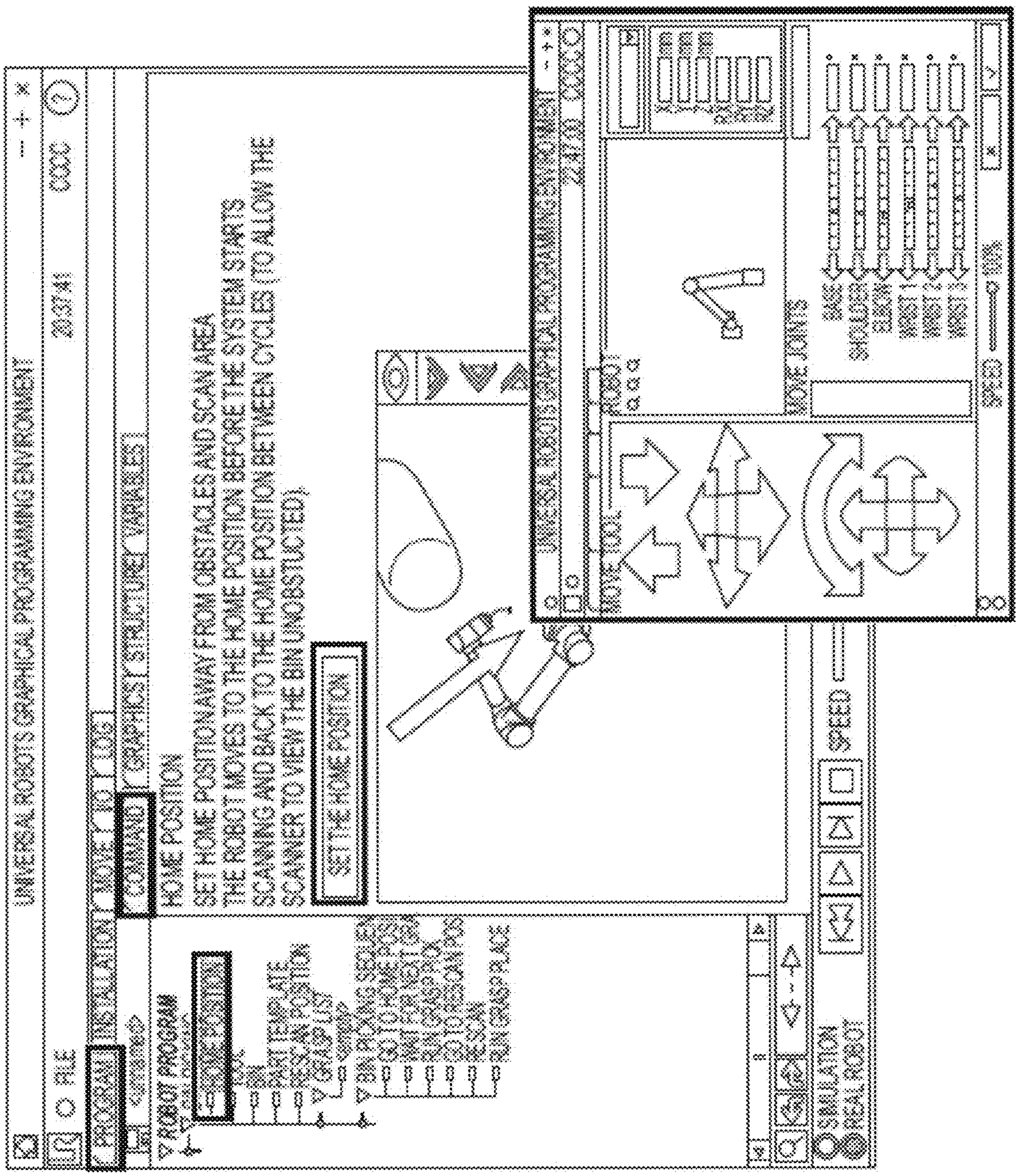
FIG. 41 is a graphical user interface that allows a user to set a home position according to an embodiment of the present disclosure.

Referring now to FIG. 41, a graphical user interface that allows a user to set a home position is provided. The user may select the "home position" option in the program tree and then select "set the home position". The user may then follow the instructions on the teach pendant to move the robot to the desired home position.

Figure 42:
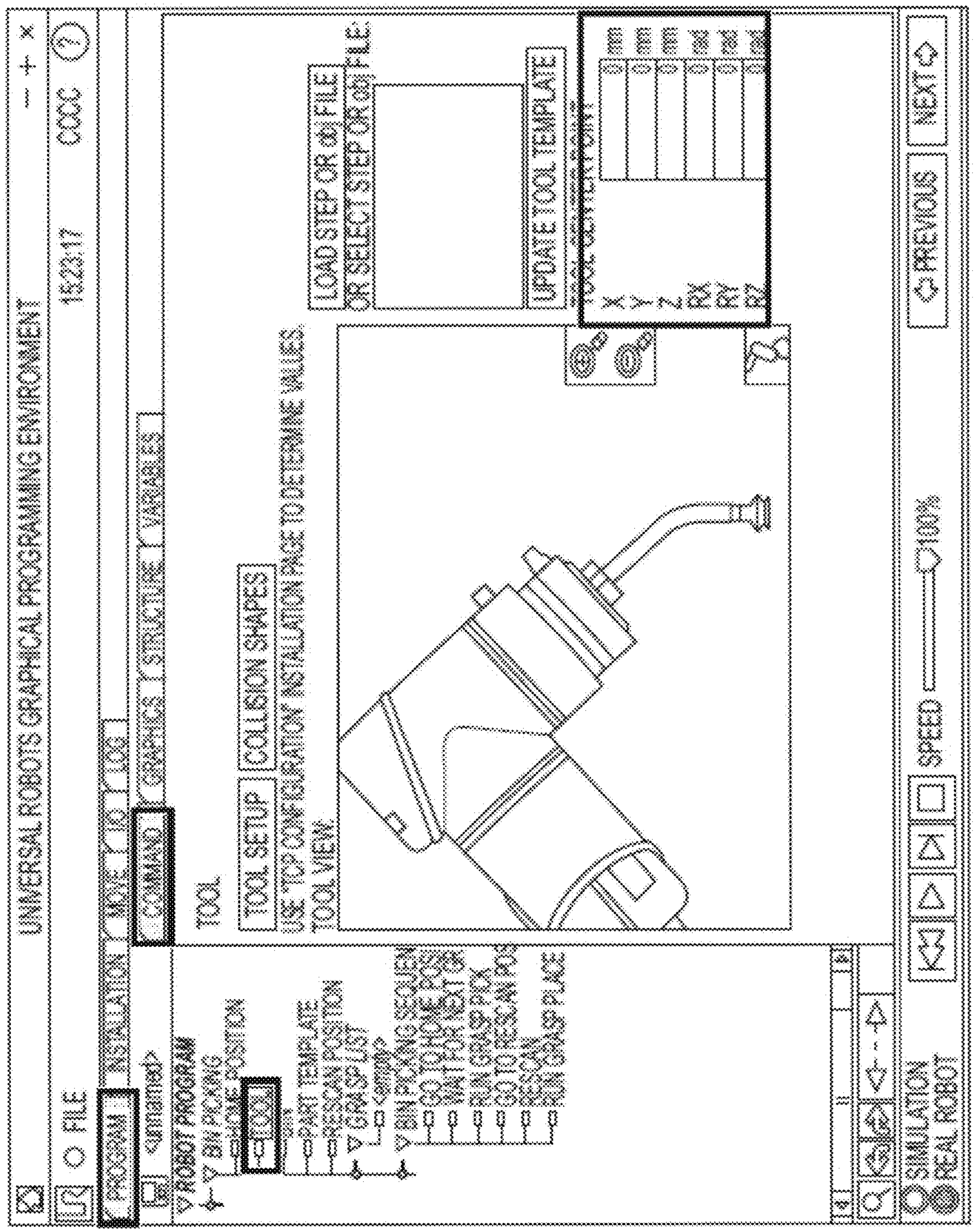
FIG. 42 is a graphical user interface that allows a user to configure the tool according to an embodiment of the present disclosure.

Referring now to FIG. 42, a graphical user interface that allows a user to configure the tool is provided. The user may select the "tool" option in the program tree and set the tool center point by manually typing in the coordinates and orientations. The user may be provided with an option to load an object file as well.

Figure 43:
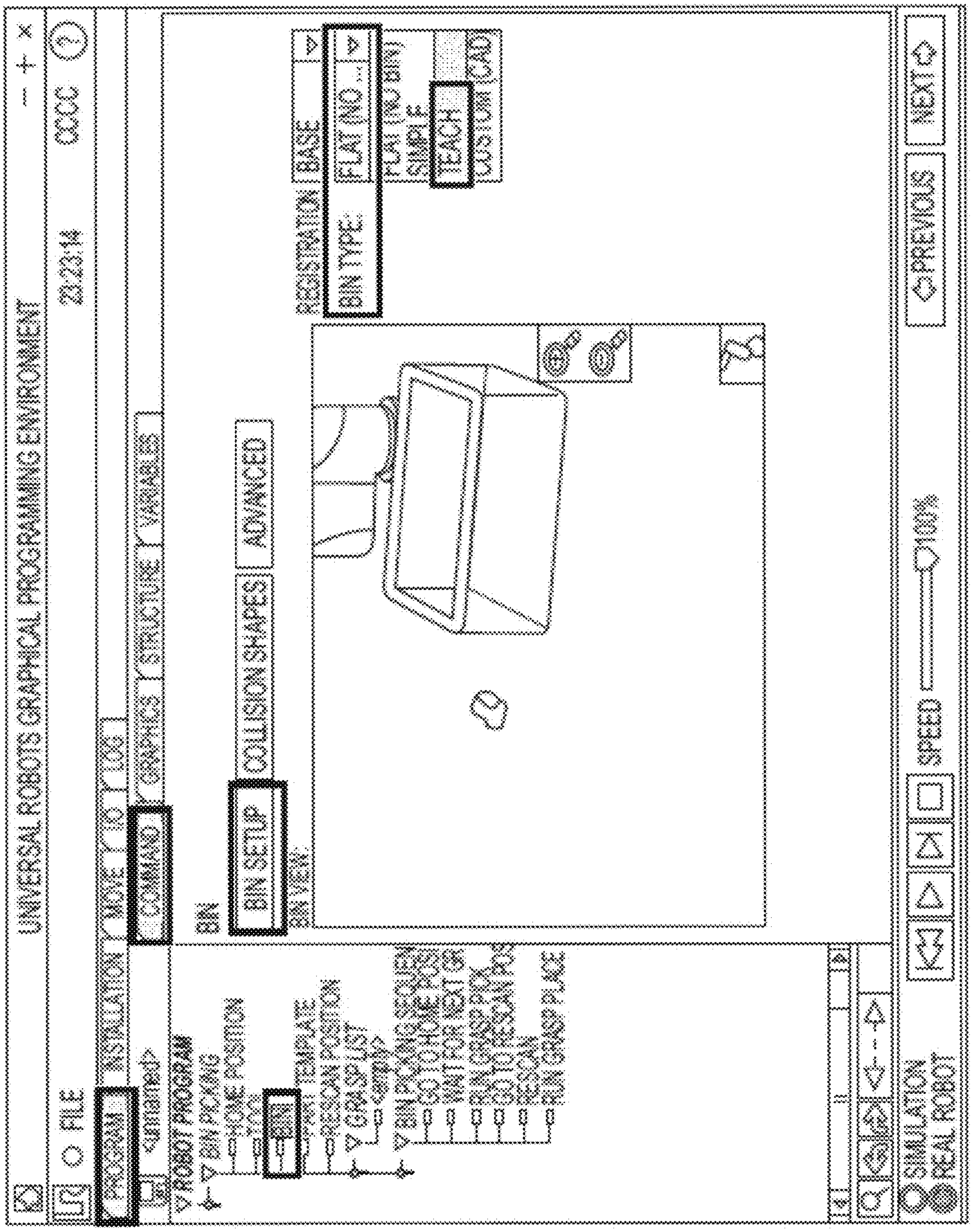
FIG. 43 is a graphical user interface that allows a user to register a bin according to an embodiment of the present disclosure.

Referring now to FIG. 43, a graphical user interface that allows a user to register a bin is provided. The user may select the "base" option as the registration plane and select the "teach" option as the bin type. A pointer may be mounted to the end effector.

Figure 44:
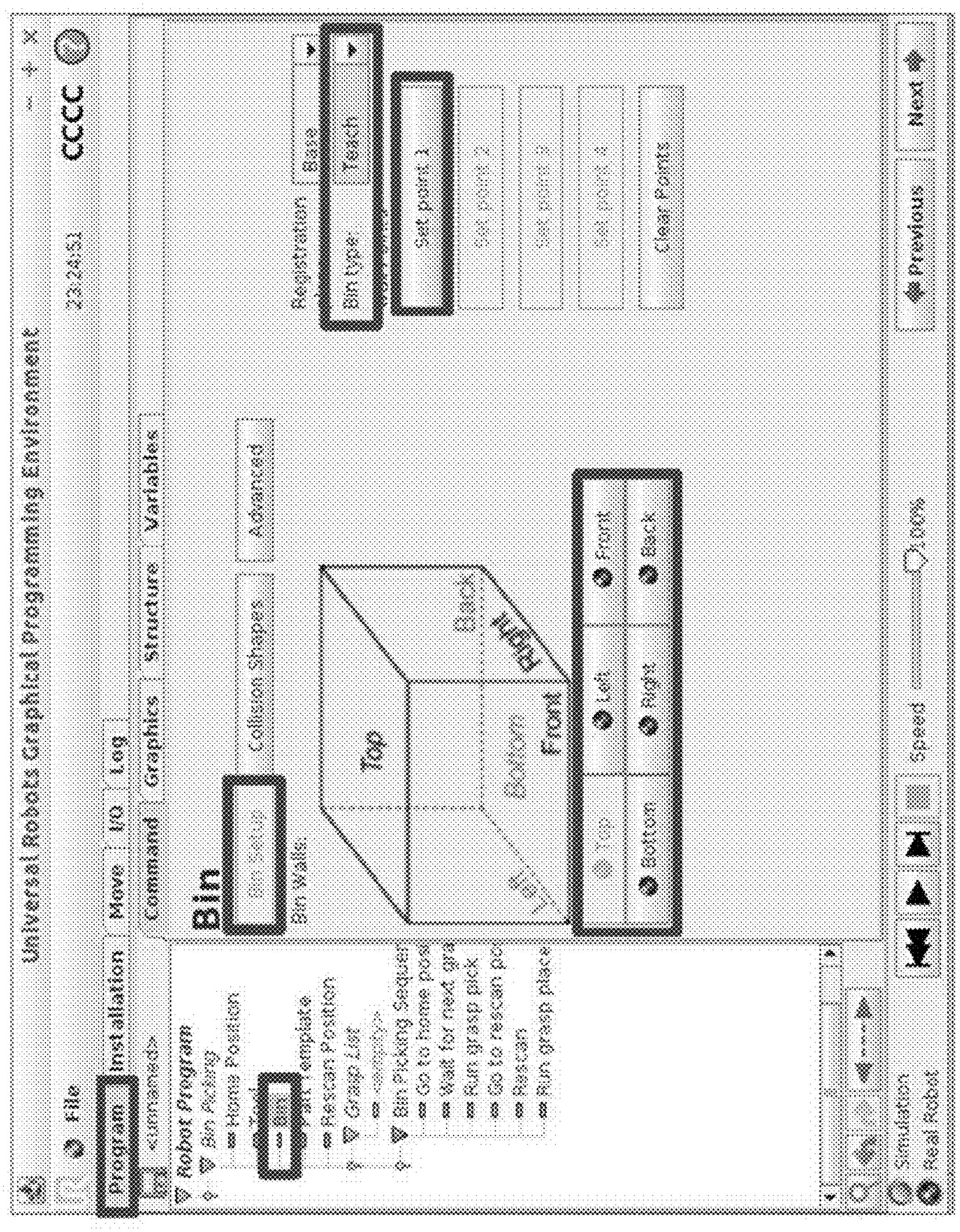
FIG. 44 is a graphical user interface that allows a user to register a bin according to an embodiment of the present disclosure.

Referring now to FIG. 44, a graphical user interface that allows a user to register a bin is provided. The user may use the pointer to touch four points on the interior of each bin wall to register. In some embodiments, the teaching points may be spread out. A side definition illustration may be provided to register each side. An LED indicator may toggle once registration is complete.

Figure 45:
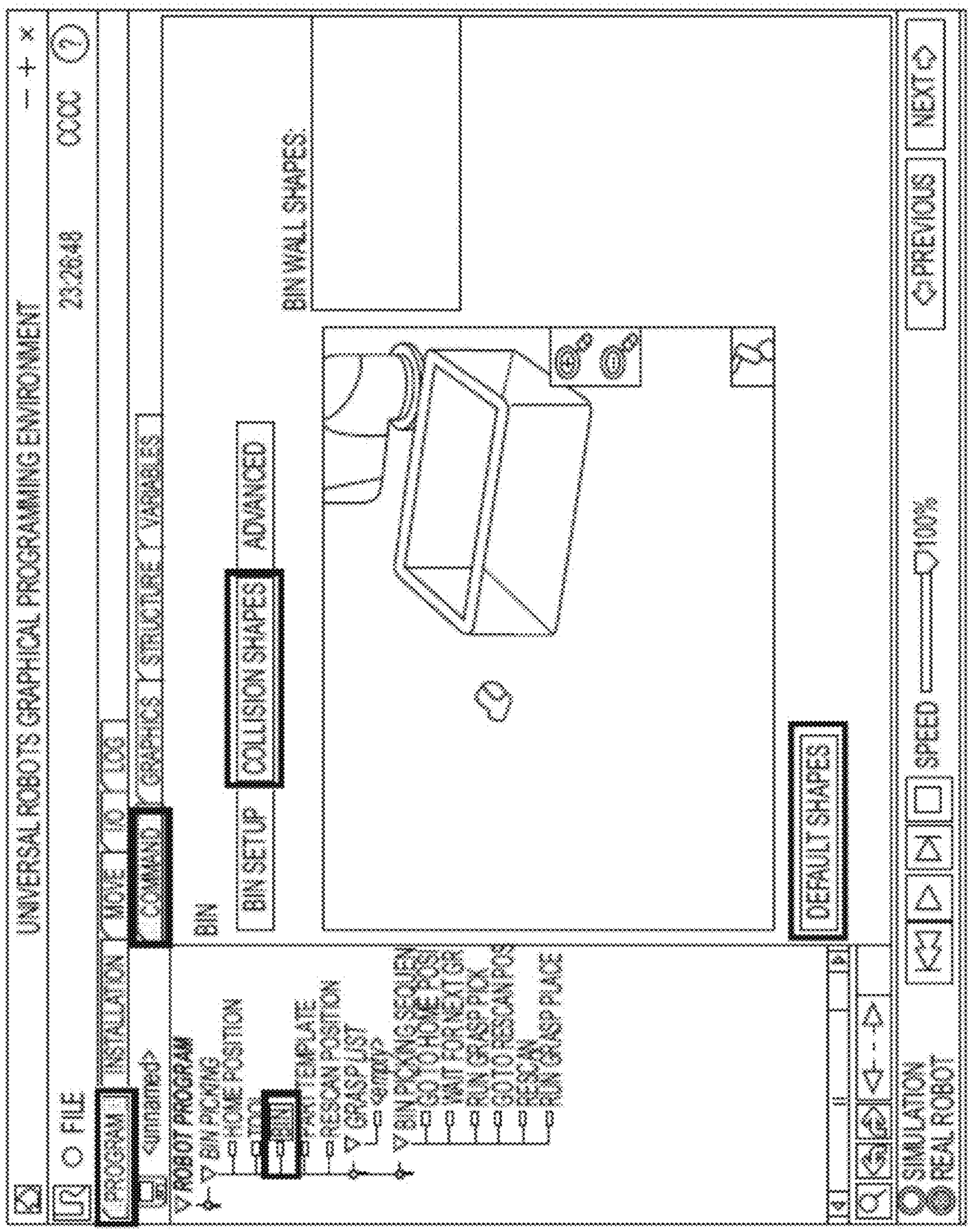
FIG. 45 is a graphical user interface that allows a user to configure bin collision shapes according to an embodiment of the present disclosure.

Referring now to FIG. 45, a graphical user interface that allows a user to configure bin collision shapes is provided. The user may select the "default shapes" option to define collision shapes for the bin based on the registration. In some embodiments, the user may change the size of the collision shapes.

Figure 46:
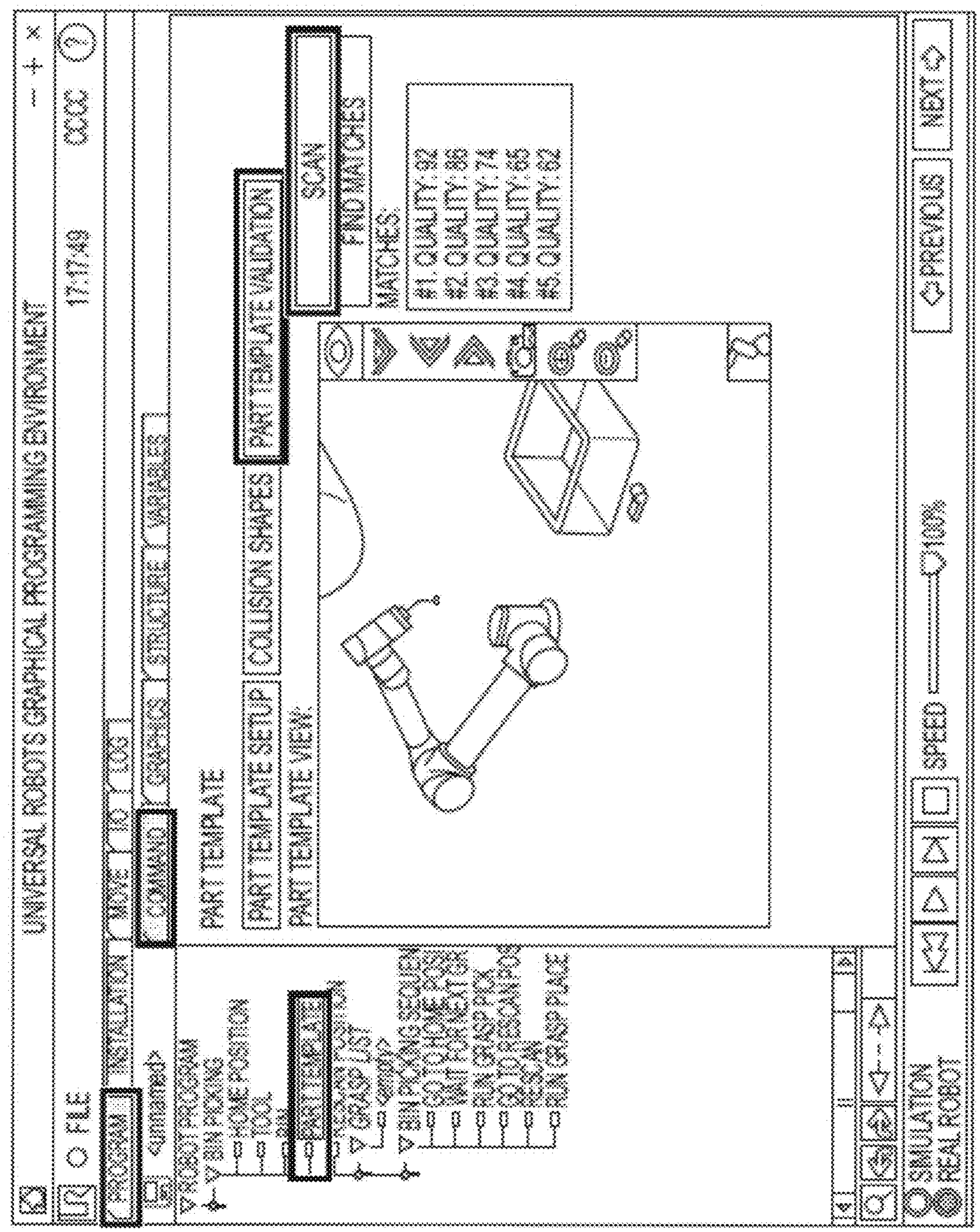
FIG. 46 is a graphical user interface that allows a user to validate a part template according to an embodiment of the present disclosure.

Referring now to FIG. 46, a graphical user interface that allows a user to validate a part template is provided. The user may select the "scan" option to scan a workpiece in the bin. In some embodiments, the bin picking system may attempt to match the point cloud with the part template.

Figure 47:
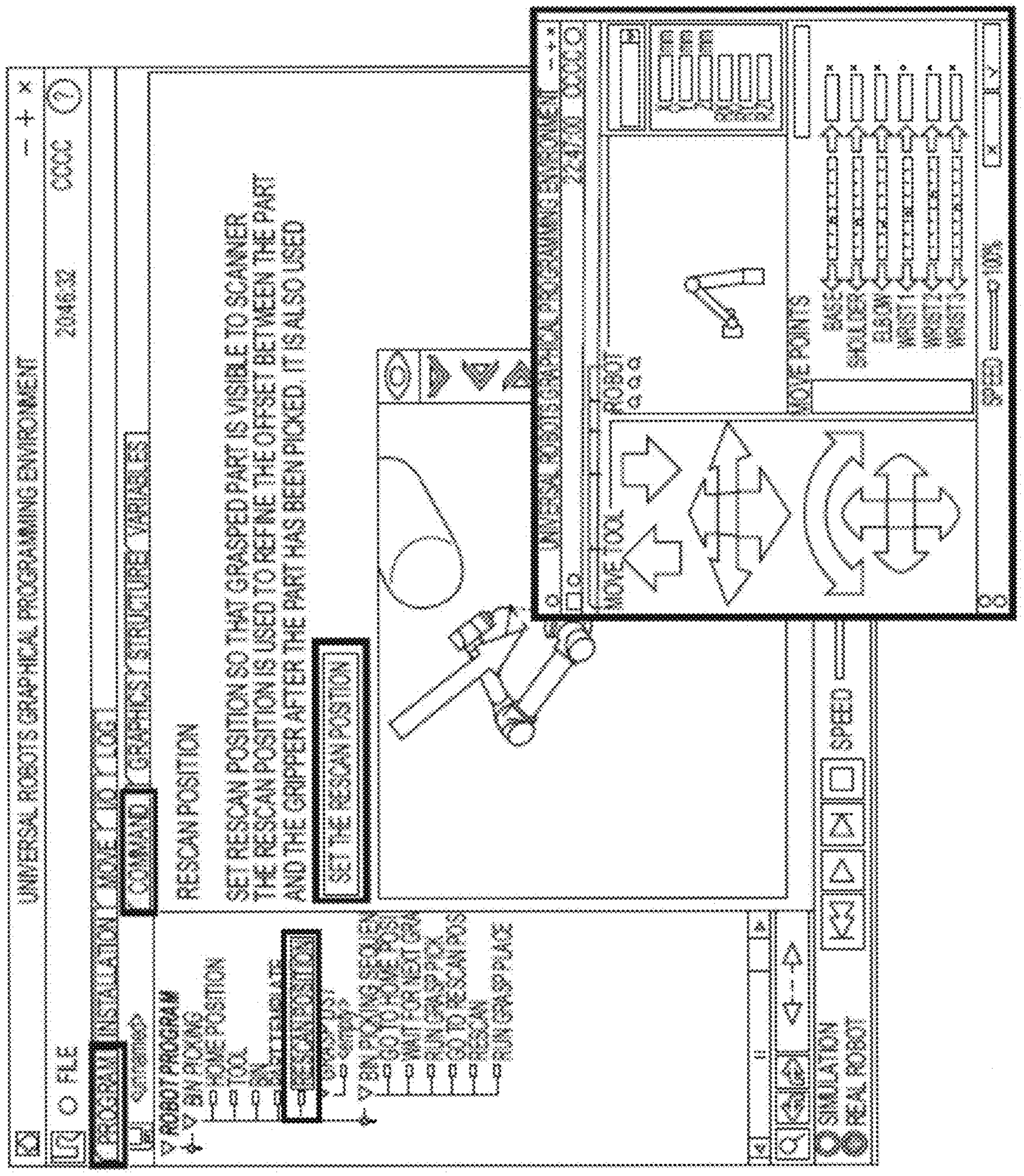
FIG. 47 is a graphical user interface that allows a user to configure a rescan position according to an embodiment of the present disclosure.

Referring now to FIG. 47, a graphical user interface that allows a user to configure a rescan position is provided. The user may select the "rescan position" option in the program tree and elect to "set the rescan position". Once the robot has been moved to the desired rescan position the user may select "ok".

Figure 48:
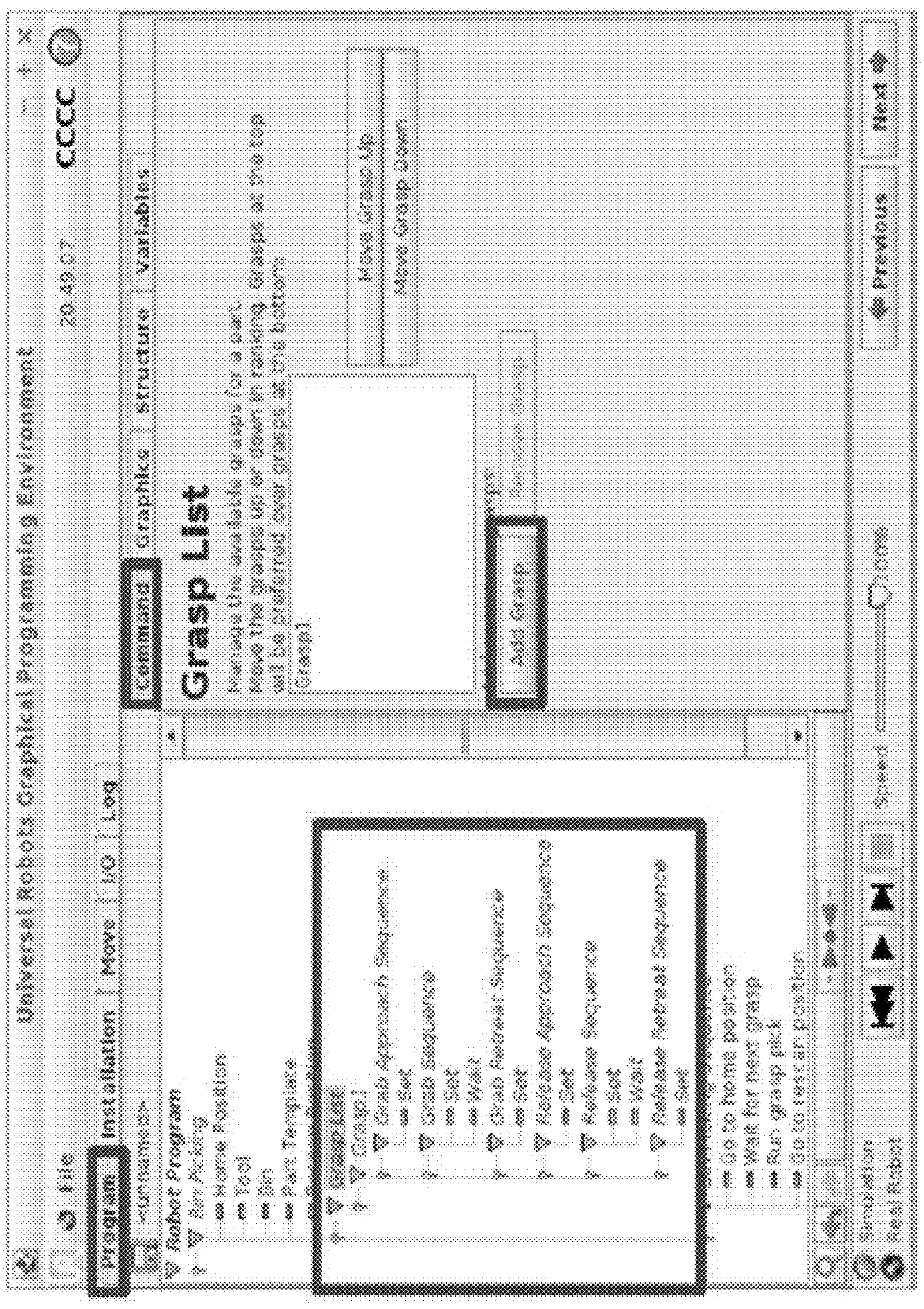
FIG. 48 is a graphical user interface that allows a user to add a grasp according to an embodiment of the present disclosure.

Referring now to FIG. 48, a graphical user interface that allows a user to edit a grasp list is provided. In some embodiments, the grasp list may define the order of priority to use when evaluating grasps. Grasps may be added and removed by selecting "add grasp" or "remove grasp". The selected grasp may be moved up or down in the list with the buttons as shown in the figure.

Figure 49:
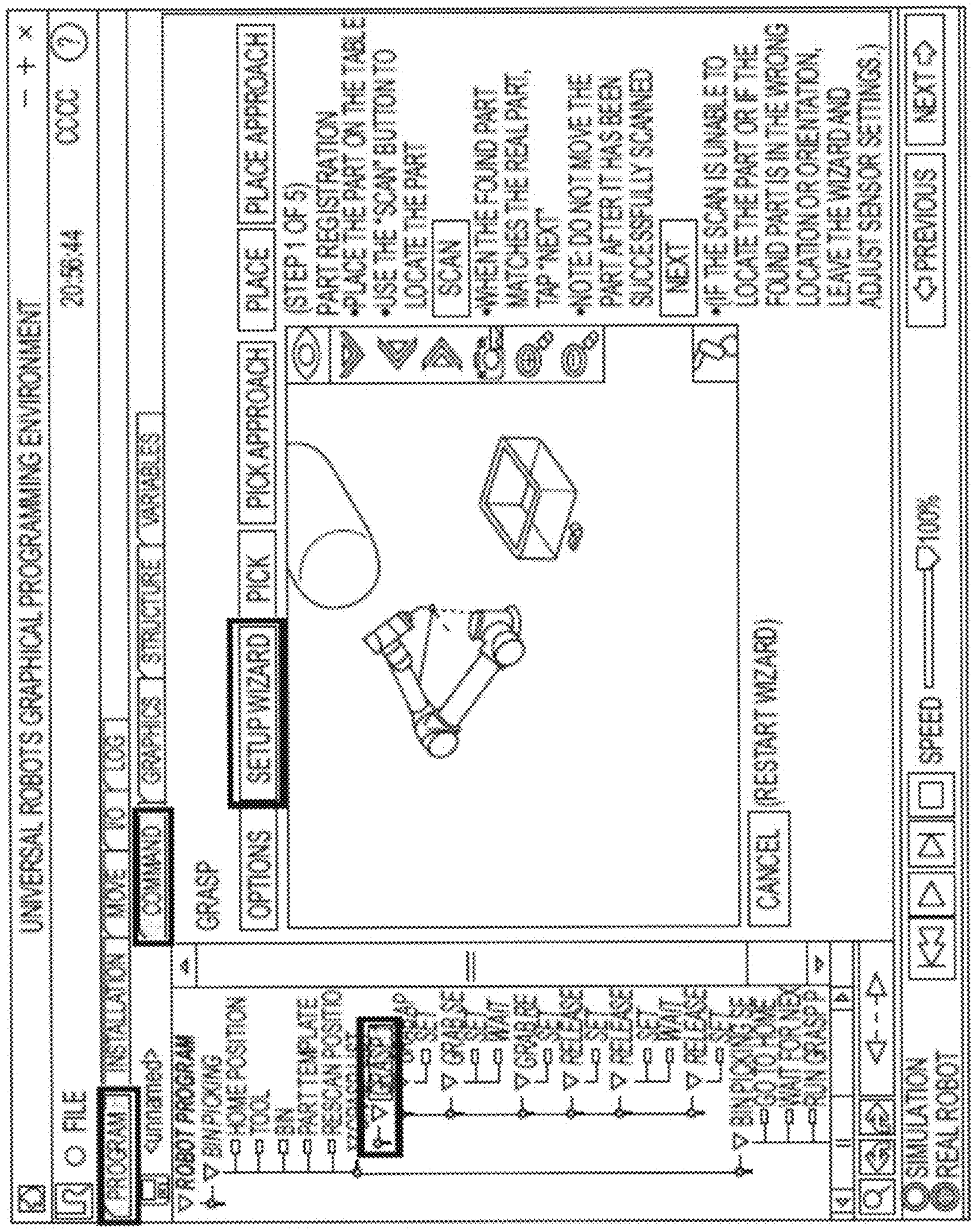
FIG. 49 is a graphical user interface that allows a user to train grasp and placement according to an embodiment of the present disclosure.

Referring now to FIG. 49, a graphical user interface that allows a user to view a grasp wizard is provided. The user may select the new grasp node in the program tree or select "next" to access the grasp wizard. The user may change the grasp name under the "options" tab.

Figure 50:
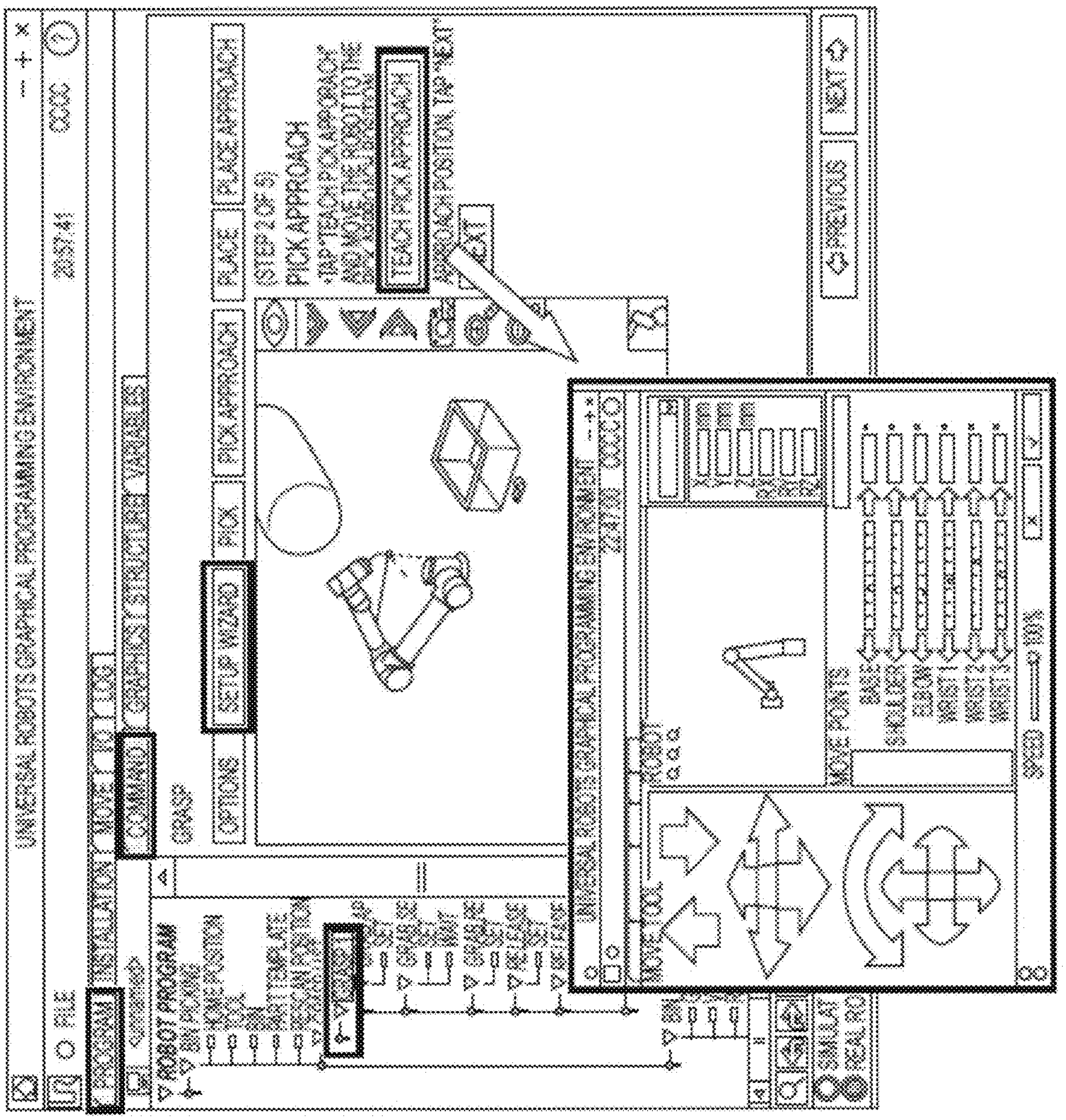
FIG. 50 is a graphical user interface that allows a user to train the pick according to an embodiment of the present disclosure.

Referring now to FIG. 50, a graphical user interface that allows a user to train the pick is provided. The user may select the "teach pick approach' option and move the robot to the pick approach position. The approach position should not be in the part template collision zone. The user may select the "ok" option to record the position and then continue to set other positions.

Figure 51:
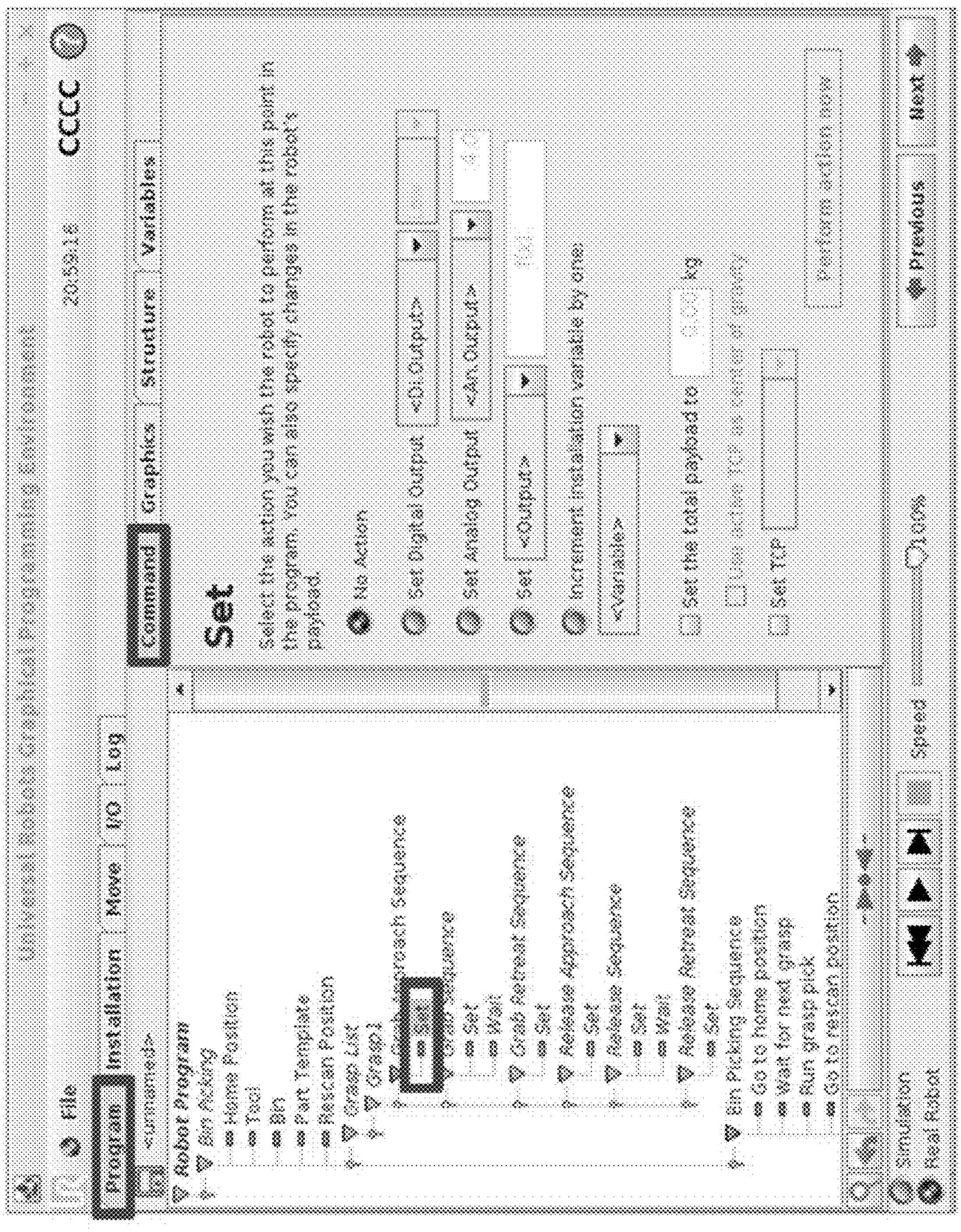
FIG. 51 is a graphical user interface that allows a user to configure an EOAT signal according to an embodiment of the present disclosure.

Referring now to FIG. 51, a graphical user interface that allows a user to configure an EOAT signal is provided. In some embodiments, the standard UR set node may be used to trigger digital or analog outputs to actuate an EOAT. The user may delete or add nodes under each sequence.

Figure 52:
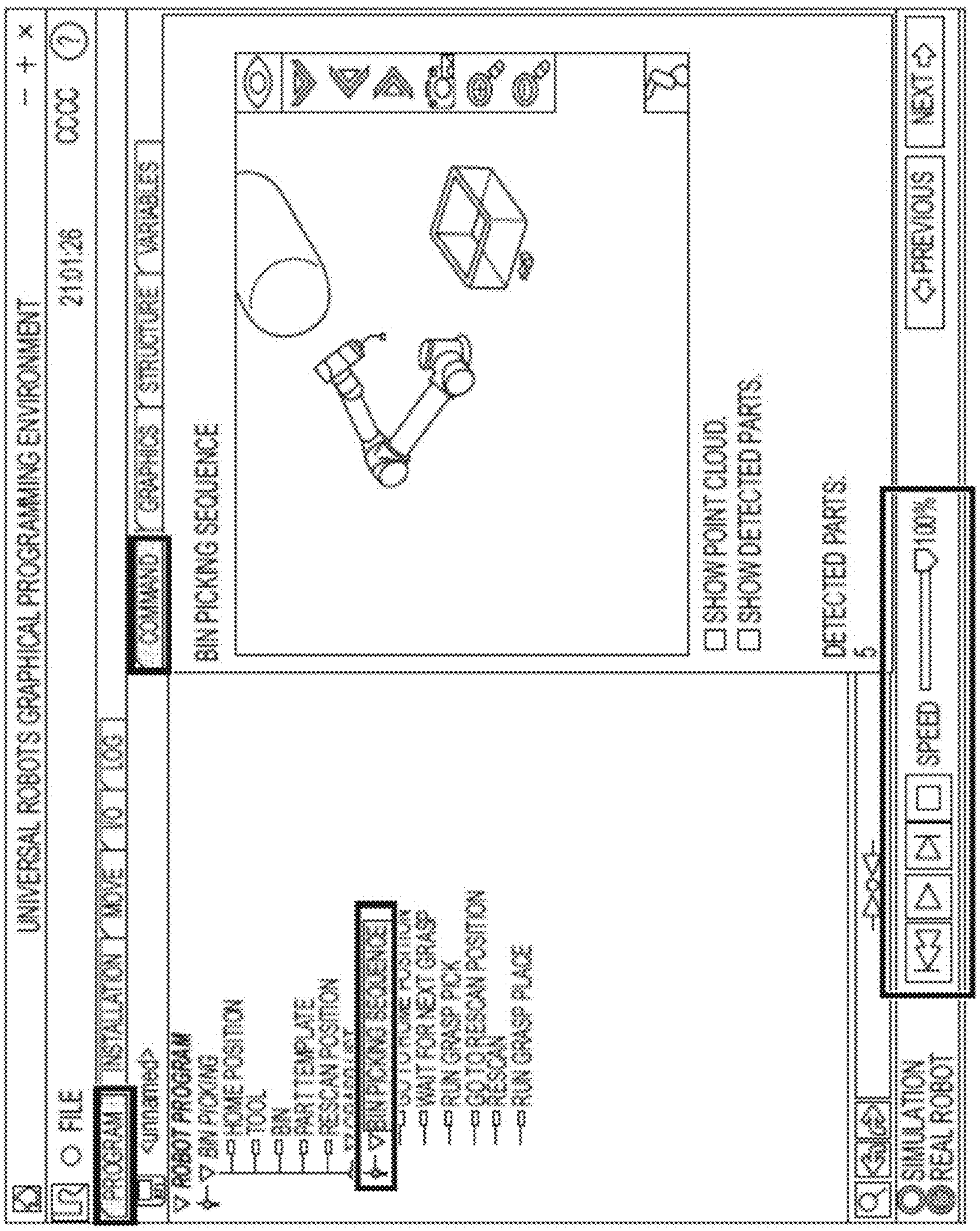
FIG. 52 is a graphical user interface that allows a user to operate the system according to an embodiment of the present disclosure.

Referring now to FIG. 52, a graphical user interface that allows a user to operate the bin picking system is provided. The user may display the point cloud and detected parts. The user may run the program using the UR play and pause buttons.

Figure 53:
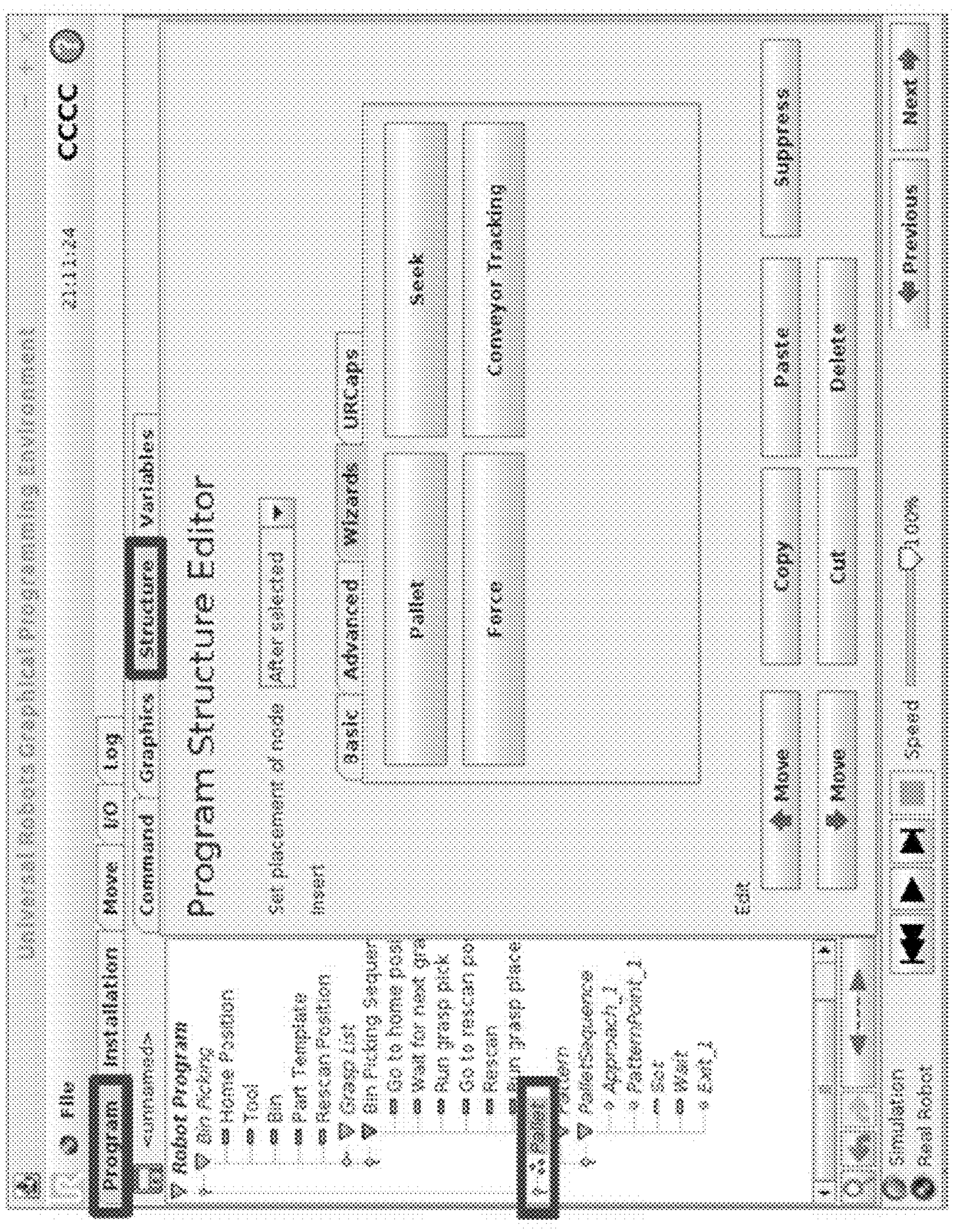
FIG. 53 is a graphical user interface that allows a user to create additional nodes according to an embodiment of the present disclosure.

Referring now to FIG. 53, a graphical user interface that allows a user to train a palletizing sequence is provided. In a palletizing sequence, the bin picking program iterates through a list of placement positions, placing each subsequent part in a different position as specified by the palletizing pattern.

In some embodiments, the bin picking system described herein may be implemented with a family of sensors, or a single sensor model with different lensing, although a single sensor model that would cover the entire operating range may be employed. The product may work with volumes from e.g., 10×10×10 cm to e.g., 1.2×0.9×0.8 meters (H×W×D). The resolution and accuracy specification may be met at the worst case position within the volume.

In some embodiments, the resolution and accuracy may vary with bin size. The implementation may use multiple sensor models or configurations to cover this entire volume. If a bin outside of the sensor's field of view does affect the bin picking system's performance, the software may detect and report this error. The sensor may be mountable above the bin, on the arm, or at any suitable location.

In some embodiments, above the bin, there may be enough room between the sensor and the top of the picking volume for the robot to operate without impacting cycle time. Above the bin, there may be enough room for an operator to dump more parts in to the bin. The distance between sensor and the bin may be able to vary by ±10% or ±10 cm, whichever is greater. Similarly, the sensor may be tolerant of a ±10° variation in sensor mounting, either around the x, y, or x axis, as long as the entire bin is still visible.

In some embodiments, the sensor may not require a precision location in order to meet specification, assuming it does not move after alignment. After the cell is configured and calibrated, the sensor may be considered to be immobile. The bin picking system may be tolerant of temporary obstructions between the sensor and the bin. Temporary obstructions may include the operator, a refill bin, a swizzle stick, etc. "Tolerant" may indicate that the bin picking system may re-try the pick for a reasonable amount of time and will create an error only after multiple re-tries or an elapsed time. For both configurations, obstructions that cause a force limit may be detected and force a re-try.

In some embodiments, the bin picking system works with bins of arbitrary shapes, such as a cardboard box, a cylindrical bucket, a kidney-shaped bowl, etc. Programming may not require a CAD model of the bin for approximately parallelopiped shaped bins. If a CAD model is required, the bin picking system may still function with the required performance if the bin has minor differences from the CAD model, for example a warped cardboard box, a plastic bin with a crack, a wooden crate with a missing slat. Operation may not require main sensor axis to be normal to the top or bottom plane of the bin. This allows the bin to be canted, or the sensor to be imprecisely placed.

In some embodiments, setup may require scanning an empty bin. Setup may be agnostic to the bin size and shape. Preferably, the bin may even change in between picks, e.g. from a plastic tote to a cardboard box, without affecting system operation. The bin picking system may work with cardboard boxes that have open flaps. The bin picking system may work when there is no bin, e.g. if parts are in a pile. The bin picking system may work as a 2D bin picker as well, e.g. with parts uniformly posed on a flat surface. The bin picking system may work with workpieces as small as 1×1×0.1 cm, and as large as 30×30×30 cm. Resolution and accuracy may vary with workpiece size. The bin picking system may be able to accept a CAD model of the workpiece and/or may also work with a point cloud of a workpiece.

In some embodiments, the bin picking system may work with workpieces that are very thin, or very narrow in one or two dimensions (i.e. as thin as sheet metal or with the aspect ratio of a wire rod), but still meeting the requirement that the workpiece is rigid. The bin picking system may also work even if there is a foreign object or misshapen workpiece in the bin. These workpieces may be avoided and not picked. The bin picking system may allow for multiple types of pick-able workpieces in the same bin. If this is the case, the bin picking system may be able to specify programmatically which type of workpiece is desired before starting the pick. The bin picking system may also work with both vacuum pick-up and mechanical grippers. Mechanical grippers may include both inside and outside grips. Grips may incorporate the identification of parts that have sufficient clearance for a gripper without nudging adjacent parts.

In some embodiments, the bin picking system may be able to accept a CAD model of the end effector. The bin picking system may also work with a point cloud of an end effector. The bin picking system may have a selectable option to avoid collisions between the end effector and the bin or a non-gripped workpiece. When collision avoidance with adjacent workpieces is selected, the gripper, robot, and any gripped workpiece should not contact other workpieces during gripping. This implies that the path planning may search for some level of clearance around a target workpiece. The bin picking system may allow the definition of multiple pick points or grasps for a given workpiece. If multiple pick points or grasps for a different workpiece are definable, an indication of which grip was used may be available to the controlling program. If multiple pick points or grasps for a different workpiece are definable, there may be a hierarchy of gripping preferences.

In some embodiments, the bin picking system may assert a signal or return a warning when there are no pickable parts visible. The bin picking system may distinguish between "no parts visible" and "parts visible but not pick-able." The bin picking system may also signal that a bin is "almost empty". The picking operation may allow for the robot to obstruct the view of the bin during picking.

In some embodiments, the bin picking system may include a signaling or error return mechanism to the calling program. The bin picking system may have a "reasonable" range of error resolution, for example, may include a mode where "no parts found" is not an error, but is rather a state: periodically the sensor re-scans the area and waits for a workpiece to arrive. The sensor may also be mountable both in a fixed position over the bin or on a robot arm. The sensor may be tolerant of minor vibrations such as may be found on a factory floor.

In some embodiments, the sensor may operate with the target reliability in environments where there may be both overhead lighting and task lighting, and where the robot, passing people, and other machines may cast varying shadows. "Ambient light" may be fluorescent, LED fluorescent, incandescent, indirect natural light, etc., i.e. it may contain narrow spectral bands or may be broad-spectrum. The bin picking system may include the ability to programmatically change the projected pattern, to allow for future enhancements. The bin picking system may be insensitive to workpiece surface texture. The bin picking system may exclude use of parts with significant specular reflection. The bin picking system may exclude use of bins with significant specular reflection. The bin picking system may be insensitive to contrast with the background (since the background is more of the same workpiece type, by definition there will be low contrast). The bin picking system may exclude operation with transparent parts. The bin picking system may allow some level of translucency in the parts. In some embodiments, the bin picking system may exclude operation with transparent bins or translucent bins. The bin picking system may work with imprecisely placed bins, and bins that move between cycles.

The bin picking system may allow generation of a bin picking program (excluding parts of the program that are outside of the bin picking, e.g. final workpiece placement, signaling the operator, other operations, etc.) within eight hours by a moderately proficient UR programmer. The bin picking system may enable offline bin picking program development to minimize impact to production throughput. It may be possible to recall a previously trained workpiece type and create a new bin picking program within one hour. The bin picking system may use wizards or other interactive tools to generate a program.

In some embodiments, the bin picking system may execute on either the UR controller or, if there is a second image processing computer, on that computer. In some embodiments, the bin picking system (e.g., bin picking system 64) may allow simulation-based generation of a bin picking program on one of the above two computers or a separate computer. The bin picking system may be a URCaps compliant application. If multiple sensor models or variations are used, the configuration and programming software may operate with all sensor types. If multiple sensor models or variations are used, the configuration and programming software may auto-detect which sensor type is used.

In some embodiments, the bin picking system may include a visual mechanism to verify the position of a gripped workpiece relative to the gripper, and compensate for any offset in the placement of the workpiece. If arbitrary bin shapes are supported, programming may require a CAD model of the bin. The bin picking system may work with a general description (e.g. length, width, breadth) of an end effector. Checking for collisions between the end effector and a non-gripped workpiece may be user selectable. The bin picking system may allow the definition of a general region for a pick point.

The placement training procedure may include the following steps: 1) Offline: teach the robot to pick up and present the workpiece to the sensor for scanning. Record both the end effector pose and the workpiece pose. 2) Offline: teach the robot to place the workpiece at its destination, record the end effector pose. 3) Online: pick the workpiece and present it to the sensor for scanning using the same robot posture as in Step 1, record the end effector pose and workpiece pose. 4) Online: Place the workpiece to its destination by the information collected in the previous steps.

In some embodiments, placement accuracy may be dominated by three primary sources: 1) Robot kinematic model calibration, 2) Sensor calibration and alignment, and 3) Workpiece pose estimation. These three tasks determine the coordinate system transformations that define the robot end-effector pose, sensor pose, and workpiece pose and in a common coordinate system. The final workpiece placement may be calculated as a function of these transformations.

In some embodiments, checking for collisions between the end effector and a non-gripped workpiece may be user selectable. In some embodiments, path planning may search for some level of clearance around a target workpiece. The resolution and accuracy specification may be met at the worst case position within the bin.

In some embodiments, above the bin, there may be enough room for an operator to dump more parts in to the bin. As a rule, this means there may be room for a similar sized refill bin to be rotated above the bin, up to a bin size of 40 cm depth (i.e. there is an upper limit to the size of the refill bin). In some embodiments, operation may not require main sensor axis to be normal to the top or bottom plane of the bin. This allows the bin to be canted, or the sensor to be imprecisely placed. In some embodiments, operation may not require that the bin be horizontal. The processor, if not combined in the sensor, may be combined with the UR processor in the UR controller enclosure. Any separate software that creates a point cloud from a sensor may support all sensors in the product family.

In some embodiments, obstructions that cause a force limit may be detected and force a re-try. The bin picking system may assert a signal or return a warning when there are no pickable parts visible. The bin picking system may use wizards or other interactive tools to generate a program. In some embodiments, the bin picking application may be a URCaps compliant application. The bin picking system may include the option to return a six-dimensional offset to the calling program, instead of performing the place operation. The bin picking system may be able to specify programmatically which type of workpiece is desired before starting the pick. The bin picking system may include a signaling or error return mechanism to the calling program. Setup may be agnostic to the bin size and shape. In some embodiments, the bin picking system may be able to accept a CAD model of the workpiece. In some embodiments, the bin picking system may allow simulation-based generation of a bin picking program on one of the above two computers or a separate computer. The bin picking system may be tolerant of temporary obstructions between the sensor and the bin. Temporary obstructions may include the operator, a refill bin, a swizzle stick, etc.

In some embodiments, the bin picking system may work with both vacuum pick-up and mechanical grippers. In some embodiments, the bin picking system may work with workpieces as small as 1×1×0.1 cm, and as large as 30×30×30 cm. However, it will be appreciated that workpieces or objects of any size may be used within the scope of the present disclosure.

Referring now to FIG. 54, a flowchart showing an example of the bin picking operation consistent with embodiments of the present disclosure is provided. For example and in some embodiments, robotic bin picking process 10 may identify 200 a list of candidate workpieces or objects to be picked up. As discussed above, a workpiece may generally include an object that may be manipulated (e.g., grasped, picked up, moved, etc.) by a robot. In some embodiments, the list may be ranked based on upon one or more metrics. Metrics may include likelihood of a successful pick, likelihood of a successful place, and/or suitability for placement in a particular location. As discussed above and in some embodiments, bin picking system (e.g., bin picking system 64) may include a scanning system (e.g., one or more sensors and/or scanners) configured to identify parts in a bin.

In some embodiments, robotic bin picking process 10 may determine 202 a path to the one or more candidate objects based upon, at least in part, a robotic environment and at least one robotic constraint. For example, robotic bin picking process 10 may define a path to the candidate objects or workpieces taking into consideration one or more aspects including, but not limited to, the workpiece shape, the environment, the bin, the end of arm tool, and/or robot link/joint limitations/constraints. In some embodiments, the path may be a feasible path, an optimal path, or both. For example, a feasible path may generally include a possible path to the workpiece while an optimal path may generally include a path optimized for one or more attributes (e.g., shortest time, fewest adjustments in the robotic arm, etc.). In some embodiments, when the candidate workpiece is picked up, the path may be determined on the fly, in real-time.

In some embodiments, the sensor may be a 3-D sensor. In some embodiments, the sensor may be a 2-D sensor. The re-scan may be in an area of the sensed volume where the sensor resolution is maximal. The sensor (e.g., a scanner) may also provide a data set describing the perceived environment including static and dynamic objects. In some embodiments, robotic bin picking process 10 may use the data set to learn the environment to determine the path and/or for collision avoidance.

In some embodiments, robotic bin picking process 10 may validate 204 a feasibility of grasping a first candidate object of the one or more candidate objects. For example, robotic bin picking process 10 may attempt to validate 204 the feasibility of grasping the candidate objects or workpieces on the list by simulating the pick and place operation faster than real time. In some embodiments, the simulation may include using a robot kinematic model. In some embodiments, the simulation may include a model of the environment around the robot. The environment can include static objects and dynamic objects (e.g., object that move). In some embodiments, these objects may include machines that are represented by kinematic models that have their state updated based upon, at least in part, sensor feedback. In some embodiments, one or more objects may be modeled as a dynamic obstacle based on point cloud data from a sensor. The point cloud may be transformed into a voxel grid, height field, or mesh representing the perceived outer surface of the object. While an example has been discussed above for validating the feasibility of grasping a first candidate object using a simulation, it will be appreciated that the feasibility of grasping an object may be validated in other ways within the scope of the present disclosure.

In some embodiments, if the feasibility is validated, robotic bin picking process 10 may control 206 the robot to physically select the first candidate object. For example, if the validation passes, robotic bin picking process 10 may control the robot to pick up the candidate workpiece.

In some embodiments, if the feasibility is not validated, robotic bin picking process 10 may select 208 at least one of a different grasping point of the first candidate object, a second path, or a second candidate object. For example, if validating 204 the feasibility of grasping the first candidate object fails, robotic bin picking process 10 may select at least one of the following: a different grasping point of the same candidate workpiece, a different path, and/or a different candidate workpiece (e.g., lower ranked object on the list) on the list. In some embodiments, selecting a different grasping point, a different path, and/or a different candidate object may include simulating the feasibility of the different grasping point, the different path, and/or the different candidate object as discussed above.

In some embodiments and as discussed above, determining 202 the path to the one or more candidate objects may include using information about one or more surfaces of at least one object adjacent to the candidate object and avoiding a collision with the at least one object adjacent the candidate object. In this manner, robotic bin picking process 10 may use information about surfaces of objects around the candidate workpiece when determining a path the candidate object to avoid a collision with the objects around the candidate workpiece. For example and in some embodiments, the information about the one or more surfaces of at least one object adjacent to the candidate object is gathered as part of identifying the candidate object. In some embodiments, identifying 200 a candidate object may include distinguishing the candidate object from one or more adjacent objects which may include gathering information on adjacent objects. In some embodiments, robotic bin picking process 10 may generate a simplified model of the workpiece based on the external surfaces of the workpiece.

In some embodiments, controlling 206 the robot may include performing a second scan of the first candidate object, moving the first candidate object to a placement target having a fixed location with an accuracy requirement, manipulating the first candidate object and delivering the first candidate object to the placement target in accordance with the accuracy requirement. For example, the robot may pick up a candidate workpiece and move it to a placement location that may be a machine. The machine may have a fixed location with a higher accuracy requirement. Accordingly and to improve placement accuracy, robotic bin picking process 10 may scan the picked up workpiece (e.g., re-scan), manipulate the workpiece, and locate it to the machine. The re-scan operation may use the same sensor/scanner used to locate the workpiece, or an additional sensor/scanner. In some embodiments, the second scan of the candidate object may be in an area of maximum resolution of the scanner. While a placement target or placement location has been described in the above example as a machine, it will be appreciated that the placement target is not limited to machines and may be any target for placing the candidate object within the scope of the present disclosure.

In some embodiments, controlling 206 the robot may include presenting the first candidate object to a scanner to maximize the use of one or more features on the first candidate object to precisely locate the first candidate object. For example, robotic bin picking process 10 may present the workpiece to the sensor/scanner in such a way as to maximize the use of features on the workpiece to precisely locate the workpiece. In some embodiments, robotic bin picking process 10 may locate and pick the workpiece in a way that maximizes the probability that it can be physically selected or picked successfully, rather than maximizing the accuracy of the pick.

In some embodiments, robotic bin picking process 10 may display, at a graphical user interface (GUI) at least one of the robot or the one or more candidate objects, wherein the graphical user interface allows a user to visualize or control at least one of the robot, a path determination, a simulation, a workcell definition, a performance parameter specification, or a sensor configuration. For example, robotic bin picking process 10 may display a GUI that may be used to operate the bin picking system. As discussed above and in some embodiments, displaying the GUI may include, but is not limited to, providing path determination, simulation, workcell definition, performance parameter specification, model importation and exportation, sensor configuration, etc. to a user. In some embodiments, the GUI may allow simultaneous creation of a program, and debug of the created program. The GUI may also allow mixing of a bin picking program commands with other robot control commands.

In some embodiments, robotic bin picking process 10 may display, at the graphical user interface, a shrink-wrap visualization over all non-selected components and non-selected surfaces other than the one or more candidate objects. This display may aid the programmer in determining whether a trained grasp is suitable for picking the workpiece given the presence of surrounding objects.

In some embodiments and as discussed above, the GUI may be on any suitable device including, but not limited to, on a teach pendant, on a hand-held device, on a personal computer, on the robot itself, etc. In some embodiments, the GUI may draw its displayed information from multiple sources, for example from the robot controller and from a processor separate from the robot controller. In some embodiments, the GUI may direct user input to one or multiple destinations, for example to the robot controller and/or a processor separate from the robot controller. In some embodiments, the user of the GUI may or may not be aware of the existence of multiple data sources or destinations.

In some embodiments, at least one of identifying of one or more candidate objects, determining of a path to the one or more candidate objects, validating of a feasibility grasping a first candidate object, and/or controlling the robot may be performed using a primary processor and at least one co-processor. In some embodiments and as discussed above, robotic bin picking process 10 may be configured to stream the GUI from the coprocessor to the robot teach pendant. In this manner, robotic bin picking process 10 may run the GUI application on the coprocessor, which can include a 3D rendered view of the robot and workcell, and then stream images of the GUI to the teach pendant for display. In some embodiments, the user touch events may be streamed from the teach pendant to the coprocessor for remote interaction with the GUI application.

In some embodiments, determining 202 a path to the one or more candidate objects may be based upon, at least in part, at least one of: global path planning and local path planning. For example, robotic bin picking process 10 may utilize global path planning, local path planning, or a combination of the two. As used herein, global path planning may generally help find a collision free path where the local planning cannot. Local planning may be similar to a gradient descent algorithm, where it can get stuck in a local solution. This may occur if there are many obstacles in the environment. The local planning approach of robotic bin picking process 10 may include real-time control with collision avoidance optimization. For example, it may operate quickly but may not always explore the entire workspace of the robot for the solution. Global path planning via robotic bin picking process 10, in contrast, may be configured to search the entire workspace for a solution.

In some embodiments, validating 204 a feasibility of grasping a first candidate object may include analyzing conditional logic associated with a user program. As discussed above and in some embodiments in a bin picking application, the user may need to define various system characteristics, as well as develop a user program to pick and place parts. In this manner, robotic bin picking process 10 may attempt to guarantee successful end-to-end robot motion in a constrained environment, considering varying start (pick) and end (place) robot positions, and multiple alternate paths defined by the conditional logic in the user program. When a user program is executed, robotic bin picking process 10 may repeatedly perform three main tasks: perception (i.e., identifying the parts in the bin by using a sensor); validation (i.e., identifying which parts can be picked and then placed by the robot according to the rules specified in the user program given the constraints of the environment); and motion (i.e., executing the robot motion on validated parts, according to the rules specified in the user program). During the validation task, robotic bin picking process 10 may determine the robot motions that need to take place in order to pick and place a part, before the motion is actually executed. As a result, robotic bin picking process 10 can avoid a situation when robot stalls in the middle of the motion due to some environment or robot flexibility constraints.

In some embodiments, validating 204 a feasibility of grasping a first candidate object may include at least one of validating all path alternatives, validating a specific path alternative, validating any path alternative, validating one or more exception paths, excluding one or more sections from being validated, or performing parallelized validation of multiple sections of the path. For example, for validating all path alternatives, a user program may have conditional logic, where a robot is expected to take a different path based on some condition that is not known at the time of validation. For example, if the part needs to be inspected by a camera after it is picked, and the inspection result determines whether the part is placed in e.g., place position 1 or e.g., place position 2. In order to guarantee successful motion, validation logic of robotic bin picking process 10 may confirm both of these alternatives before the part can be moved.

For validating a specific path alternative, it is possible that a user program has conditional logic where a robot may be expected to take a different path based on some condition that is known at the time of validation. For example, a user program may define robot motions conditional on how the part was picked (i.e. how the robot is holding the part). During palletizing, the part may be placed in one of several known positions, and the program iterates over these positions in a predictable pattern. In these cases, the conditions that determine possible alternate paths are known at the time of validation. Only the motions specified in some branches of the conditional flow in the user program may need to be analyzed in order to guarantee successful motion. In fact, analyzing all code paths may be harmful in these case because that would take longer because those paths sections that cannot be taken based on the conditional logic in the user program should not prevent the robot from moving, regardless of whether they can be validated.

For validating any path alternative, it is possible that user program may define several path alternatives where any alternative is acceptable. For example, during palletizing, the part or object can be placed in any one of several known positions. In this case, validation would need to consider multiple path options specified by the program until it finds one that works.

For validating one or more exception paths, one or more paths may be taken by the robot as a result of an exception condition. For example, if a part or object fails to attach to the robot gripper during a pick, robotic bin picking process 10 can direct the robot to go back to the starting position. If a robot encounters excessive force resisting its motion when picking a part, robotic bin picking process 10 can direct the robot to go back to the starting position. In these cases, validation may need to confirm viability of these paths, even if they are not explicitly specified in user program flow.

For excluding one or more sections from being validated, a user may choose to exclude some sections of the program flow from being validated. For example, one or more code paths may contain types of motion that cannot be validated. In some embodiments, a user may choose to do validation in order to optimize performance. In these cases, validation may conditionally not be performed.

In some embodiments, robotic bin picking process 10 may perform parallelized validation of multiple sections of the path. For example and in order to optimize performance, multiple sub-sections of the path can be validated in parallel.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present disclosure.

What is claimed is:

1. A method for robotic bin picking comprising:

identifying one or more candidate objects for selection by a robot;

determining a path to the one or more candidate objects based upon, at least in part, a robotic environment and at least one robotic constraint, wherein determining the path includes determining whether the one or more candidate objects is placeable, wherein the at least one robotic constraint includes at least one of a robot linkage or a robot joint limitation;

validating a feasibility of grasping a first candidate object of the one or more candidate objects, wherein validating the feasibility comprises checking for a collision-free path for a release retreat, wherein the collision-free path includes a path after the object is placed; and if the feasibility is validated, controlling the robot to physically select the first candidate object;

if the feasibility is not validated, selecting at least one of a different grasping point of the first candidate object, a second path, or a second candidate object.

2. The method of claim 1, wherein validating includes using a robot kinematic model.

3. The method of claim 1, wherein the path is at least one of a feasible path or an optimal path.

4. The method of claim 1, wherein the path is determined at least in part in real-time while controlling the robot.

5. The method of claim 1, wherein determining the path includes using information about one or more surfaces of at least one object adjacent to the candidate object and avoiding a collision with the at least one object adjacent to the candidate object.

6. The method of claim 1, further comprising:

displaying, at a graphical user interface, at least one of the robot or the one or more candidate objects, wherein the graphical user interface allows a user to visualize or control at least one of the robot, a path determination, a simulation, a workcell definition, a performance parameter specification, or a sensor configuration.

7. The method of claim 6, wherein the graphical user interface allows for a simultaneous creation of a program and a debugging process associated with the program.

8. The method of claim 6, wherein the graphical user interface is associated with one or more of a teach pendant, a hand-held device, a personal computer, or the robot.

9. The method of claim 6, further comprising:

displaying, at the graphical user interface, a visualization over all non-selected components and non-selected surfaces other than the one or more candidate objects.

10. The method of claim 1, further comprising:

providing an image of the environment including one or more static and dynamic objects using a scanner, wherein the robot is configured to receive the image and use the image to learn the environment to determine the path and collision avoidance.

11. The method of claim 1, wherein controlling the robot includes performing a second scan of the first candidate object, moving the first candidate object to a placement target having a fixed location with an accuracy requirement, manipulating the first candidate object and delivering the first candidate object to the placement target in accordance with the accuracy requirement.

12. The method of claim 11, wherein the second scan is in an area of maximum resolution of the scanner.

13. The method of claim 1, wherein controlling the robot includes presenting the first candidate object to a scanner to maximize the use of one or more features on the first candidate object to precisely locate the first candidate object.

14. The method of claim 1, wherein controlling the robot includes locating and picking the first candidate object in a way that maximizes the probability that is physically selected successfully.

15. The method of claim 1, wherein at least one of identifying, determining, validating, or controlling are performed using at least one of a primary processor and at least one co-processor.

16. The method of claim 1, wherein determining a path to the one or more candidate objects is based upon, at least in part, at least one of: global path planning, local path planning, a robot linkage, or a robot joint limitation.

17. The method of claim 1, wherein validating a feasibility of grasping a first candidate object includes analyzing conditional logic associated with a user program.

18. The method of claim 17, wherein validating a feasibility of grasping a first candidate object includes at least one of validating all path alternatives, validating a specific path alternative, validating any path alternative, validating one or more exception paths, excluding one or more sections from being validated, or performing parallelized validation of multiple sections of the path.

19. The method of claim 1, further comprising:

configuring the first candidate object and the second candidate object to be picked by the robot based upon, at least in part, one or more models corresponding to the first candidate object and the second candidate object, wherein the first candidate object and the second candidate object are of different types.

20. A method for robotic bin picking comprising:

identifying one or more candidate objects for selection by a robot;

determining a collision-free path to the one or more candidate objects and for a release retreat based upon, at least in part, a robotic environment and at least one robotic constraint, wherein determining a collision-free path includes determining how to avoid collisions with the robot, wherein the collision-free path includes a path after the object is placed;

validating a feasibility of grasping a first candidate object of the one or more candidate objects; and if the feasibility is validated, controlling the robot to physically select the first candidate object;

if the feasibility is not validated, selecting at least one of a different grasping point of the first candidate object, a second path, or a second candidate object.

21. A method for robotic bin picking comprising:

identifying one or more candidate objects for selection by a robot;

determining a collision-free path to the one or more candidate objects and for a release retreat based upon, at least in part, a robotic environment and at least one robotic constraint, wherein determining the path includes analyzing the one or more candidate objects, the robot, and a gripper associated with the robot, wherein the collision-free path includes a path after the object is placed;

validating a feasibility of grasping a first candidate object of the one or more candidate objects; and if the feasibility is validated, controlling the robot to physically select the first candidate object;

if the feasibility is not validated, selecting at least one of a different grasping point of the first candidate object, a second path, or a second candidate object.

* * * * *